United States Patent
Depelteau et al.

(10) Patent No.: US 6,404,767 B1
(45) Date of Patent: Jun. 11, 2002

(54) ARCHITECTURE FOR ABR PROCESSING WITHIN AN ATM SWITCH

(75) Inventors: Gary Michael Depelteau; John Edward Vincent, both of Ottawa (CA)

(73) Assignee: Nortel Networks Corporation, St. Laurent (CA)

( * ) Notice: Subject to any disclaimer, the term of this patent is extended or adjusted under 35 U.S.C. 154(b) by 0 days.

(21) Appl. No.: 09/098,491

(22) Filed: Jun. 17, 1998

(51) Int. Cl.⁷ .............................................. H04L 12/28
(52) U.S. Cl. ................... 370/395.1; 370/236.1
(58) Field of Search ............................. 370/395.1, 229, 370/230, 231, 235, 236.1, 395.43, 395.57, 468, 232, 236.2

(56) References Cited

U.S. PATENT DOCUMENTS 5,633,859 A   5/1997   Jain et al. ................. 370/234
6,088,359 A * 7/2000   Wicklund et al. ......... 370/395

FOREIGN PATENT DOCUMENTS

| WO | WO 9639759 | 12/1996 | ............ H04J/1/16 |
| WO | WO 9720415 | 5/1997  | ............ H04L/12/56 |

* cited by examiner

Primary Examiner—Wellington Chin
Assistant Examiner—Brenda Pham

(57) ABSTRACT

Systems and methods for implementing ABR (available bit rate) flow control in ATM (asynchronous transfer mode switches are provided. A partitioned architecture a featuring standalone ABR processing subsystem advantageously allows components to be changed with little impact on the switch's overal design. Both end-to-end and VS/VD (virtual source/virtual destination) flow control systems are provided as are both configurations for switches which are either standalone or connected to a switching fabric.

17 Claims, 37 Drawing Sheets

Example stand alone switching element

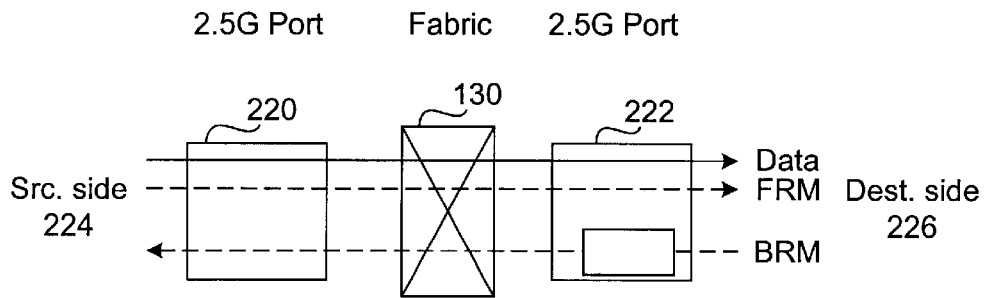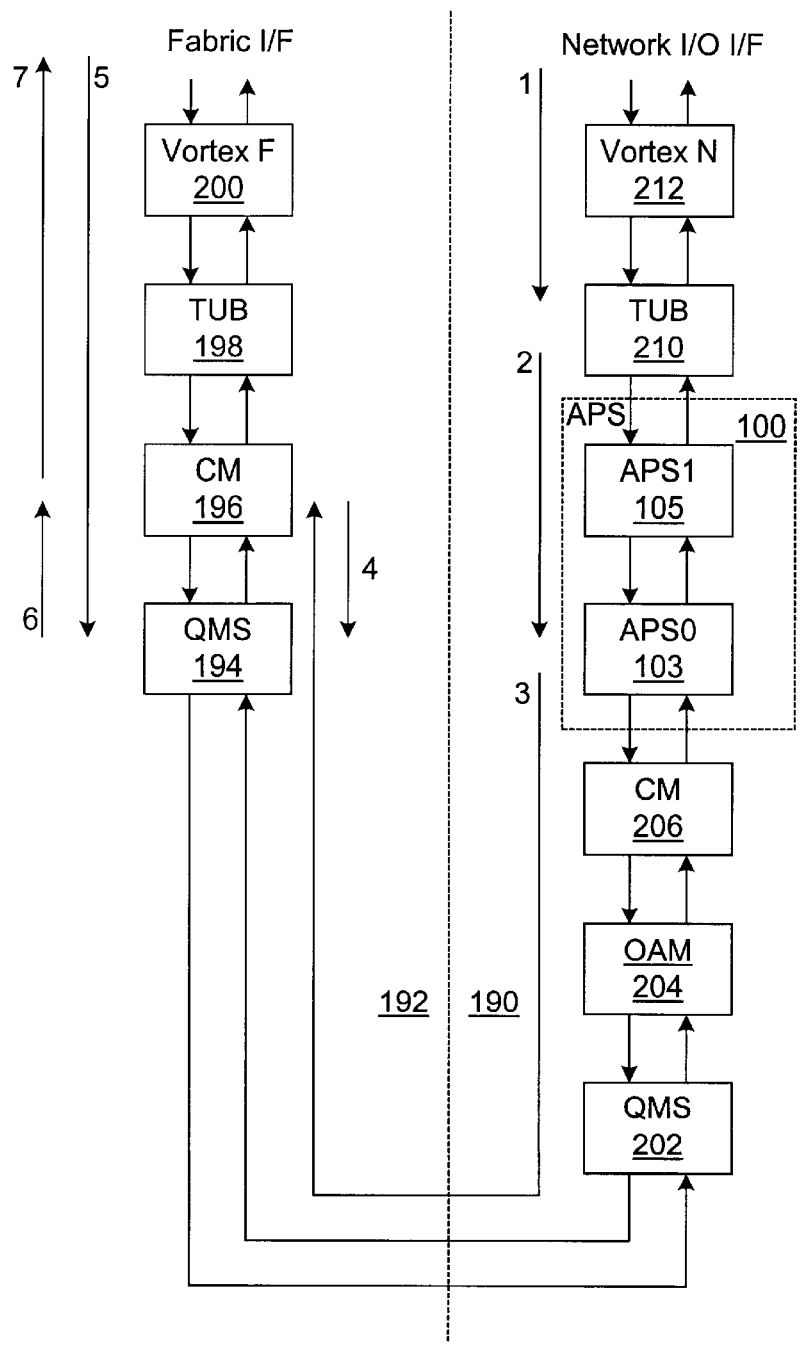
Fig. 19

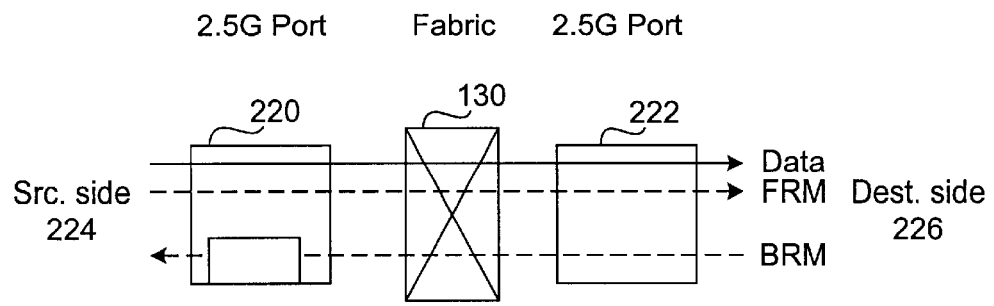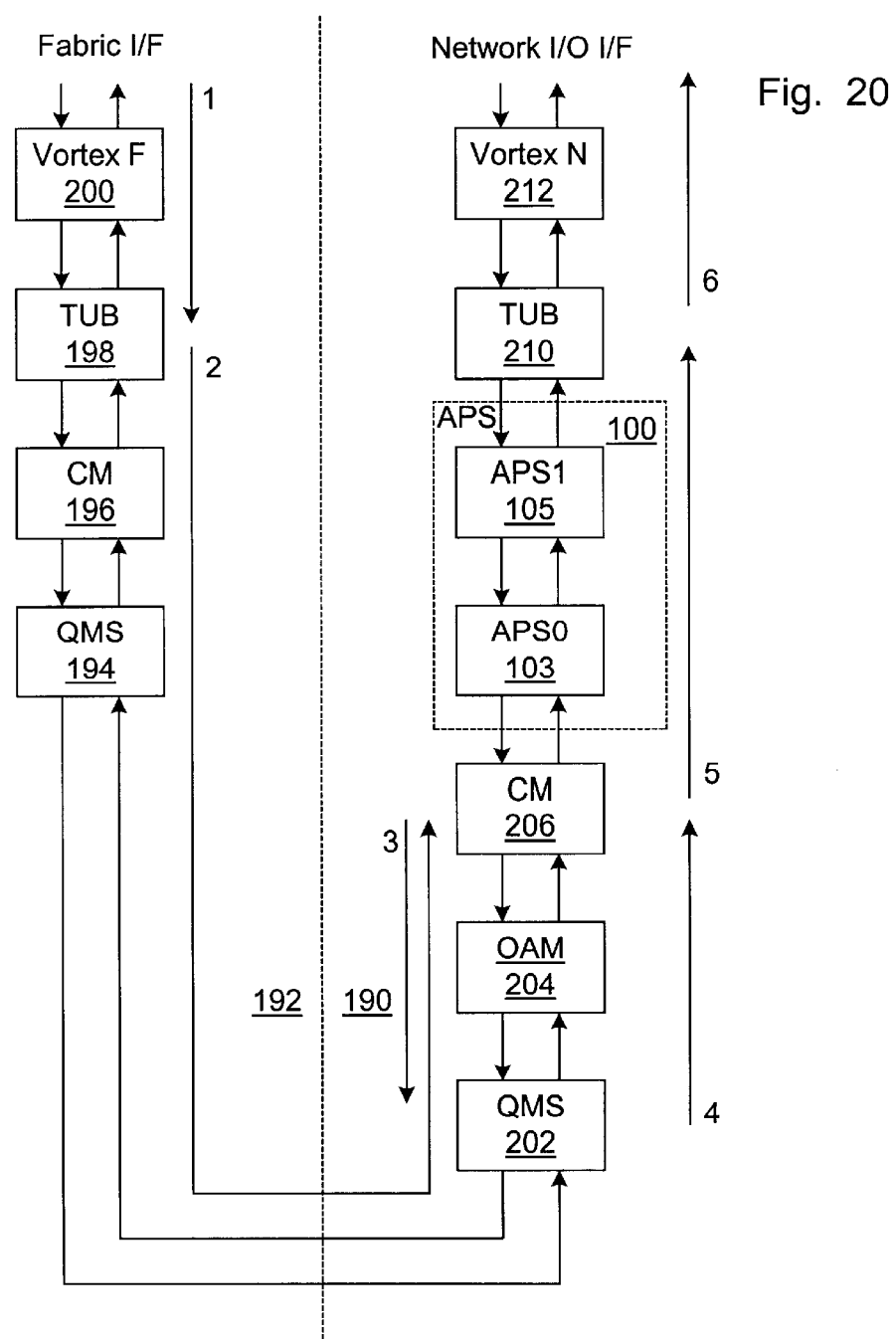
Fig. 20

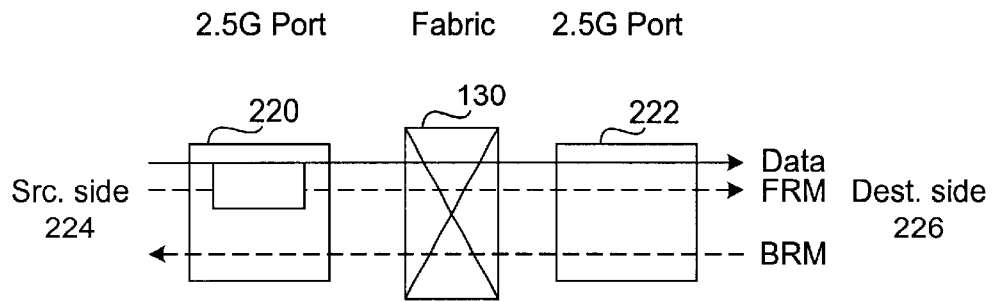
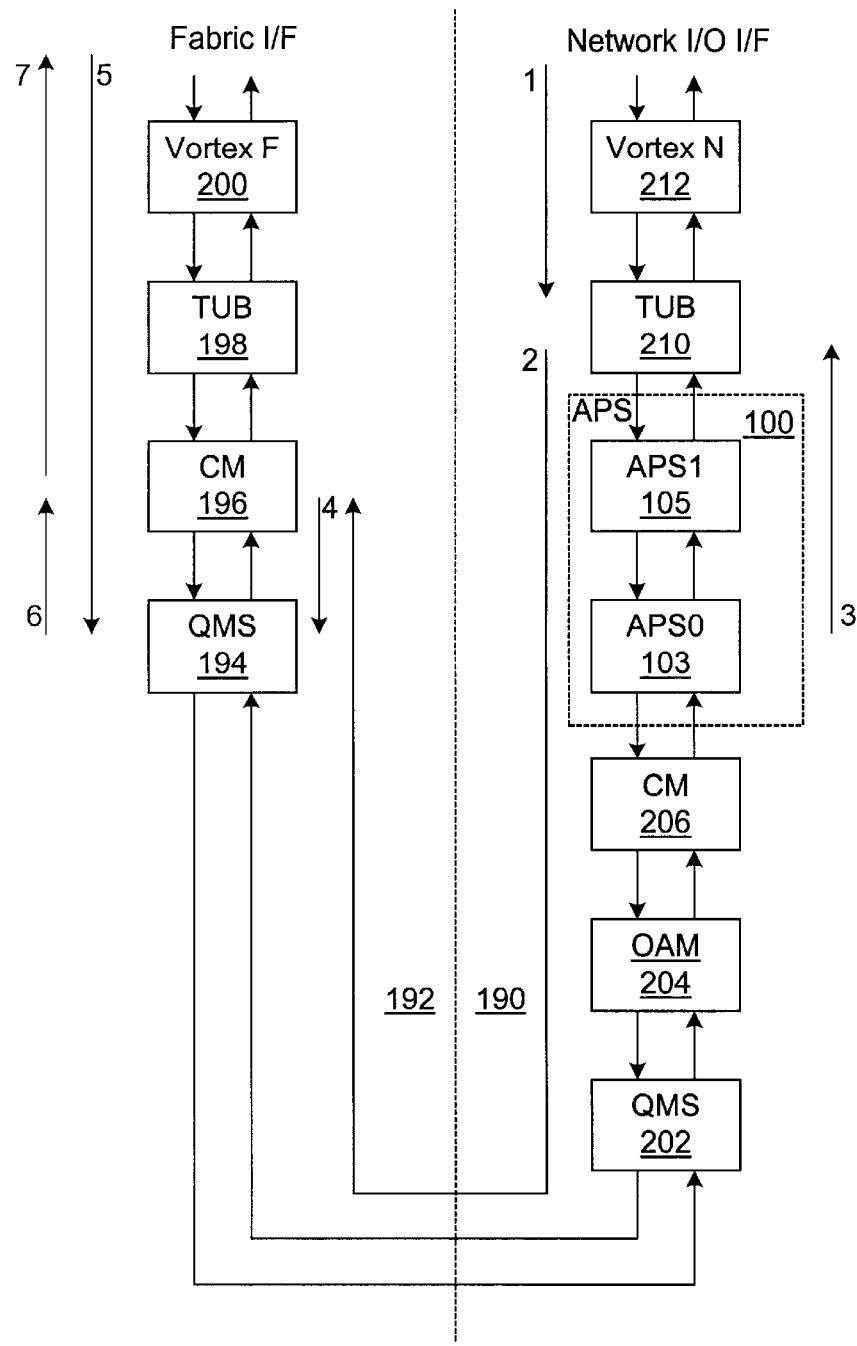
Fig. 21

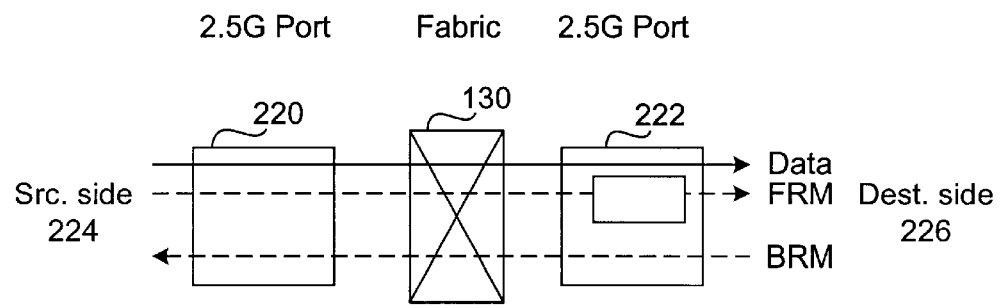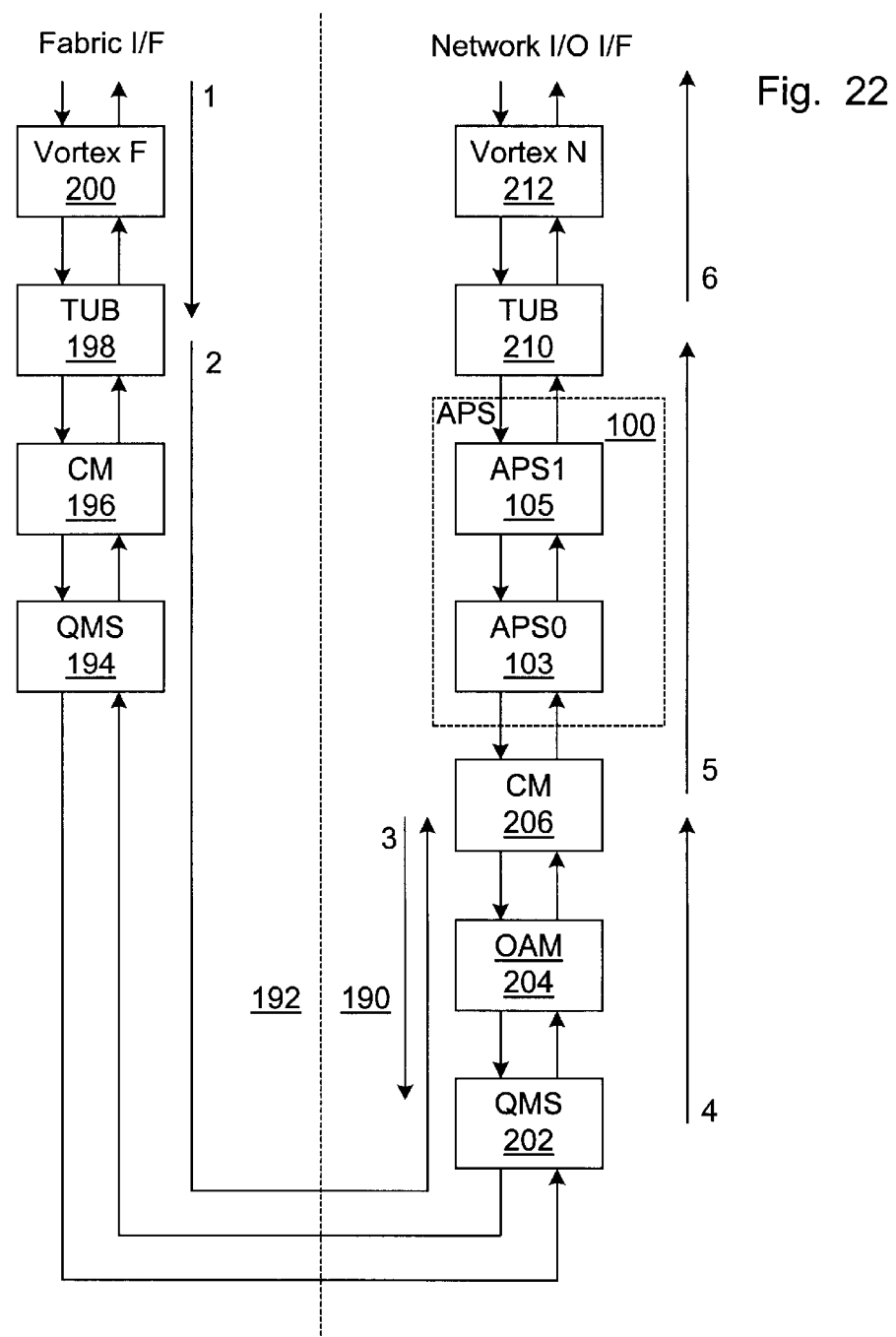
Fig. 22

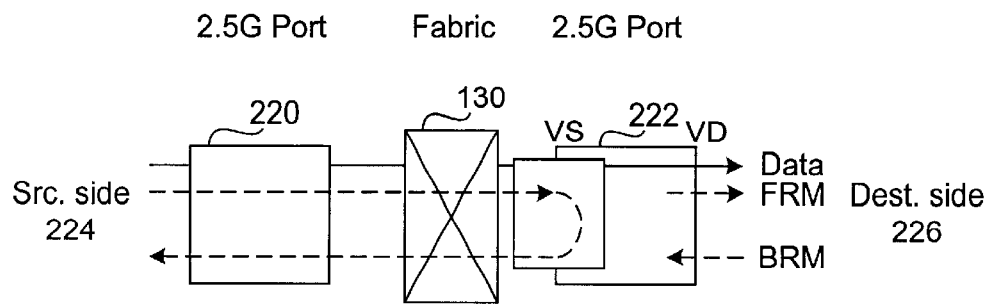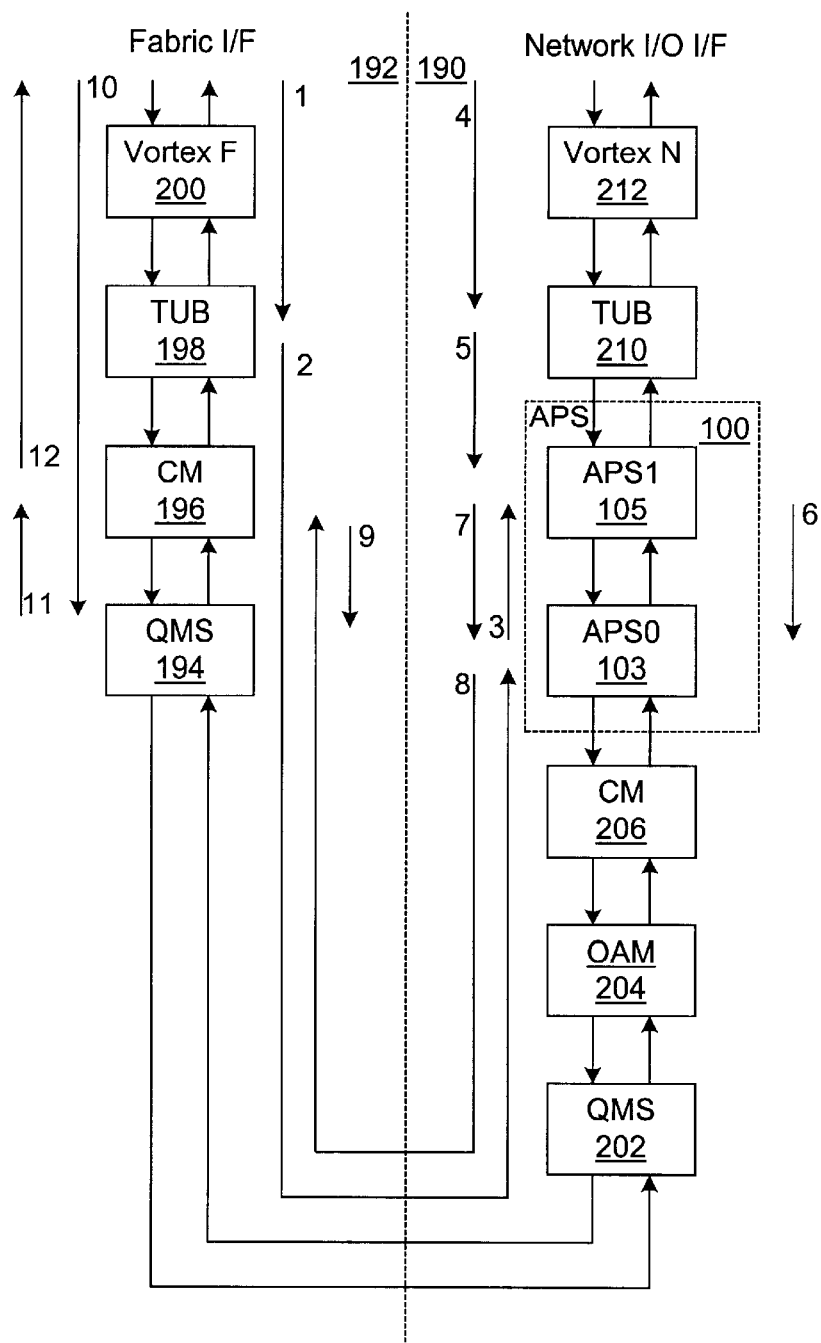
Fig. 23

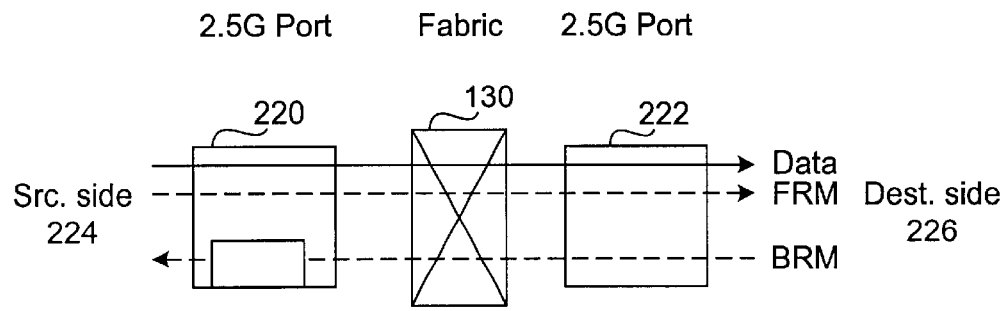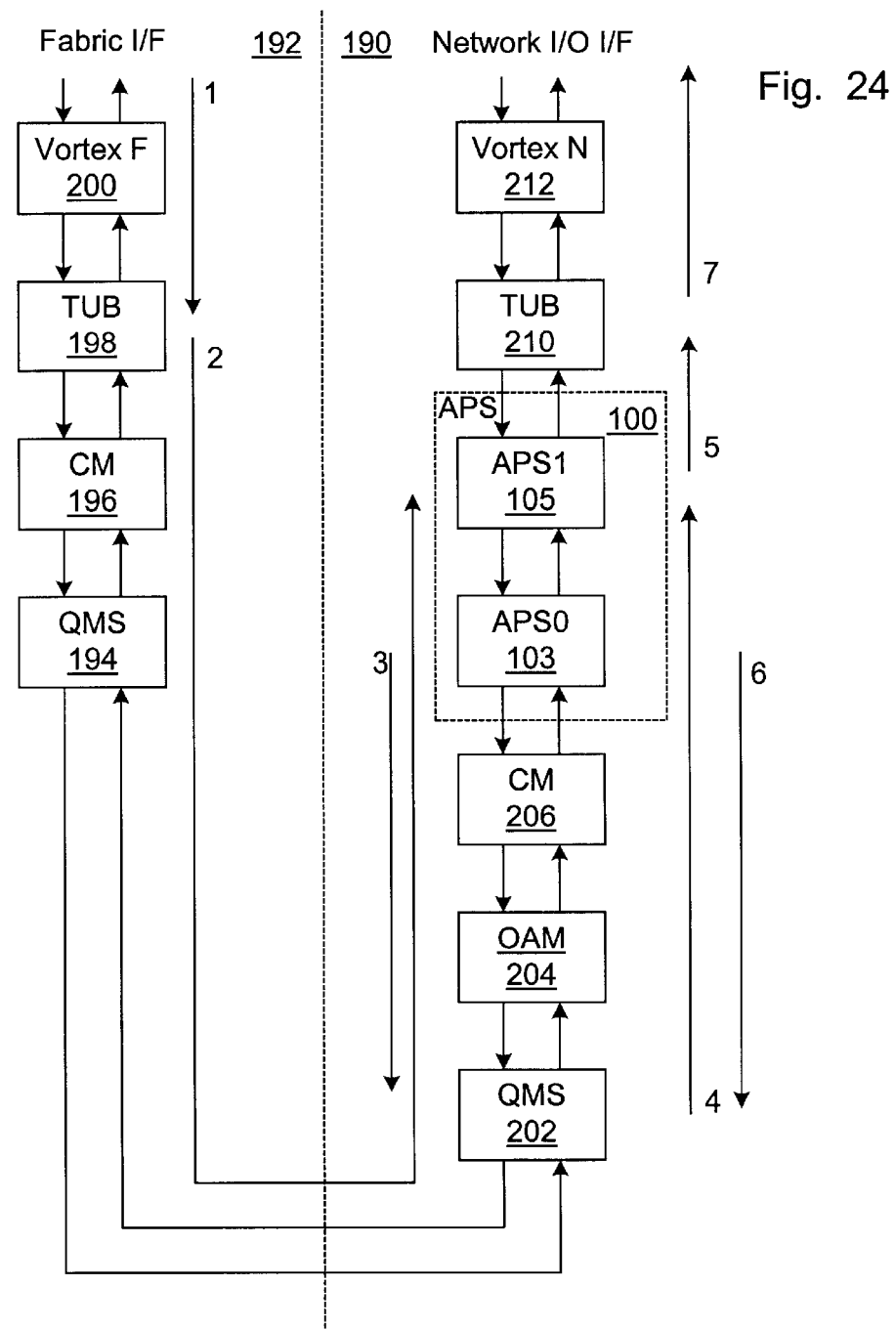
Fig. 24

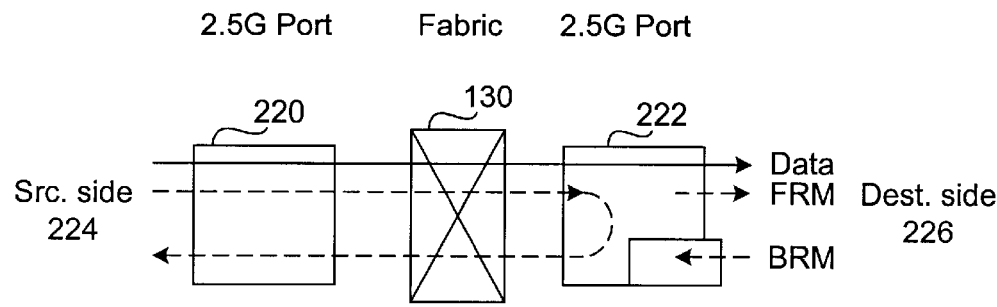
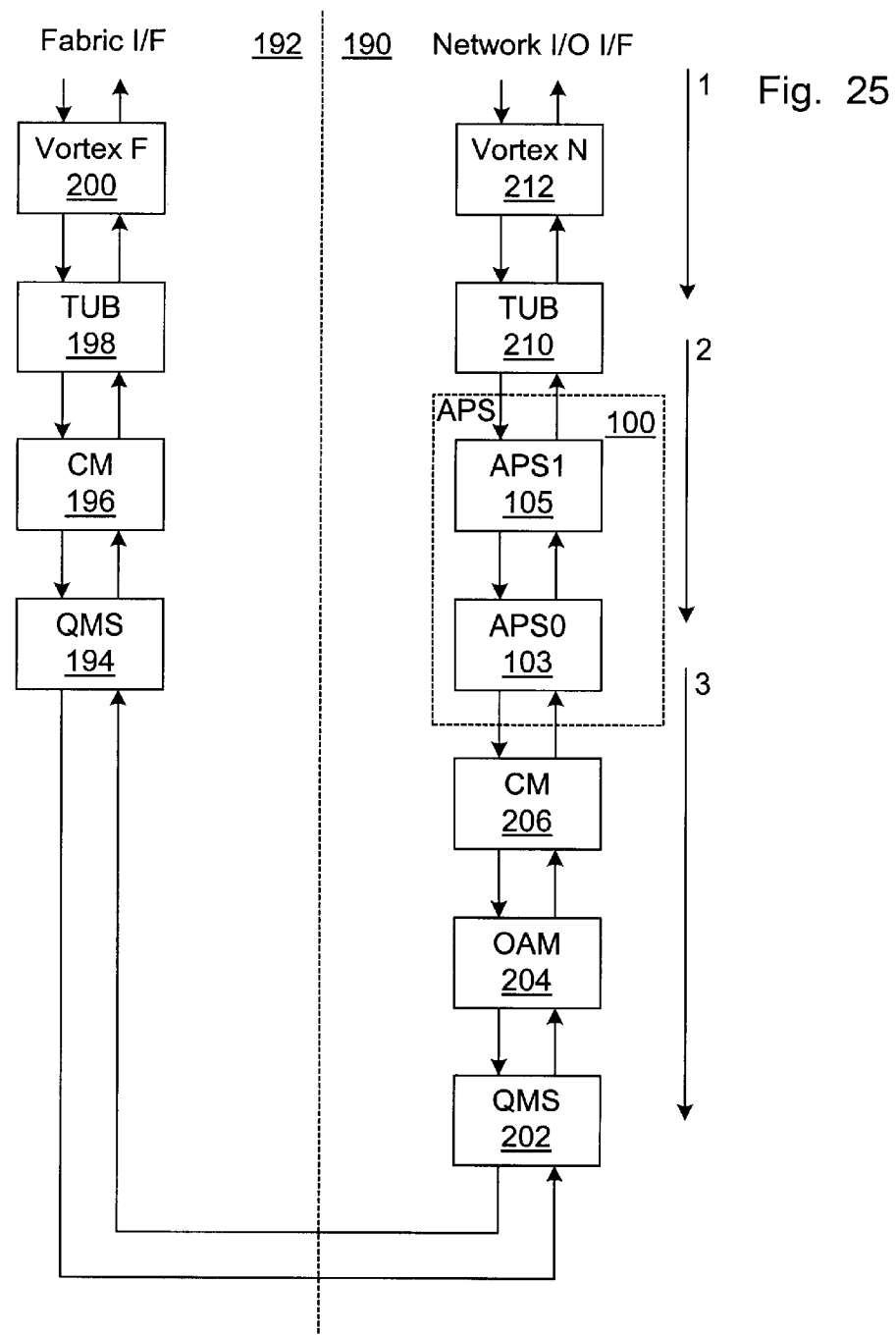
Fig. 25

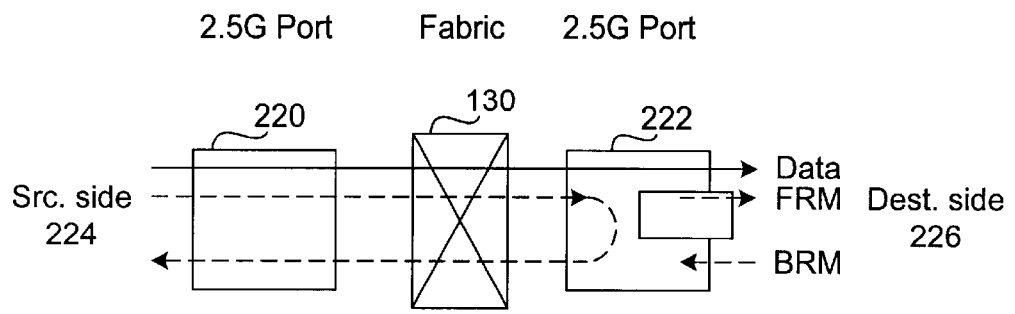
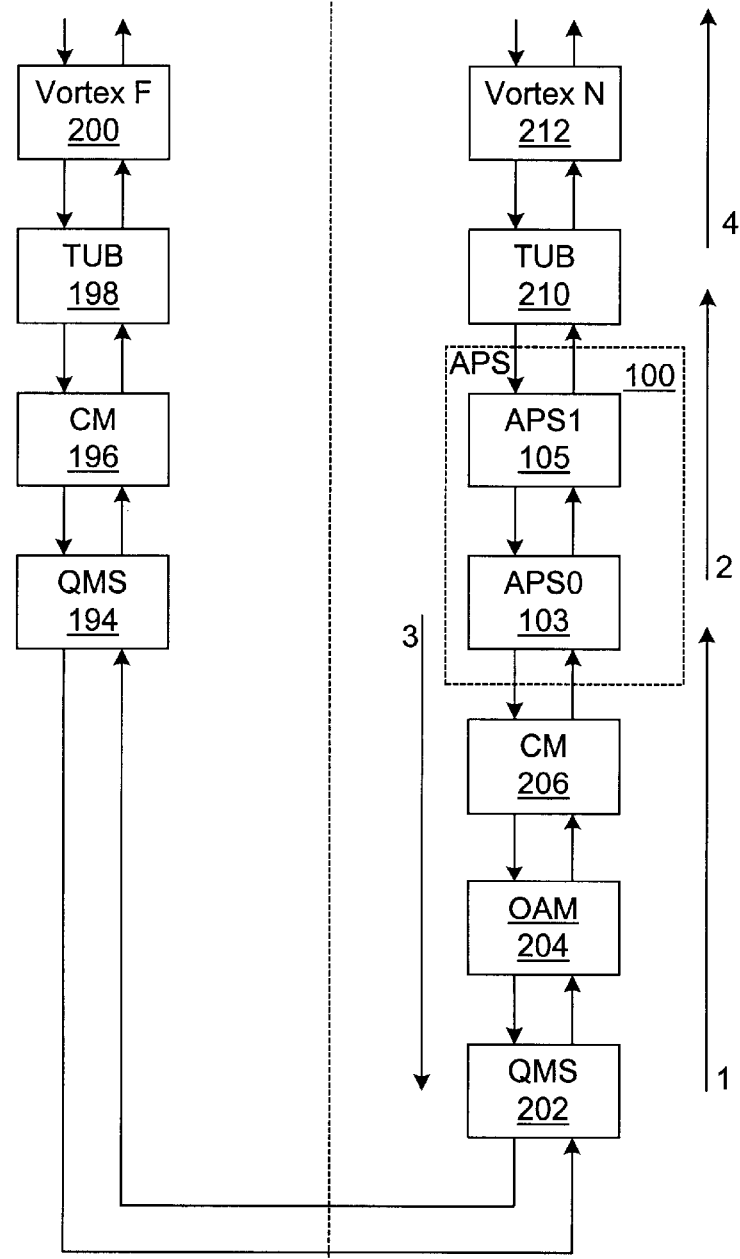
Fig. 26

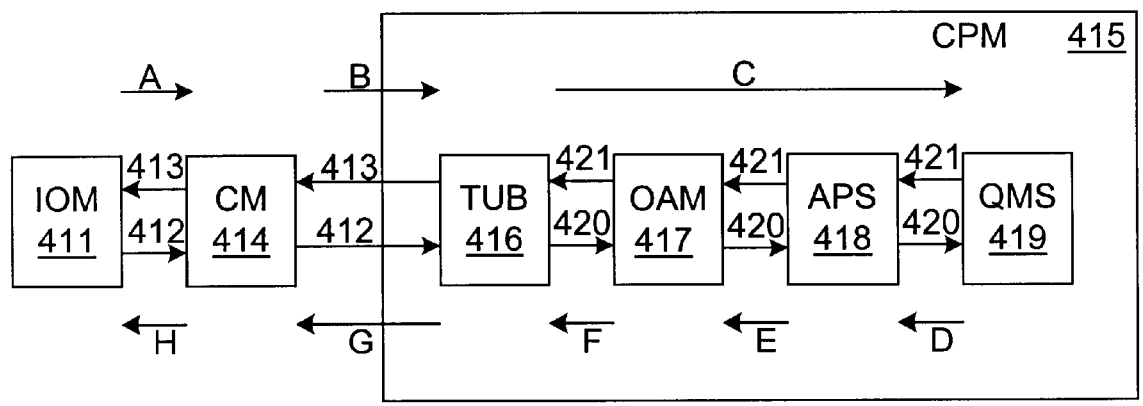

Fig. 36

IOM ingress CIB

| Ingress_Port ID | | GFC/VPI |
|---|---|---|
| VPI/VCI | VCI | PT/CLP |
| Payload 1 | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload 48 |

Fig. 37

CM ingress CIB

| WBADR | | I flags |
|---|---|---|
| Ingress_Port ID | | GFC/VPI |
| VPI/VCI | VCI | PT/CLP |
| Payload 1 | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload 48 |

Fig. 38

TUB ingress CIB

| WICN | | I flags |
|---|---|---|
| Ingress flags | | |
| WBADR | | I flags |
| Ingress_Port ID | | GFC/VPI |
| VPI/VCI | VCI | PT/CLP |
| Payload 1 | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload 48 |

Fig. 39

QMS egress CIB

| RICN | E flags |
|------|---------|
| BADR | E flags |

Fig. 40

APS egress CIB

| RICN | | E flags |
|------|---|---------|
| BADR | | E flags |
| Egress flags | | |
| Egress_Port ID | | GFC/VPI |
| VPI/VCI | VCI | PT/CLP |
| Payload 1 | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload 48 |

Fig. 41

TUB egress CIB

| RICN | | E flags |
|---|---|---|
| BADR | | E flags |
| Egress flags | | |
| Egress_Port ID | | GFC/VPI |
| VPI/VCI | VCI | PT/CLP |
| Payload 1 | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload 48 |

Fig. 42

CM egress CIB

| Egress flags | | |
|---|---|---|
| Egress_Port ID | | GFC/VPI |
| VPI/VCI | VCI | PT/CLP |
| Payload 1 | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload 48 |

Fig. 43

APS_QMS CUB

| rate_update_ICN | flags |
|---|---|
| SCH_rate | |
| RM_cell_ICN | RMF |
| RM_flags | |

Fig. 44

APS_TUB CUB

| DGCRA_rate | RMF |
|---|---|
| DGCRA_rate | |

Fig. 45

IOM_QMS CUB

| Port ID | PLFC |
|---|---|

Fig. 46

ARCHITECTURE FOR ABR PROCESSING WITHIN AN ATM SWITCH

FIELD OF THE INVENTION

This invention relates to an architecture for ABR (available bit rate) processing within a packet based switch such as an ATM (asynchronous transfer mode) switch.

BACKGROUND OF THE INVENTION

Traditional packet switch (or ATM switch) architectures are costly to maintain and upgrade because they tend to couple components that implement unrelated functions. Coupling of components occurs when their designs are highly interdependent on each other, such that one component cannot be changed without also changing the other component.

One example of coupling is the incorporation of one or more embedded computing systems into the platform on which switching takes place. This feature is undesirable because it couples the computing system, which implements software control functions, with other components that implement unrelated functions such as routing and automatic parameter control. Tight coupling between the embedded computing system and the other components on the switch means that the computing system cannot be changed without also changing all the other components on the switch. Because the embedded computing systems require upgrades far more often than other components on the switch, this feature drives-up maintenance and upgrade costs, and is therefore undesirable. Known ATM switch architectures address this problem by moving software control functions, and any embedded computing systems, off the switching platform to standard computing platforms such as workstations. In such architectures, the platform holding the rest of the switching platform is referred to as a switching element (SE), while the platform holding the decoupled computing system is hereinafter referred to as a computing unit (CU). The use of a CU and SE connected only by a high-speed ATM link enforces a strict interface between the two that allows for the CU to be upgraded and scaled independently of the components comprising the SE.

Another example of coupling is the implementation of cell processing functions on the same printed circuit boards that implement line interface functions. This feature has been recognized to be a drawback because it couples the components that implement line interface functions, which do not change often, to the components that implement cell processing functions, which are in a relative state of continual flux. Known ATM switch architectures address this problem by centralizing the components that implement cell processing functions, into cell processing modules. The cell processing modules are separated from the modules containing the line interface components, which are hereinafter referred to as line interface modules, using a well-defined and stable interface.

Yet another example of coupling is the use of function-specific communication channels for connecting components on the SE to each other. As with the other examples of coupling, this coupling inhibits functionally unrelated components that are connected to each other from being upgraded independently of one another. Unlike the other examples of coupling however, correctional adjustments to the ATM switch architecture have yet to be developed in response to this coupling problem.

More specifically, in current ATM switch architectures, the components within the SE are interconnected to one another using a plurality of dedicated unique connections. That is, the number of buses, the width of the buses, the signals used to coordinate transfers, the timing of the buses and other fundamental characteristics vary from connection to connection. Such connections are undesirable because they couple components that are in a constant state of flux to more stable components. It is desirable to protect the investments made in the more stable components by decoupling them from the unstable components. It is preferable that the decoupling be achieved without significantly reducing switching performance.

Partitioning of a switch architecture involves mapping a plurality of functions that need to be performed on the switch, to a plurality of components or modules that can perform those functions. In partitioning a switch architecture, it is often desirable that closely related functions be mapped on to the same component, since such functions tend to have similar context memory requirements. Such mappings optimize the utilization of many switch resources, including the memory.

A particular functionality provided in ATM switches which would benefit from partitioning is the ABR (available bit rate) service. The ABR service in ATM networks is intended to make the best use of remaining capacity after higher priority services such as CBR (constant bit rate) and VBR (variable bit rate) have been provided for. ABR employs a closed-loop flow control mechanism based on RM (resource management) cells to allocate and moderate user access to the available bandwidth. The flow control loop can be end-to-end in which case the RM cells travel all the way from source to destination before being looped back, or it can be segmented into smaller control loops with interim switches emulating the behaviour of the end systems. Such interim switches are referred to as VS/VD (virtual source/virtual destination) switches. The RM cells provide information regarding the congestion level in the switches in the path and regarding the bandwidth allocated to individual sources. This information is used by the source to modify its transmission rate, the objective being to utilize link capacity fully while not losing any cells as a result of congestion. ABR is not intended for real-time applications, and no guarantees are made with respect to cell delay and cell delay variation.

Each RM cell contains an ER (explicit rate) parameter which may be adjusted as the RM cells pass through the switches in the path in either the forward or backward direction. The ER contained in the RM cell when it returns to the source is the maximum rate at which the source can send cells. The ER may be reduced as low as the MCR (minimum cell rate), this being the minimum cell rate guaranteed to the source during connection establishment.

Each RM cell also contains a CI (congestion indication) parameter and an NI (no increase) parameter which may be adjusted as the RM cells pass through the switches in the path in either the forward or backward direction. The CI/NI parameters contained in the RM cell when it returns to the source are used to indicate to the source what type of relative increase or decrease should be effected to the rate at which the source can send cells. More specifically, the source is allowed to send cells at a rate entitled the ACR (allowed cell rate), and it is this ACR which is iteratively adjusted by the source each time it receives a returned RM cell as a function of the CI/NI parameters.

ABR functionality is typically spread across a number of switch components, and is coupled to queueing, scheduling and shaping components among other components. This means that if any aspect of the ABR functionality is to be changed, a large scale redevelopment of many components often needs to be undertaken, and this would be very costly. ABR is still a young technology, and as such it is likely that it will continue to evolve after other components of ATM switches have stabilized. Because of this, it would be highly desirable to have a switch architecture with a decoupled ABR processing system.

SUMMARY OF THE INVENTION

It is an object of the invention to develop a new ABR architecture and a new switch architecture that addresses ABR while decoupling components on the switch so that they can be upgraded or otherwise modified independently of one another, preferably without significantly affecting the performance of the switch.

According to a first broad aspect, the invention provides an ABR (available bit rate) processing method for implementation by an APS (ABR processing subsystem) forming part of an ATM (asynchronous transfer mode) switch which assigns an ingress cell an internal connection number and a buffer address in cell memory, the method comprising the steps of: receiving a plurality of cell ingress input messages each containing a respective internal connection number, a buffer address, and an ingress cell; for each cell ingress input message received, outputting a cell ingress output message containing the internal connection number, the buffer address and the ingress cell, and then conditionally performing ingress cell measurements; receiving a plurality of cell egress input messages each containing a respective internal connection number and buffer address; for each cell egress message received, outputting a cell egress output message containing the internal connection number and buffer address, and then conditionally performing egress cell measurements; for each ingress cell received in an ingress cell input message, if the ingress cell contained in one of said ingress input messages is a BRM cell having ER, CI and NI fields, an internal connection number and a buffer address for the BRM cell, then calculating new ER, CI, NI values, and updating these in the BRM cell and outputting a cell ingress output message containing the updated BRM cell, ICN and buffer address for storage in cell memory and subsequent queueing.

According to a second broad asepct, the invention provides a partitioned ATM switch comprising: a TUB (translation, policing and buffering) block; a CM (memory interface) block; an IOM (input/output management) block; a QMS (queueing, shaping and scheduling) block; an APS (Available bit rate processing system) block, the APS comprising one or more ASICs (application specific integrated circuits) for performing the steps of: receiving from the TUB a plurality of cell ingress input messages each containing a respective internal connection number, a buffer address, and the ingress cell; for each cell ingress input message received, outputting a cell ingress output message containing the internal connection number, the buffer address and the ingress cell, and then conditionally performing ingress cell measurements; receiving from the QMS a plurality of cell egress input messages each containing a respective internal connection number and buffer address; for each cell egress message received, outputting to the TUB a cell egress output message containing the internal connection number and buffer address, and then conditionally performing egress cell measurements; for each ingress cell received in an ingress cell input message, if the ingress cell contained in one of said ingress input messages is a BRM cell having ER, CI and NI fields, an internal connection number and a buffer address for the BRM cell, then calculating new ER, CI, NI values, and updating these in the BRM cell and outputting to the CM a cell ingress output message containing the updated BRM cell, ICN and buffer address for storage in cell memory and subsequent queueing by the QMS; wherein the components of the switch are in communication with each other through common buses, and wherein all of said above messages are communicated through said common buses.

According to a third broad aspect, the invention provides an APS (ABR (available bit rate) processing system) for implementing ABR flow control functionality within an ATM (asynchronous transfer mode) switch which receives cells of a first type, these being cells received from a network and destined for a switching fabric and which receives cells of a second type, these being received from the switching fabric and destined for the network, the APS comprising: one or more hardware devices for performing a first subset of the ABR flow control functionality in relation to cells of said first type; one or more hardware devices for performing a second subset of the ABR flow control functionality in relation to cells of said second type; wherein said first subset and said second subset collectively comprise all of the ABR flow control functionality.

BRIEF DESCRIPTION OF THE DRAWINGS

Embodiments of the invention will now be disclosed with reference to the accompanying drawings, in which:

FIG. 19 is a cell flow diagram for an end-to-end BRM cell arriving at a switch in expansion mode from the network and progressing to the fabric;

FIG. 20 is a cell flow diagram for an end-to-end BRM cell arriving at a switch in expansion mode from the fabric and progressing to the network;

FIG. 21 is a cell flow diagram for an end-to-end FRM cell arriving at a switch in expansion mode from the network and progressing to the fabric;

FIG. 22 is a cell flow diagram for an end-to-end FRM cell arriving at a switch in expansion mode from the fabric and progressing to the network;

FIG. 23 is a cell flow diagram for a VD FRM cell arriving at a switch in expansion mode at a destination side of the fabric which is turned around into a BRM cell and proceeds back to the fabric;

FIG. 24 is a cell flow diagram for a VD BRM cell arriving at a switch in expansion mode from the fabric and progressing to the network;

FIG. 25 is a cell flow diagram for a VS BRM cell arriving at a switch in expansion from the destination side of the network;

FIG. 26 is a cell flow diagram for a VS FRM cell originating on a port on the destination side of the fabric and forwarding to the network;

FIG. 36 illustrates an overall chronology of the journey of a cell information block (CIB) through the architecture of FIGS. 34 and 35;

FIG. 37 illustrates an Input/Output Module (IOM) ingress CIB;

FIG. 38 illustrates a cell memory (CM) ingress CIB;

FIG. 39 illustrates a Translation, Usage Parameter Control, and Buffer Manager (TUB) ingress CIB;

FIG. 40 illustrates a Queue Management System (QMS) egress CIB;

FIG. 41 illustrates an Available Bit Rate (ABR) processing subsystem (APS) egress CIB;

FIG. 42 illustrates a TUB egress CIB;

FIG. 43 illustrates a CM egress CIB;

FIG. 44 illustrates an APS_QMS control update block (CUB);

FIG. 45 illustrates an APS_TUB CUB;

FIG. 46 illustrates an IOM_QMS CUB;

DETAILED DESCRIPTION OF THE PREFERRED EMBODIMENTS

Introduction to ABR

Figure 1:
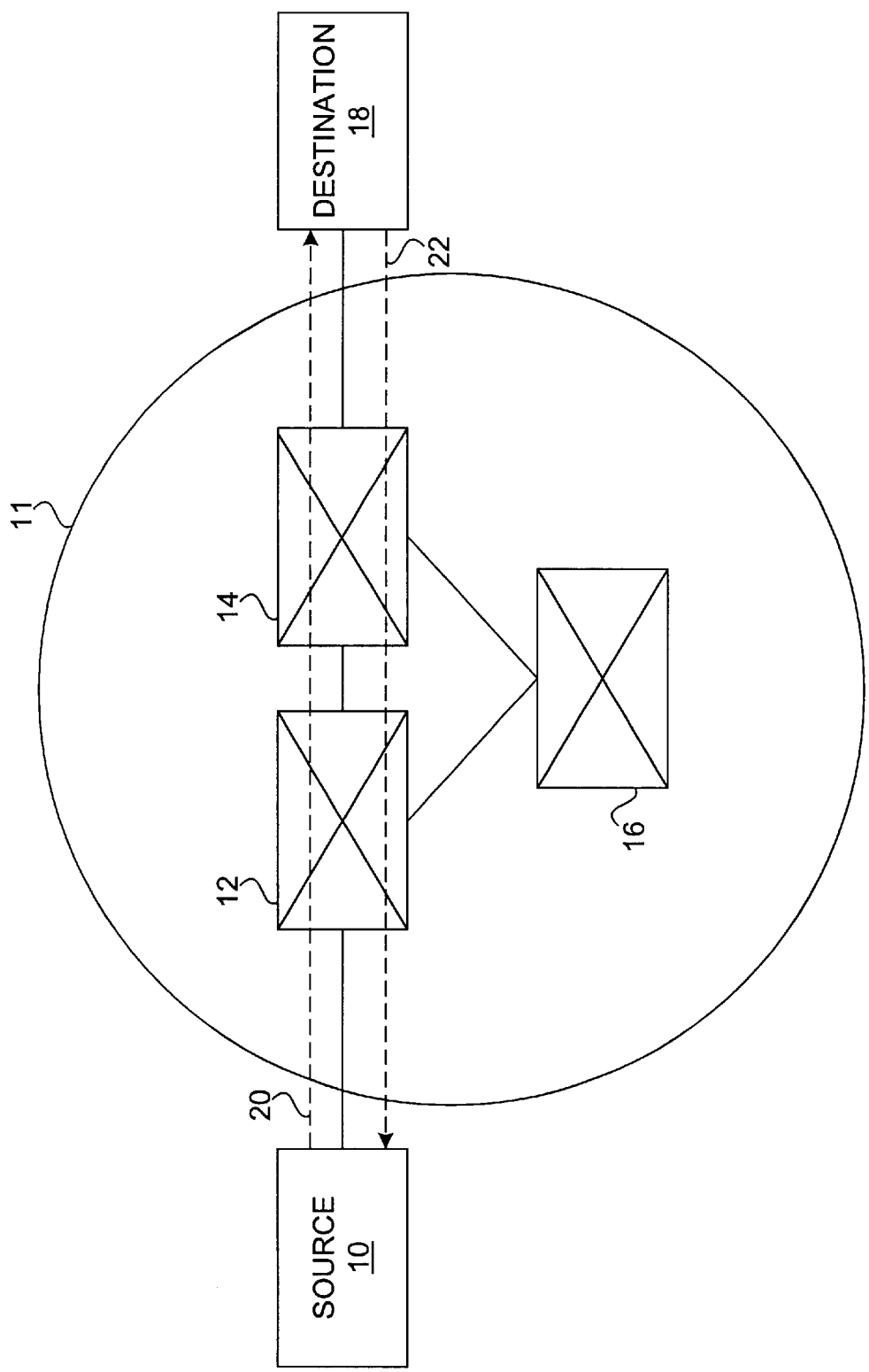
FIG. 1 is a block diagram of a conventional ATM network.

An example ATM network is shown in FIG. 1 and includes a source 10, a network 11 having a number of switches 12,14,16, and a destination 18. When the source 10 initially decides it needs to communicate with the destination 18, a forward virtual connection is established from the source to the destination and a reverse virtual connection is established from the destination to the source. The virtual connections simply consist of defined routes along which ATM cells will travel through the network 11 in a given direction. An example forward virtual connection is shown by a dotted line 20 and consists of the source 10, switch 12, switch 14, and destination 18 together with links connecting these elements. An example reverse connection is shown by a dotted line 22 and consists of the destination 18, switch 14, switch 12, and source 10, together with links connecting these elements. During the setup of the forward virtual connection 20, the source 10 may request an ICR(initial cell rate) and NRM (number of RM cells). The ICR is the initial cell rate at which the source 10 wants to transmit cells. The NRM determines the frequency with which RM cells are generated. An NRM of 32 for example means that every 32nd cell generated by the source 10 will be an RM cell. There may be some negotiation between the source 10, the switches 12, 14 and destination 18 before agreed upon values for ICR and NRM are established. An ICR and NRM for the reverse connection 22 will be similarly established.

The source 10 may then begin sending cells at the negotiated ICR. Every NRM cells, the source 10 generates an RM cell and transmits the cell towards the destination over the forward connection 20. While the RM cell is travelling to the destination 18 it is referred to as a FRM (forward RM) cell. At the destination 18, the RM cell is turned around and travels from the destination back to the source 10 along the reverse connection 22, and during this time it is referred to as a BRM (backwards RM) cell. The forward connection 20 carries the source's traffic cells, the source's FRM cells, and the destination's BRM cells. The reverse connection 22 carries the source's BRM cells, and the destination's traffic cells and the destination's FRM cells. Of course, "source" and "destination" are just logical roles associated with an end-system. In fact, a particular end-system can be either a source, a destination or both.

The remaining discussion will deal specifically with source 10 generated traffic and RM cells. These will include source 10 --> destination 18 traffic cells, the source's FRM cells, and the source's BRM.

Each switch can update the ER in an RM cell which passes through it. There are different approaches to the update of ER. It may be done on the forward connection 20, to the FRM cell, or on the reverse connection 22 to the BRM cell.

When the source 10 receives the BRM cell, it reads the ER in the BRM cell and adjusts its ACR (allowed cell rate) accordingly. The ACR is the maximum rate at which the source may send cells and is initially set to equal the ICR. It will then adjust its CCR (current cell rate) if necessary to ensure that it is less than or equal to the ACR. The CCR is the rate at which the source is actually transmitting cells. If the new ACR is below the CCR then the CCR must be decreased. If the new ACR is above the previous CCR, then the CCR may be increased.

Each switch can also update the CI/NI parameters in an RM cell which passes through it. When the source 10 receives the BRM cell, it reads the CI/NI parameters in the BRM cell and adjusts its ACR according to a standardized algorithm discussed below. It will then adjust its CCR if necessary to ensure that it is less than or equal to the ACR. If the new ACR is below the CCR then the CCR must be decreased. If the new ACR is above the previous CCR, then the CCR may be increased.

Each of the parameters CI and NI are binary parameters having either a "0" or a "1" value. The manner by which ACR is adjusted by the source may be summarized in the following table:

| CI | NI | ACR Adjustment |
| --- | --- | --- |
| 0 | 0 | ACR = ACR + PCR * RIF |
| 0 | 1 | ACR = ACR |
| 1 | X (don't care) | ACR = ACR − ACR * RDF |

In the above table, PCR is a peak cell rate, RIF is a rate increase factor, and RDF is a rate decrease factor. PCR is the maximum allowable instantaneous cell rate. The adjustments are made subject to the constraints that ACR can not be set lower than the MCR (minimum cell rate) for a connection, and it cannot be set larger than the PCR for the connection. Thus, it can be seen that when CI and NI are both zero the ACR is increased, when CI is zero and NI is one the ACR is left as it is, and when CI is one the ACR is decreased. The CCR may be set to the value indicated in the ACR adjustment or to some smaller value if the source has some reason for doing so.

RM cells are generated on a per ABR connection basis. An ATM switch may have a plurality of input ports and a plurality of output ports. Each input port receives ingress cells, possibly including ABR traffic and RM cells from a number of connections. The switch routes the ingress cells from all of the input ports to the appropriate output ports where they exit the switch as egress cells. It is important that the traffic being routed to a particular output port does not exceed that output port's capacity for extended periods of time.

Each port has a fixed output capacity. At any instant in time, portions of this capacity must be allocated to various traffic classes including for example VBR, CBR and ABR. Each virtual connection of any type including ABR is always guaranteed its MCR. For each port, high priority traffic such as VBR and CBR is serviced first. The MCR for ABR connections may be also considered part of the high priority traffic to be serviced by the port. Any traffic on an ABR connection above and beyond the connection's MCR is lower priority traffic, or "ABR elastic traffic".

The design of the APS makes certain assumptions about the existence of certain other ATM functional blocks. More specifically, the APS expects separate blocks to perform cell buffering, policing, translations, and queue management, per connection shaping, and scheduling. The need for other blocks which perform per connection queueing and shaping is necessary for VS/VD support.

The New ABR Architecture

Figure 2:
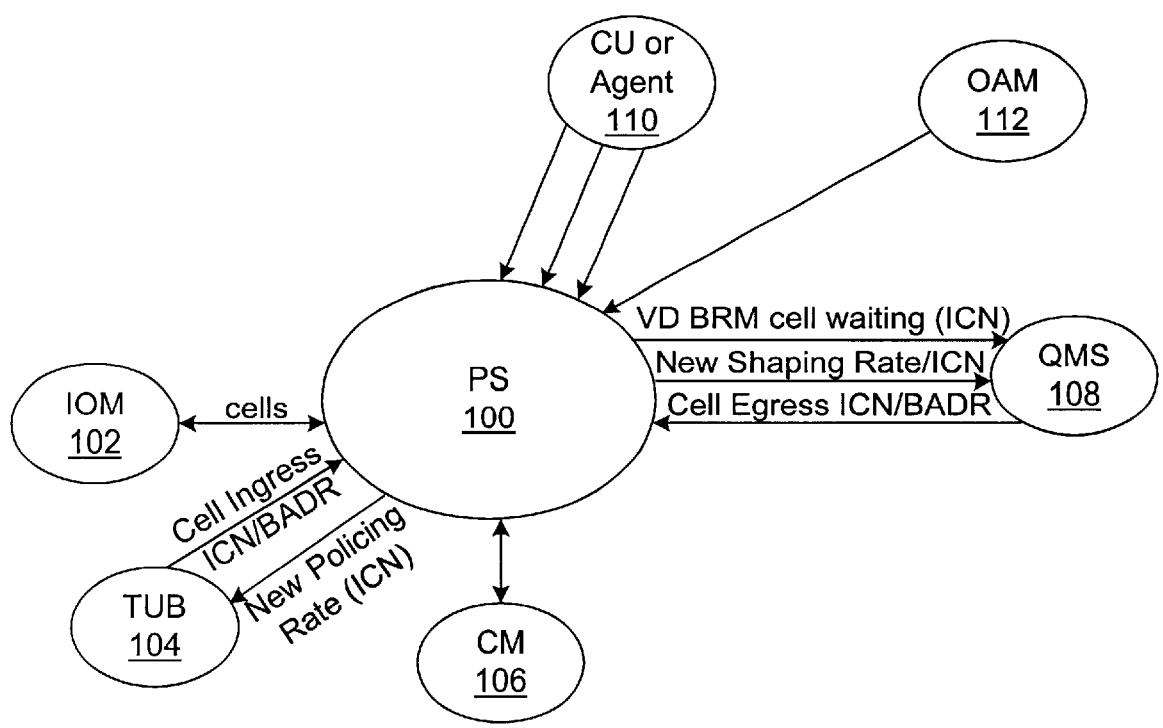
FIG. 2 is a functional context diagram of an ATM switch having an APS (available bit rate processing system) according to an embodiment of the invention.

Referring now to FIG. 2, a context diagram for an APS (ABR processing subsystem) 100 according to an embodiment of the invention is shown to include an IOM (input/output management) block 102 which handles the interfaces from the switch's ports to the APS, a TUB (ingress and egress translations, UPC policing, and buffer management) block 104, a CM (cell memory) block 106 for cell storage, a QMS (queue management, scheduling and shaping) block 108, a CU (computing unit—may be a microprocessor or agent) block 110 and an OAM (operations administration & maintenance) block 112. The APS is implemented as one or more processing elements. These may be ASICs (application specific integrated circuits), FPGAs (field programmable gate arrays), or micro processors running firmware, for example. The choice of what type of processing element to use is based upon considerations such as speed, power and desired flexibility. Within each processing element is a number of processing blocks. In an ASCI or FPGA this would be a chunk of hardware dedicated to a particular function, while in a microprocessor implementation this would be a chunk of hardware of firmware which runs a particular function. The other blocks are essential for the APS to operate, but the implementation of the other blocks is not important except for the nature of their interfaces with the APS. FIG. 2 only shows interfaces between various blocks and does not show interfaces from one of the various blocks to another although it is to be understood that these would exist. These interfaces to be APS will be briefly described by way of overview. The IOM 102 interfaces with the APS to transmit cells between ports on the switch and the APS. The TUB 104 is used to determine ingress ICNs (internal connection numbers) and buffer addresses and also polices incoming traffic at policing rates defined by the APS for each ICN. The CM 106 is used to temporarily store cells. The QMS 108 passes cell egress ICNs and buffer addresses to the APS, receives new shaping rates(ICN) from the APS, and receives indications from the APS that a VD BRM cell is waiting. The CU 110 is used to update persistent data in the APS. The components to which the APS is interfaced may be partitioned in a similar manner to the APS, or they may be realized as an amorphous functional entity or entities. There are many ways by which the APS can be physically interconnected to the other functional blocks. For example, one technique for implementing the interfaces would be to use a series of discrete connections realized as circuit traces on circuit cards. Preferably, and for the purposes of this example, all the functional blocks including the APS are connected to a common bus or buses which allows the blocks to exchange information easily. Such a common bus is described in detail below under the heading "preferred Switch Architecture". It is to be understood that the application of the APS provided by this embodiment of the invention is not limited to such an environment.

Figure 3A:
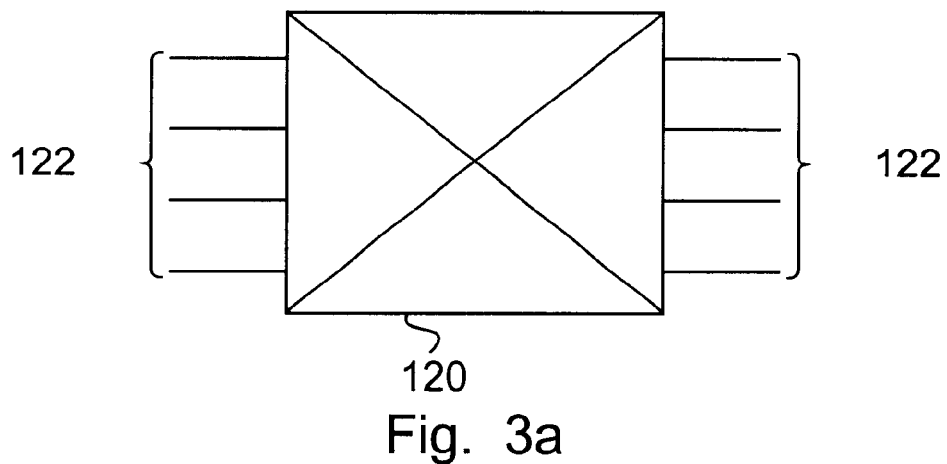
FIG. 3a is a schematic of the ports of an ATM switch in a stand-alone configuration.
Figure 3B:
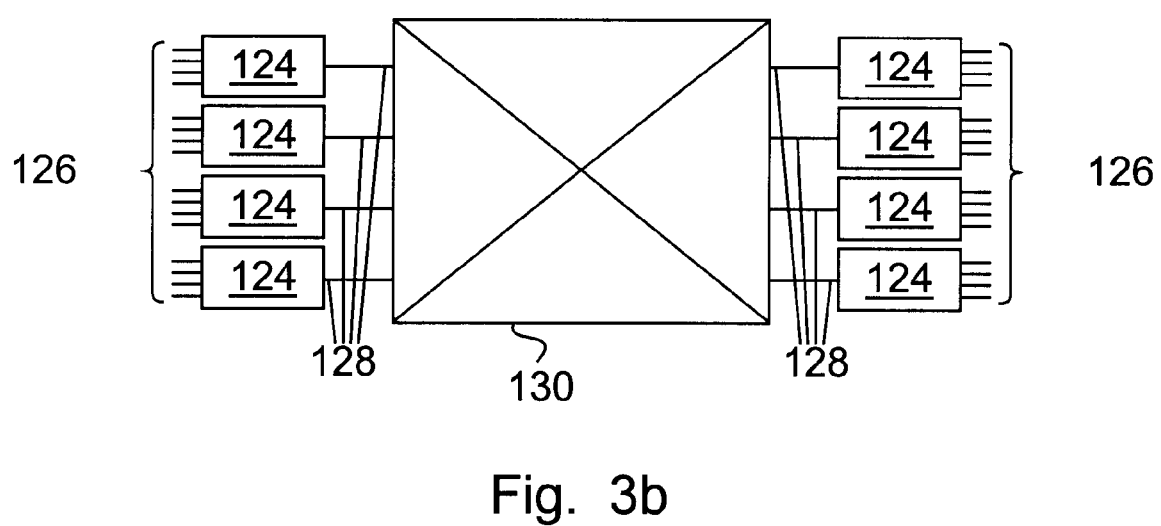
FIG. 3b is a schematic of the ports of an ATM switch in expansion mode configuration.

The APS may form part of a switch which is a stand alone switch in a network. Alternatively, it may form part of a switch which is connected to a larger switching fabric in which case it will be referred to as an expansion mode switch. These two cases are illustrated in FIGS. 3A and 3B respectively. The switch 120 in FIG. 3A is a standalone switch having a number of network ports 122. The expansion mode switches 124 in FIG. 3B each have a number of network ports 126, and have a high capacity I/O port 128 connected to a switching fabric 130 (the switching fabric may be a cross-connect for example). The standalone switch 120 may for example be a 2.5 Gbps switch with 4 or 16 ports. The expansion mode switches 124 may for example be comprised of 2.5 Gbps switching ports each having 4 or 16 network interfaces 126 and a single 2.5 Gbps port 128 connected to the switching fabric 130.

Figure 4A:
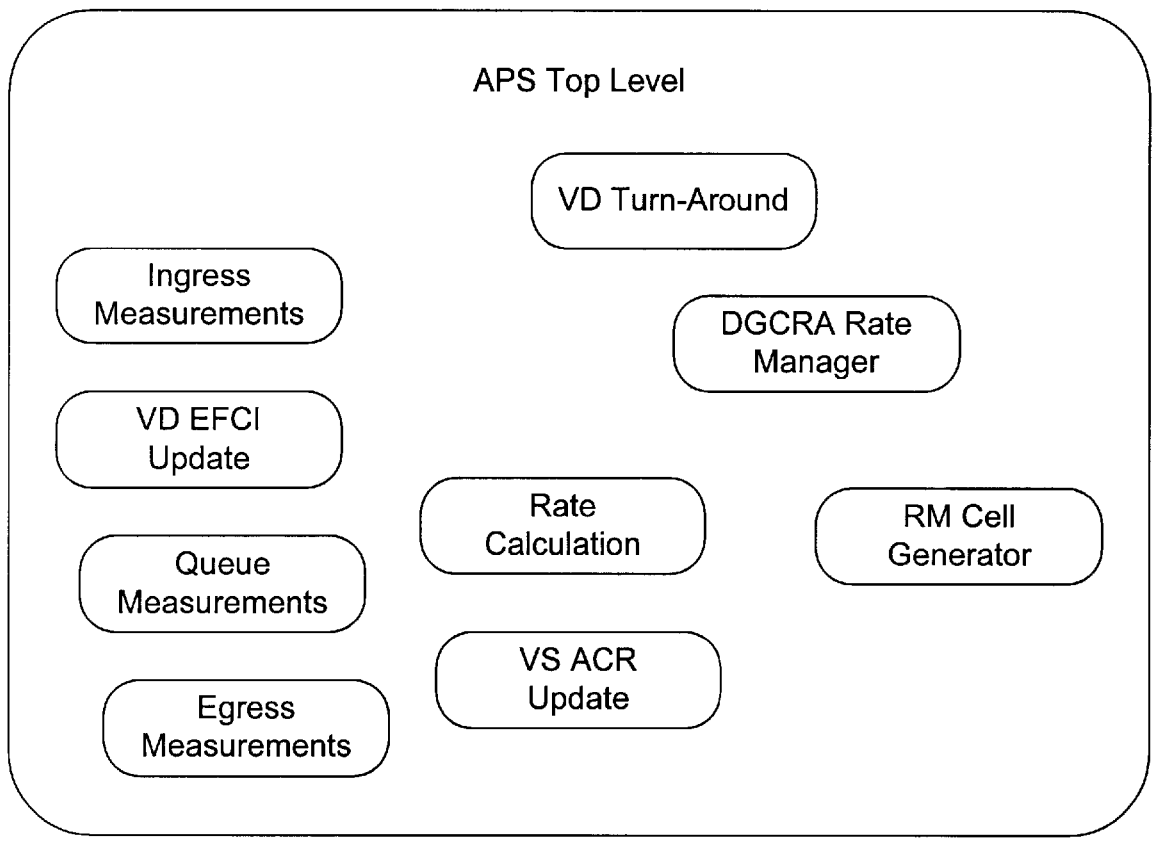
FIG. 4a is a top level block diagram of the APS of FIG. 2.

A top level block diagram showing the sub-blocks that reside in the APS is shown in FIG. 4A. A detailed description of the sub-blocks is provided below in the form of pseudocode listings. The blocks include:

Ingress Measurements;
Egress Measurements;
VD EFCI Update;
Queue Measurements;
Rate Calculation;
VS ACR Update;
VD Turn-around;
DGCRA Rate Manager; and
RM Cell Generator.

Logical Interfaces

Figure 4B:
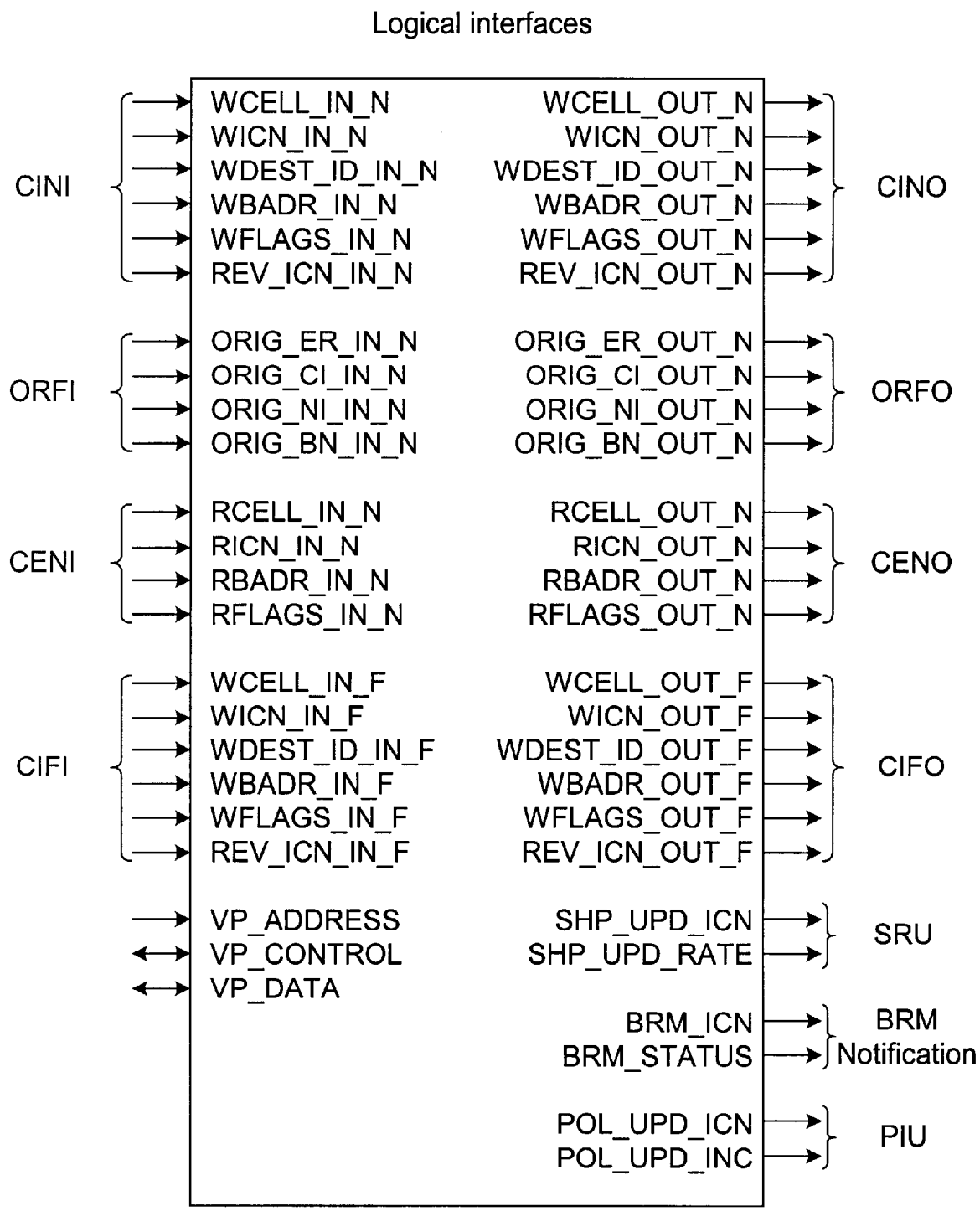
FIG. 4b is a summary of the logical interfaces of the APS of FIG. 2.

The logical interfaces of the APS are illustrated in FIG. 4B and they are described in "Table 1 Logical Interface Description". In the table, the logical I/O associated with cell ingress flows ends in either '_N' or '_F'. These suffixes distinguish from which I/O an ingress cell is coming. The '_N' suffix is associated with ingress cell flow I/O coming from the network. The '_F' suffix is associated with ingress cell flow I/O coming from the fabric. When the APS is deployed in a stand-alone switch which is not connected to a fabric, the '_F' logical I/O are not in use. The '_N' and '_F' logical I/O are later grouped into higher-level logical messages.

TABLE 1

Logical Interface Description

| Name | Type | Description |
|---|---|---|
| WCELL_IN_N [53:0] [7:0] | Input | Ingress write cell input for a cell from the network interface. |
| WICN_IN_N [16:0] | Input | Write Internal Connection Number (ICN) input for a cell from the network interface. Indicates an ingress cell belongs to a given connection. Used to address per connection memory access. |
| WDEST_ID_IN_N [11:0] | Input | Write destination ID input for a cell from the network interface. Indicates an ingress cell destined for a given fabric egress port. |
| WBADR_IN_N [16:0] | Input | Write Buffer Address (BADR) input for a cell from the network interface. Indicates an ingress cell at a given BADR. |
| WFLAGS_IN_N [15:0] | Input | Write Flags input for a cell from the network interface. Miscellaneous control signals. Those of interest to APS are: WVALID CELL_IS_FRM, CELL_IS_BRM, CONN_IS_VS, CONN_IS_VD |
| REV_ICN_IN_N [16:0] | Input | Reverse Internal Connection Number (ICN) input for a cell from the network interface. If the cell is a FRM or data ABR cell, REV_ICN indicates the ICN on which the connections BRM cell travel. If the cell is a BRM, REV_ICN indicates the connection on which the cell's correspondiny FRM and data cells travel |
| ORIG_ER_IN_N [16:0] | Input | Original ER input for a cell from the network interface. In expansion rnode on VS/VD connections, this is needed to convey the original ER value of an ingress BRM cell since the original WCELL_IN_N which contained the ER is overwritten by APS1. |
| ORIG_CI_IN _N [16:0] | Input | Original CI input for a cell from the network interface. Same purpose as ORIG_ER_IN_N. |
| ORIG_NI_IN _N [16:0] | Input | Original NI input for a cell from the network interface. Same purpose as ORIG_ER_IN_N. |
| ORIG_BN_IN _N [16:0] | Input | Original BN input for a cell from the network interface. Same purpose as ORIG_ER_IN_N. |

TABLE 1-continued

Logical Interface Description

| Name | Type | Description |
| --- | --- | --- |
| WCELL_OUT_N [53:0] [7:0] | Input | Ingress write cell output for cell from the network interface. |
| WICN _OUT_N [16:0] | Input | Write Internal Connection Number (ICN) output for a cell from the network interface. See WICN_IN_N. |
| WDEST_ID_OUT_N [11:0] | Input | Write destination ID output for a cell from the network interface. See WDEST_ID_IN_N. |
| WBADR_OUT_N [16:0] | Input | Write Buffer Address (BADR)output for a cell from the network interface. See WBADR_IN_N. |
| WFLAGS_OUT_N [15:0] | Input | Write Flags output for a cell from the network interface. See WFLAGS_IN_N |
| REV_ICN_OUT_N [16:0] | Input | Reverse Internal Connection Number (ICN) output for a cell from the network interface. See REV_ICN_IN_N. |
| ORIG_ER_OUT_N [16:0] | Input | Original ER output for a cell from the network interface. In expansion mode on VS/VD connections, this is needed to convey the original ER value of an ingress BRM cell since the original WCELL_OUT_N which contained the ER overwritten by APS1. |
| ORIG_CI_OUT_N [16:0] | Input | Original CI input for cell from the network interface. Same purpose as ORIG_ER_OUT_N. |
| ORIG_NI_OUT_N [16:0] | Input | Original NI input for a cell from the network interface. Same purpose as ORIG_ER_OUT_N. |
| ORIG_BN_OUT_N [16:0] | Input | Original BN input for a cell from the network interface. Same purpose as ORIG_ER_OUT_N. |
| RCELL_IN_N [53:0] [7:0] | Output | Read egress cell input for a cell headed out to the network interface. |
| RICN_IN_N [16:0] | Input | Read ICN input for a cell headed out to the network interface. ICN of the scheduled connection. |
| RBADR_IN_N [16:0] | Input | Read Buffer Address (BADR)input for a cell headed out to the network interface. BADR or the scheduled cell. |
| RFLAGS_IN_N [15:0] | Input | Read Flags input for a cell headed to the network interface. Miscellaneous control signals. Those of interest to the APS are: RVALID CELL_IS_HP_AE, CELL_IS_FRM, CELL_IS_BRM |
| RCELL_OUT_N [53:0] [7:0] | Output | Read egress cell output for a cell headed out to the network interface. |
| RICN_OUT_N [16:0] | Output | Read ICN output for a cell headed out to the network interface. See RICN_IN_N. |
| RBADR_OUT_N [16:0] | Output | Read BADR output for a cell headed out to the network interface. See RBADR_IN_N. |
| RFLAGS_OUT_N [15:0] | Output | Read Flags output for a cell headed out to the network interface. See RFLAGS_IN. |
| WCELL_IN_F[53:0] [7:0] | Input | Ingress write cell input for a cell from the fabric interface. |
| WICN_IN_F[16:0] | Input | Write Internal Connection Number (ICN) input for a cell from the fabric interface. See WICN_IN_N. |
| WDEST_ID_IN_F [11:0] | Input | Write destination ID input for a cell from the fabric interface. See WDEST_ID_IN_N. |
| WBADR_IN_F [16:0] | Input | Write Buffer Address (BADR) input for a cell from the fabric interface. See WBADR IN N. |
| WFLAGS_IN_F [15:0] | Input | Write Flags input for a cell from the fabric interface. See |

TABLE 1-continued

Logical Interface Description

| Name | Type | Description |
| --- | --- | --- |
| REV_ICN_IN_F [16:0] | Input | WFLAGS_IN_N.<br>Reverse Internal Connection Number (ICN) input for a cell from the fabric interface. See REV_ICN_IN_N. |
| WCELL_OUT_F [53:0](7:0] | Input | Ingress write cell output for a cell from the fabric interface. |
| WICN_OUT_F [16:0] | Input | Write Internal Connection Number (ICN) output for a cell from the fabric interface. See WICN_IN_N. |
| WDEST_ID_OUT_F [11:0] | Input | Write destination ID output for a cell from the fabric interface. See WDEST_ID_IN_N. |
| WBADR_OUT_F [16:0] | Input | Write Buffer Address (BADR)output for a cell frotn the fabric interface. See WBADR_IN_N. |
| WFLAGS_OUT_F [15:0] | Input | Write Flags output for a cell from the fabric interface. See WFLAGS_IN_N. |
| REV_ICN_OUT_F [16:0] | Input | Reverse Internal Connection Nutnber (ICN) output for a cell from the fabric interface. See REV_ICN_IN_N. |
| SHP_UPD_ICN [16:0] | Output | ICN which is getting a (VS) shaping rate update. |
| SHP_UPD_RATE [15:0] | Output | New rate at which the shaping block should shape cells on connection SHP_UPD_ICN. Applies to connections for which system is a VS. |
| BRM_ICN [16:0] | Output | Backwards RM cell ICN. ICN for which the APS is sending the QMS a BRM cell status update. |
| BRM_STATUS | Output | BRM cell status. Status indicating if there is a BRM cell waiting to be tumed around and therefore scheduled by the QMS. |
| POL_UPD_ICN [16:0] | Output | ICN which is receiving a policing inc. update for DGCPA. |
| POL_UPD_INC [15:0] | Output | New increment with which the policing block should police the ABR connection POL_UPD_ICN. New increment is to be applied immediately. |
| VP_ADDRESS | Input | Virtual Processor Address. The address bus of the virtual processor interface. |
| VP_CONTROL | Input | Virtual Process Control, Virtual processor interface control signals. |
| VP_DATA | Input | Virtual Processor Data. Virtual processor interface data bus. |

While the above table summarizes the logical interfaces to the APS, in practice there are physical interfaces as well. A preferred mechanism for realizing the physical interfaces is described in detail below under the heading "Preferred Switch Architecture".

Stand-alone Mode Functional Description

A functional description of the standalone operation of an APS according to an embodiment of the invention will be described with reference to FIGS. 5, 6 and 7.

Figure 5:
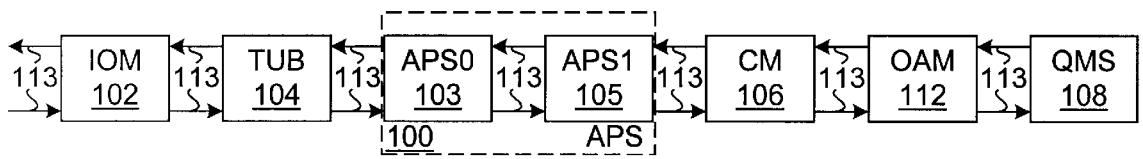
FIG. 5 is a block diagram of a switch in a stand-alone configuration including the APS of FIG. 2.

A possible example of a stand-alone switching element composed of ATM functional blocks communicating and connected via common buses is shown in FIG. 5. It is this switch architecture that is assumed to exist inside the switching elements 149, 169 found in FIG. 6 and FIG. 7 respectively. Of course, if systems or techniques other than common buses are used to communicate between functional components on the switching elements then a different architecture would be present inside the switches.

In this example, the components of FIG. 2 are connected together through common buses 113. It is assumed that the APS 100 is realized as two application specific integrated circuits APS0 103 and APS1 105. In both stand-alone and expansion applications, the APS allows for a single ASIC solution to provide all ABR related processing in a system except for VS/VD. If VS/VD functionality is required, a second instance of the APS ASIC may be deployed. As technology advances to provide higher component integration, increased memory and memory interface speeds and/or improved I/O densities, it may be possible to evolve the APS to allow for a single ASIC solution that also supports VS/VD. Throughout the remainder of this description the term APS may be used to either refer to both APS0 and APS1 collectively or just to APS0 since it does the majority of the ABR functionality. Only when necessary, are the terms APS1 and APS0 used to distinguish between the two separate instances of the APS. Incoming cells arrive at the IOM block 102 from where they are forwarded if necessary through each of the blocks in forward or reverse sequence, these being the TUB 104, APS0 103, APS 105, CM 106, OAM 112, and QMS 108. All information flow between the switch components occurs over the common buses 113.

Figure 6:
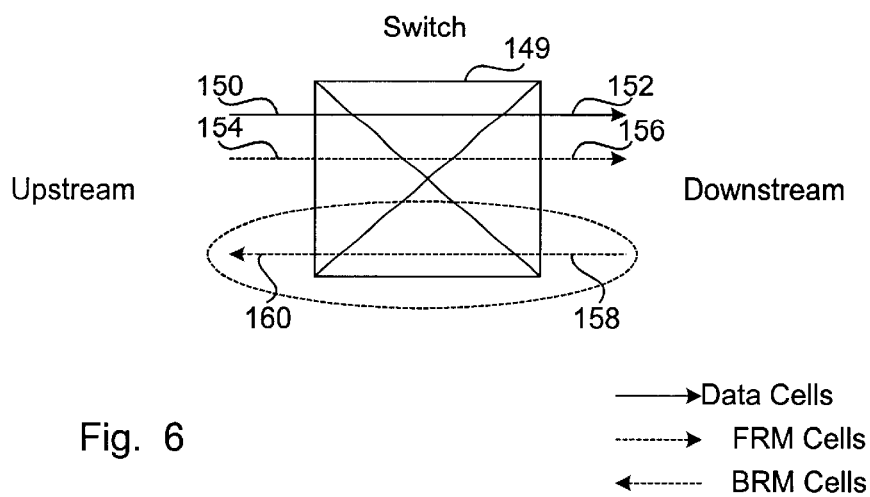
FIG. 6 is a cell flow diagram for end-to-end flow control through a stand-alone switch.

Referring now to FIG. 6, an example stand alone switching element 149 containing the architecture of FIG. 5 has a data cell ingress flow 150, a data cell egress flow 152, an FRM ingress cell flow 154, an FRM cell egress flow 156, a BRM ingress flow 168, and a BRM egress flow 160. When the APS is participating in end-to-end flow control on a connection, it only alters the BRM cells and does not affect the flow of FRM or data cells. On BRM cell ingress, the APS 100 calculates the new ER or CI/NI (Congestion Indication/No Increase) fields for the cell, calculates new CRC-10, and sends it to the CM 106 for storage. The flow of information between the APS 100 and other blocks is described in further detail below.

Figure 7:
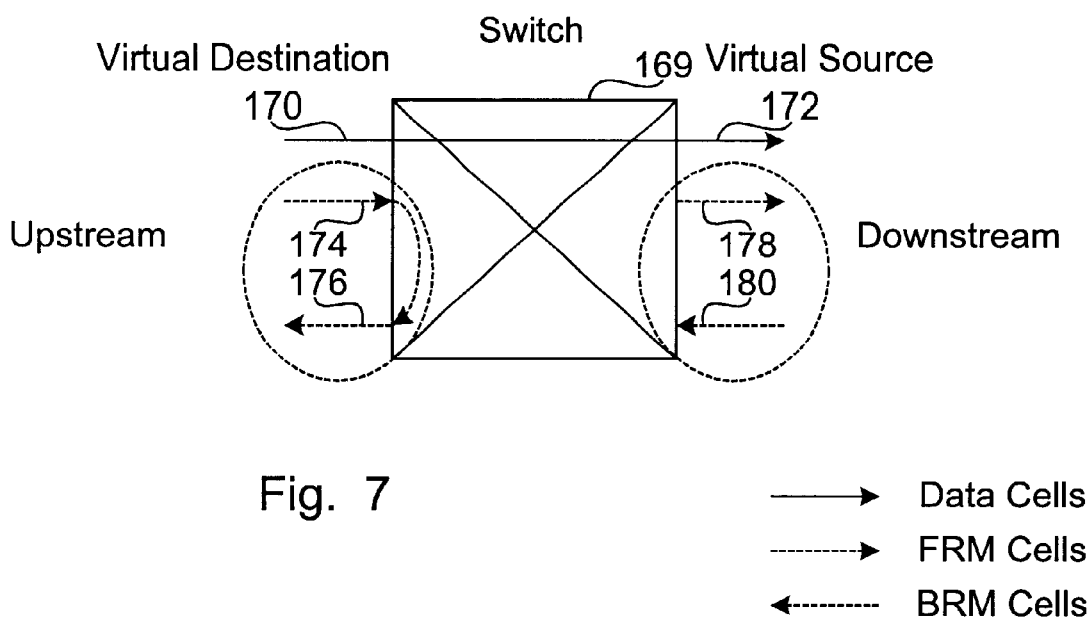
FIG. 7 is a cell flow diagram for VS/VD flow control through a stand-alone switch.

FIG. 7 illustrates the generic VS/VD behaviour. The data flows for this example include data cell ingress 170 to the virtual destination, and data cell egress 172 from the virtual source, FRM cell ingress 174 for the VD which is turned around and sent out as BRM cell egress 176 from the VD, and FRM cell egress sent 178 out from the VS and which is eventually received back as BRM cell ingress 180. When the APS 100 is acting as a VS for a connection, it updates the shaping rate used by the QMS to reflect changes in the connection's Allowed Cell Rate (ACR). These shaping rate updates occur on FRM cell egress from the VS and on BRM cell ingress to the VS.

When the APS 100 is configured to perform VD functions for a connection, APS0 103 receives FRM cells, calculates new ER, CI, and NI fields, calculates new CRC-10 and then forwards them towards APS1 105 for storage as BRM cells. The QMS block 108, which is responsible for the correct scheduling (as per ATM Forum end system behaviour rules) of the BRM cells, eventually dequeues and initiates the egress of the turn-around BRM cell from the APS 100. If an FRM cell is received while another turn-around BRM cell is waiting to leave the node, the new FRM is updated and replaces the old cell. By means of exchanging a status message, the APS 100 is capable of ensuring that the QMS 108 does not initiate more turn-around BRM cell departures than there were incoming FRM cells received.

When the APS 100 is configured to perform VS functions for a connection, it relies on the scheduler to schedule a FRM cell every NRM (cell frequency at which FRM cells are inserted) cells and then the APS generates the FRM cell and sends it to the IOM block.

The APS 100 can support both ER and CI/NI (relative rate) ABR rate flow control. Only one of these two flow control forms is supported at a time and is configurable on a per connection basis. For ER and relative rate ABR connections, decisions for setting the values of the CI/NI bits may be based on per port queue fill measurements and input and output rates, for example as disclosed in a copending U.S. application entitled "Congestion Indication/No Increase (CI/NI) ABR Flow Control for ATM Switches" which was filed on Dec. 30, 1997, which is assigned to the same assignee as this application, and which is hereby incorporated by reference. In ER mode, new ER values may be calculated using an MCR plus weighted fair-share algorithm for example as disclosed in a copending U.S. application entitled "Elastic Bandwidth Explicit Rate (ER) ABR Flow Control for ATM Switches" which was filed on Dec. 30, 1997 which is assigned to the same assignee as this application and which is hereby incorporated by reference. Other CI/NI and ER calculation methods may alternatively be employed.

Input rate and queue fill measurements mentioned above are performed per port and include only the ABR connections. Output rate measurements are performed per port on traffic that is considered higher priority than ABR and are utilized in determining how much bandwidth can be allotted to ABR traffic.

Coupling of ER rates between VSs and VDs is achieved via a configurable coupling factor which couples the ER sent back from the VD to the Allowed Cell Rate (ACR) being used at the VS.

Preferably, the APS 100 is configured to support DGCRA (dynamic generic cell rate allocation) and in so doing the APS monitors the Current Cell Rate (CCR) in FRM cells of a connection in order to determine what rates are used in the GCRA policer (external to the APS) forming part of the TUB block 104. When the CCR is received, the APS compares it to the connection's MCR and PCR and updates the GCRA policer by sending a new increment (reciprocal of rate) and its corresponding connection number. This method relies on the value of CCR placed in the forward RM cells by the source and is therefore vulnerable to sources who incorrectly represent their CCR and is less than optimal in this case. DGCRA algorithms are not currently feasible to implement in hardware and the approach mentioned above is used until a more thorough algorithm is implementable. When a more optimal DGCRA algorithm (source ACR emulation behaviour based) is designed, it may be appropriate to implement it in a separate device which connects to and communicates with the APS and other blocks via the common bus.

Software control (including insertion of out-of-rate RM cells) and configuration of the APS is carried out through Common Control Packets (CCP) which are terminated in the APS by a Virtual Processor Handler (VPH), a common macro function, which translates between the CCPs and the virtual processor bus (VP_ADDRESS, VP_CONTROL, VP_DATA).

Expansion Mode Functional Description

Figure 8:
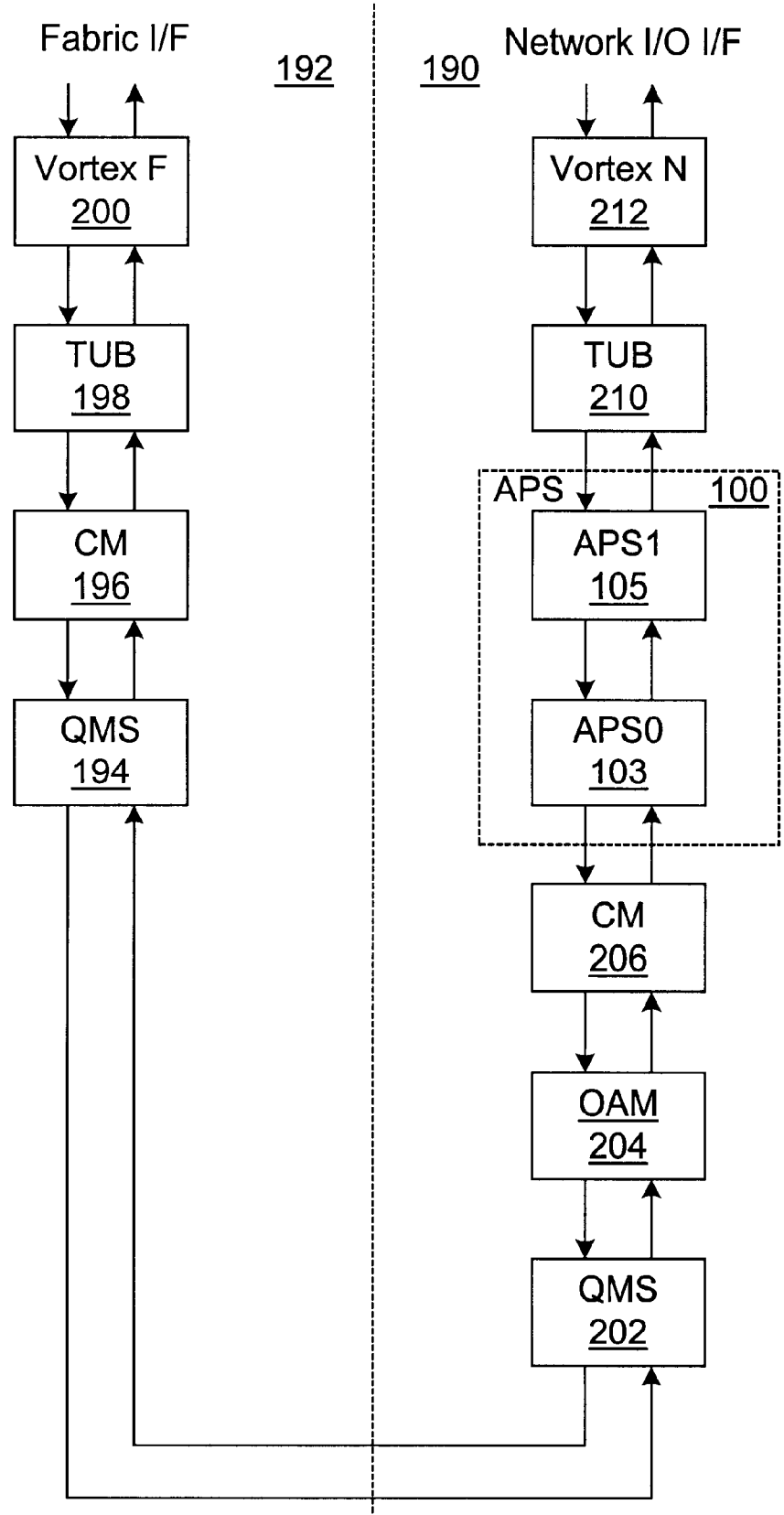
FIG. 8 is a block diagram of a switch in expansion mode configuration including the APS of FIG. 2.

The APS operates in expansion mode when it is used within a port connected to a switch fabric. The architecture used for a port connected to a switching fabric differs from the stand-alone architecture and as a result, the operation of the APS differs when it is in expansion mode. This is because for a given connection, there will be a source side switch having a port connected to the fabric which is then connected to a port of a destination side switch. The fabric contains minimal intelligence and so the source side switch and the destination side switch must together implement the ABR functionality in a manner which resembles that of a stand-alone switch. FIG. 8 shows the ATM functional blocks composing a possible fabric switch port and the manner in which they are communicating via common buses. The functionality has been divided into functionality on the "right side of the port" 190 and functionality on the "left side of the port" 192. The left side of the port 192 includes a QMS 194, CM 196, TUB 198, and Vortex F 200. The right side of the port 190 includes a QMS 202, OAM 204, CM 206, APS 100 consisting of APS0 103 and APS1 105, TUB 210, and Vortex N 212. The functional blocks found on the right side of the port 190 are the same as those found in the stand-alone switching element of FIG. 5 except for the addition of the vortex component (labelled Vortex N 212) and the apparent removal of the IOM. Vortex N 212 basically renames the IOM block 102 of FIG. 5 and interfaces to physical network I/O circuitry. The functional blocks on the left side of the port 192 are added to interface to the fabric. During normal cell processing (here normal means other than ABR) the TUB 210 on the right side of the port 190 and CM 196 and QMS 194 on the left side of the port 192 are involved in processing cells that are arriving from the network and proceeding to the fabric. The TUB 198 on the left side of the port 192 and CM 206 and QMS 202 on the right side of the port 190 are involved in the normal cell processing of cells proceeding from the fabric to the network. Components on the right side of the part handle cells arriving form a network port and proceeding out a network port. This case is basically that of FIG. 5. ABR related processing is handled by the APS 100 which is on the right side of the port 190. A distinction is made between ABR related processing performed on ingress into the fabric and on the egress from the fabric.

In the expansion mode architecture of FIG. 8, the order of APS0 and APS1 has been swapped from the stand-alone case illustrated in FIG. 5. This is a result of the direction of FRM cell flow and the way in which turn-around RM cells are handled in expansion mode which is explained later. As in stand-alone mode, it is once again possible to de-populate APS1 if VS/VD behaviour is never going to be required.

Figure 9:
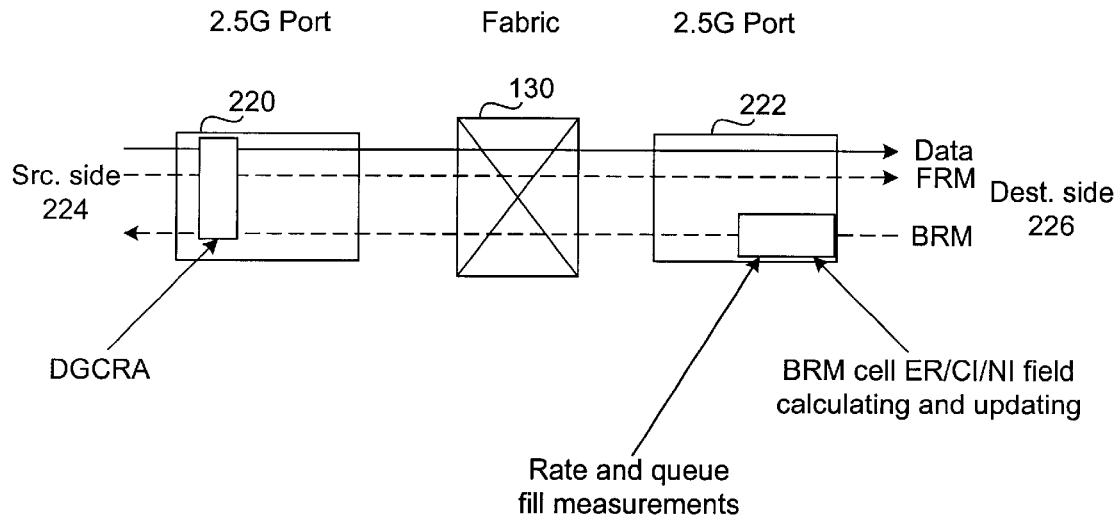
FIG. 9 is a cell flow diagram for end-to-end flow control through switches in expansion mode.
Figure 10:
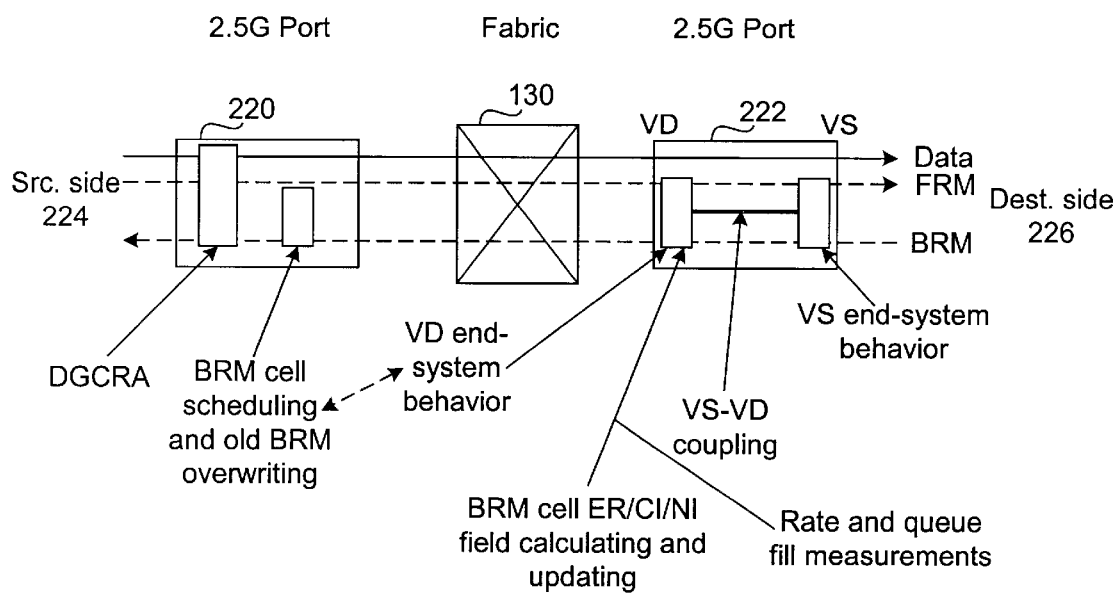
FIG. 10 is a cell flow diagram for VS/VD flow control through switches in expansion mode.

From a black box point of view, the ABR functionality provided by the APS in the context of a fabric-based switch with 2.5 Gbps switching ports is the same as that provided by the APS when it is deployed in a 2.5 Gbps stand-alone switching element. However, since the cells passing through a fabric-based switch pass through an ingress switching port, the fabric, and then an egress switching port (which could be the same as the ingress), it is necessary to decide which ABR functionality is performed on the ingress side of the fabric and which is performed on the egress side. FIGS. 9 and 10 illustrate an arrangement consisting of a source-side switch 220, a switching fabric 130 and a destination side switch. ABR data and cells passing through such an arrangement are received through a network port of switch 222, sent out a fabric port through the fabric 130 into a fabric port of switch 222, and out a network port. Both of these figures label a source side 224 and a destination side 226 of the fabric 130. The source and destination sides of the fabric 130 are determined by which direction the data, FRM, and BRM cells are flowing. For simplicity, the directions for a single uni-directional connection are shown but it can be assumed that ABR connections can and will exist in uni-directional pairs travelling in opposite directions.

For end-to-end connections (non-VS/VD) the BRM cells are updated by the port on the destination side of the fabric. This also means that it is this port which monitors and measures the input and queue fills for ABR traffic as well as output rates for higher priority traffic. The decision to perform the measurements, BRM calculations, and updating on the destination side of the fabric is due to the fact that the ER and RR algorithms calculations are egress port based and this is the only point the APS can easily perform and compile all the measurements it needs. DGCRA is performed at the switching port on the source side of the fabric. This is necessary for two reasons: 1) DGCRA algorithms need to be aware of the times at which BRM cells leave the switch for the source (the destination side of the switch would have been an inaccurate place to acquire these times) and 2) policing needs to be performed on the data and FRM cells on the source side of the switch before possibly being reshaped as they pass through the fabric.

Referring to FIG. 10, VS/VD control loop segmentation occurs on the switching port on the destination side of the fabric. This means that the VS and VD end-system behaviours, VS-VD rate coupling, rate and queue fill measurements, and BRM cell field calculations and updating all occur on the destination side of the fabric. As in the end-to-end case, DGCRA is once again performed on the port on the source side of the fabric. Scheduling BRM cells (to ensure proper ordering of FRM, BRM, and data cells) and overwriting the contents of BRMs already waiting for transmission are performed on the source side of the fabric, in addition to the destination side.

Although FIG. 9 and FIG. 10 show some ABR processing occurring on the switching port on the source side of the fabric and other processing occurring on the destination side of the fabric, the intention is to have only one APS 0/APS 1 pair per switching port as shown in FIG. 6.

Input and Output Messages

The logical interfaces of FIG. 4B may be grouped into various input and output messages.

Input Messages

Original Rate Fields Input (ORFI) Message
Destination: block(s) performing queueing and scheduling
Contents: ORIG_ER_IN_N, ORIG_CI_IN_N, ORIG_NI_IN_N, ORIG_BN_IN_N
Description: This message contains a copy of the original ER, CI, and NI fields from a received WCELL_IN_N. The need for the copy is that the original WCELL_IN_N is modified by APS 1 when the APS is a VS and the original ER, CI, and NI no longer exist in WCELL_IN_N by the time APS 0 sees it. This message is generated only in expansion mode and it is generated by APS 1 then used for ACR update calculation and removed from the bus by APS 0. Depending on the application in which an instance of the APS is being used, the APS can be required to handle up to four of these messages every CS-800 cell time.

Cell Ingress From Network Input (CINI) Message
Source: block(s) performing translations, policing and buffer management
Contents: WCELL_IN_N, WBADR_IN_N, WICN_IN_N, WDEST_ID_IN_N, WFLAGS_IN_N, REV_ICN_IN_N
Description: Informs the APS of the arrival of a cell from a network interface. The APS examines the contents to determine if the cell is of any concern to itself and what it should do as a result. Depending on the application in which an instance of the APS is being used, the APS can be required to handle up to four of these messages every CS-800 cell time.

Cell Ingress From Fabric Input (CIFI) Message
Source: block(s) performing translations, policing and buffer management
Contents: WCELL_IN_F, WBADR_IN_F, WICN_IN_F, WDEST_ID_IN_F, WFLAGS_IN_F, REV_ICN_IN_F
Description: Informs the APS of the arrival of a cell from a fabric interface. The APS examines the contents to determine if the cell is of any concern to itself and what it should do as a result. Depending on the application in which an instance of the APS is being used, the APS can be required to handle up to four of these messages every CS-800 cell time.

Cell Egress To Network Input (CENI) Message
Source: block(s) performing scheduling and translations
Contents: RCELL_IN_N, RICN_IN_N, RBADR_IN_N, RFLAGS_IN_N
Description: Informs the APS of the initiation of an egress cell destined for the network interface. The APS examines the contents to determine if the cell is of any concern to itself and what it should do as a result. One possible outcome is that the APS is required to produce an output cell in a cell ingress from network output message. Depending on the application in which an instance of the APS is being used, the APS can be required to handle up to four of these messages every CS-800 cell time.

Output Messages

BRM Notification Message
Destination: block(s) performing queueing and scheduling
Contents: BRM_ICN, BRM_STATUS
Description: Informs the queuing/scheduling block that the connection BRM_ICN has a turn-around BRM cell waiting to be scheduled and transmitted. Depending on the application in which an instance of the APS is being used, the APS can generate up to eight of these messages every CS-800 cell time.

Policing Increment Update (PIU) Message
Destination: block(s) performing UPC policing
Contents: POL_UPD_INC, POL_UPD_ICN
Description: Instructs the policing block to begin policing connection POL_UPD_ICN with the new increment POL_UPD_INC. Depending on the application in which an instance of the APS is being used, the APS can generate up to four of these messages every CS-800 cell time.

Shaping Rate Update (SRU) Message
Destination: block(s) performing shaping and scheduling
Contents: SHP_UPD_RATE, SHP_UPD_ICN Description: Instructs the shaping and scheduling block(s) to begin shaping connection SHP_UPD_ICN at the new rate SHP_UPD_RATE. Depending on the application in which an instance of the APS is being used, the APS can generate up to eight of these messages every CS-800 cell time.

Original Rate Fields Output (ORFO) Message
Destination: block(s) performing queueing and scheduling
Contents: ORIG_ER_OUT_N, ORIG_CI_NI_OUT_N, ORIG_BN_OUT_N
Description: This message contains a copy of the original ER, CI, and IN fields from a received WCELL_IN_N. The need for the copy is that the original WCELL_IN_N is modified by APS 1 when the APS is a VS and the original ER, CI, and NI no longer exist in WCELL_IN_N by the time APS 0 sees it. This message is generated only in expansion mode and it is generated by APS 1 then used for ACR update calculation and removed from the bus by APS 0. Depending on the application in which an instance of the APS is being used, the APS can be required to handle up to four of these messages every CS-800 cell time.

Cell Ingress From Network Output (CINO) Message
Destination: block(s) performing queueing and scheduling
Contents: WCELL_OUT_N, WICN_OUT_N, WBADR_OUT_N, WDEST_ID$_{OUT}$_N, WFLAGS_OUT_N, REV_ICN_OUT_N
Description: This message is usually just a forwarding of the cell ingress from network input message for blocks which have not seen it before it has reached the APS, typically queueing and scheduling blocks. When the message corresponds to a BRM cell though, the WCELL_OUT_N field has been modified by the APS to include a rate update calculated by the APS. Depending on the application in which an instance of the APS is being used, the APS can generate up to four of these messages every CS-800 cell time.

Cell Ingress From Fabric (CIFO) Output Message
Destination: block(s) performing queueing and scheduling
Contents: WCELL_OUT_F, WICN_OUT_F, WBADR_OUT_F, WDEST_ID$_{OUT}$_F, WFLAGS_OUT_F, REV_ICN_OUT_F
Description: This message is usually just a forwarding of the cell ingress from fabric input message for blocks which have not seen it before it has reached the APS, typically queueing and scheduling blocks. When the message corresponds to a BRM cell though, the WCELL_OUT_N field has been modified by the APS to include a rate update calculated by the APS. Depending on the application in which an instance of the APS is being used, the APS can generate up to four of these messages every CS-800 cell time.

Cell Egress From Network Output (CENO) Message
Destination: block(s) performing OAM, translations, cell buffering and CRC-10 calculation
Contents: RCELL_OUT_N, RICN_OUT_N, RBADR_OUT_N, RFLAGS_OUT_N
Description: This message is usually just a forwarding of the cell ingress from fabric input message for blocks which have not seen it before it has reached the APS, typically queueing and scheduling blocks. When the message corresponds to an FRM cell on a connection for which the APS is a VS, this message does contain a FRM cell generated by the APS. Depending on the application in which an instance of the APS is being used, the APS can generate up to four of these messages every CS-800 cell time.

Stand-alone ABR Flows

The sequence of information flow between the blocks in a common-bus based ATM switching element related to ABR processing will now be described.

Figure 11:
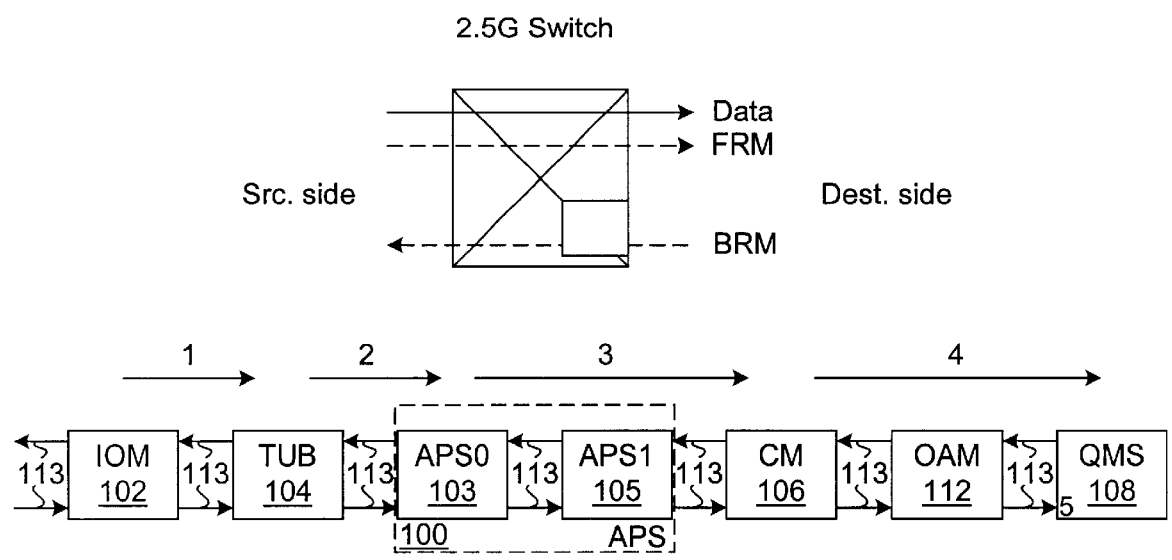
FIG. 11 is a cell flow diagram for ingress end-to-end cell flow within a stand-alone switch.

FIG. 11 illustrates the message flows associated with ingress end-to-end BRM cell flow. The following steps appear as numbered arrows in the figure.

1 IOM places ingress cell in WCELL on the bus and it is forwarded to the TUB.
2 The TUB performs policing and ingress translations and places WCELL, WICN, and WFLAGS on the bus for APS 0.
3 APS 0 extracts the necessary ER and CI/NI BRM cell fields, modifies them, places these new rate fields back in the cell, calculates CRC-10, and forwards the new WCELL, WICN, and WFLAGS on the bus to the CM.
4 The CM stores the cell at a WBADR and WCELL, WICN, WFLAGS, and WBADR are forwarded to the OAM and QMS.
5 When ingress cell information reaches the QMS, the QMS queues WBADR for the WICN.

Figure 12:
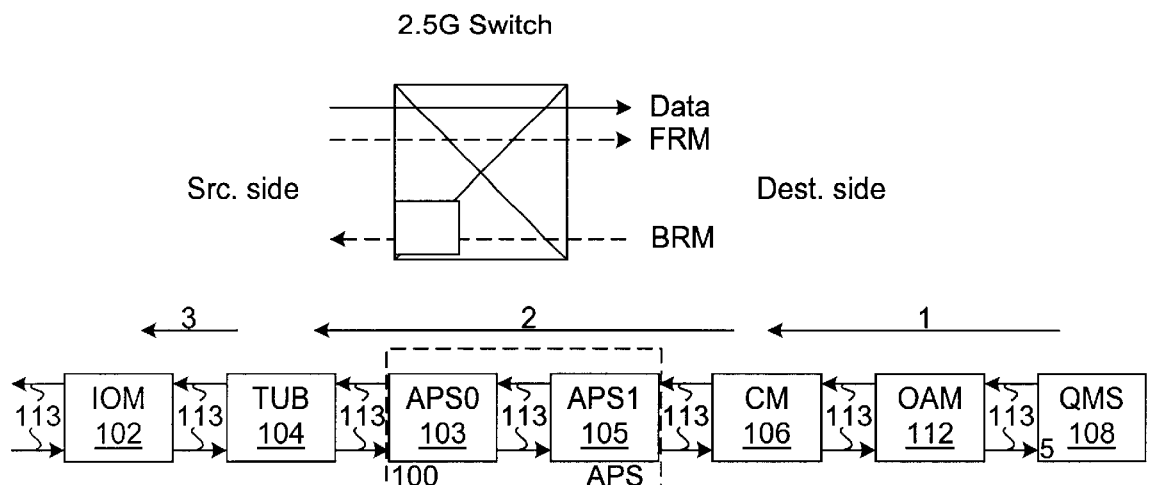
FIG. 12 is a cell flow diagram for egress end-to-end BRM cell flow within a stand-alone switch.

FIG. 12 illustrates the message flows associated with egress end-to-end BRM cell flow. The following steps appear as numbered arrows in the figure.

1 QMS schedules and dequeues the cell placing its RICN, RBADR and RFLAGS on the bus for the CM (and they can be seen by the OAM).
2 The CM reads the cell out of memory from RBADR and places the cell in RCELL along with RICN, RBADR, and RFLAGS on the bus for the TUB.
3 The TUB performs egress translation based on the RICN and places RCELL (with new header) on the bus for egress via the IOM.

Figure 13:
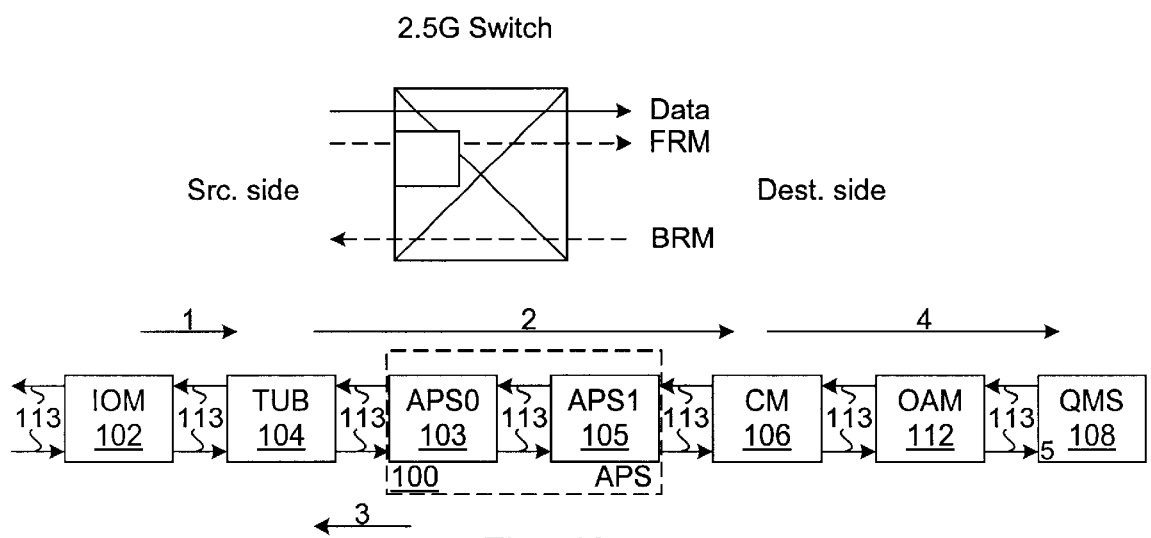
FIG. 13 is a cell flow diagram for ingress end-to-end FRM cell flow within a stand-alone switch.

FIG. 13 illustrates the message flows associated with ingress end-to-end FRM cell flow. The following steps appear as numbered arrows in the figure.

1 IOM places ingress cell in WCELL on the bus and it is forwarded to the TUB.
2 The TUB performs policing and ingress translations and places WCELL, WICN, and WFLAGS on the bus for the APSs and CM.
3 If DGCRA is enabled for the connection, APS 0 extracts the necessary CCR field, WICN, and WFLAGS from the TUB CIB, ensures that CCR is greater than MCR and less than PCR and forwards a policing increment update (with increment based on the CCR) to the policing block in the TUB so that it can begin policing at the new rate.
4 The CM stores the cell at a WBADR and WCELL, WICN, WFLAGS, and WBADR are forwarded to the OAM and QMS.
5 When this CIB reaches the QMS, the QMS queues WBADR for the WICN.

Figure 14:
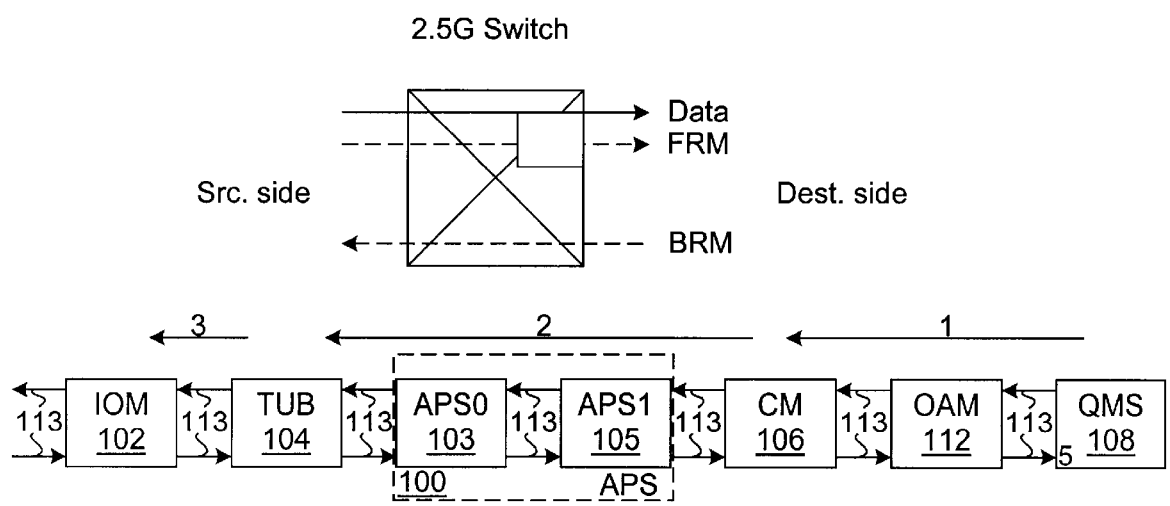
FIG. 14 is a cell flow diagram for egress end-to-end FRM cell flow within a stand-alone switch.

FIG. 14 illustrates the message flows associated with egress end-to-end FRM cell flow. The following steps appear as numbered arrows in the figure.
1 QMS schedules and dequeues the cell placing its RICN, RBADR and RFLAGS on the bus for the CM (and they can be seen by the APS and OAM).
2 The CM reads the cell out of memory from RBADR and places the cell in RCELL along with RICN, RBADR, and RFLAGS on the bus for the TUB.
3 The TUB performs egress translation based on the RICN and places RCELL (with new header) on the bus for egress via the IOM.

Figure 15:
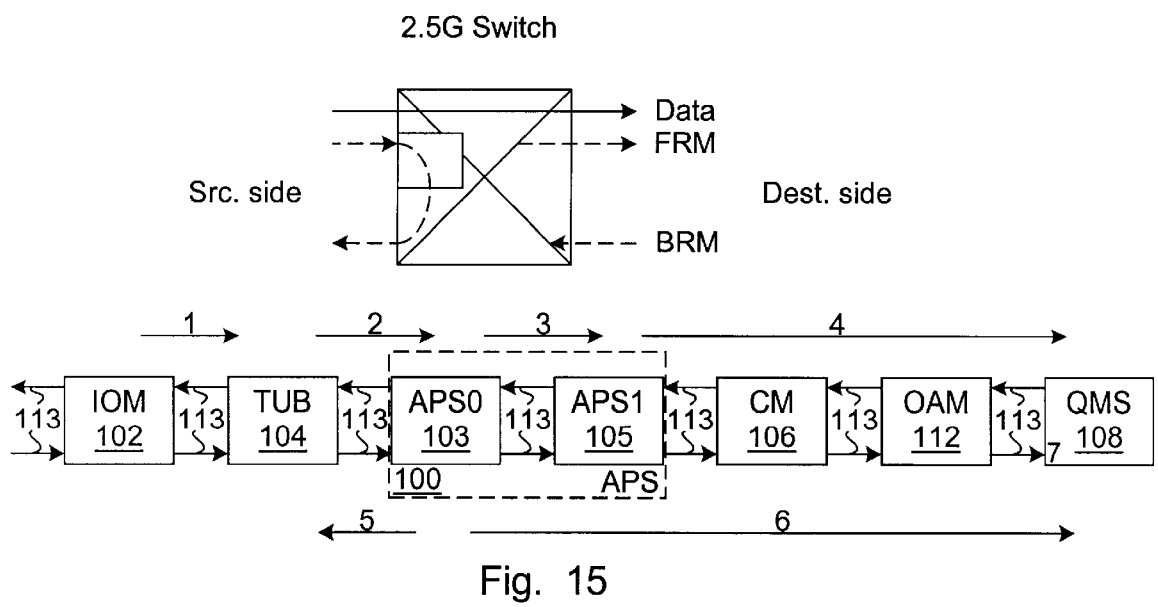
FIG. 15 is a cell flow diagram for ingress VD FRM cell flow within a stand-alone switch.

FIG. 15 illustrates the message flows associated with ingress VD FRM cell flow. The following steps appear as numbered arrows in the figure.
1 IOM places ingress cell in WCELL on the bus and it is forwarded to the TUB.
2 The TUB performs policing and ingress translations and places WCELL, WICN, and WFLAGS on the bus for the APS.
3 APS 0 extracts the ER, CI, and NI fields from the cell, calculates and updates these values in the cell and calculates new CRC-10. The new WCELL, WICN, REV_ICN (ICN used for BRM cell that is being turned around) and WFLAGS are forwarded on to APS 1, CM, OAM and QMS.
4 APS 1 stores the cell in APS memory in association with a REV_ICN and WCELL, WICN, WFLAGS, and WBADR are forwarded to the CM, OAM and QMS.
5 If DGCRA is enabled for the connection, APS 0 examines the CCR field extracted from the FRM cell, ensures that CCR is greater than MCR and less than PCR and forwards a policing increment update (with increment based on the CCR) to the policing block in the TUB so that it can begin policing at the new rate.
6 If there were no other FRM cells waiting to be turned around, the APS sends a BRM notification message to the QMS notifying it that this connection has a FRM cell waiting to be turned around on REV_ICN.
7 When this BRM notification message reaches the QMS, the QMS sets a flag to indicate that it has a turn-around BRM cell to schedule for WICN. Note that if another FRM cell arrives at the VD before the first one is turned around, the new FRM cell is stored in APS 1 in APS memory in association with REV_ICN so that the original FRM cell which was waiting to be turned around is overwritten.

Figure 16:
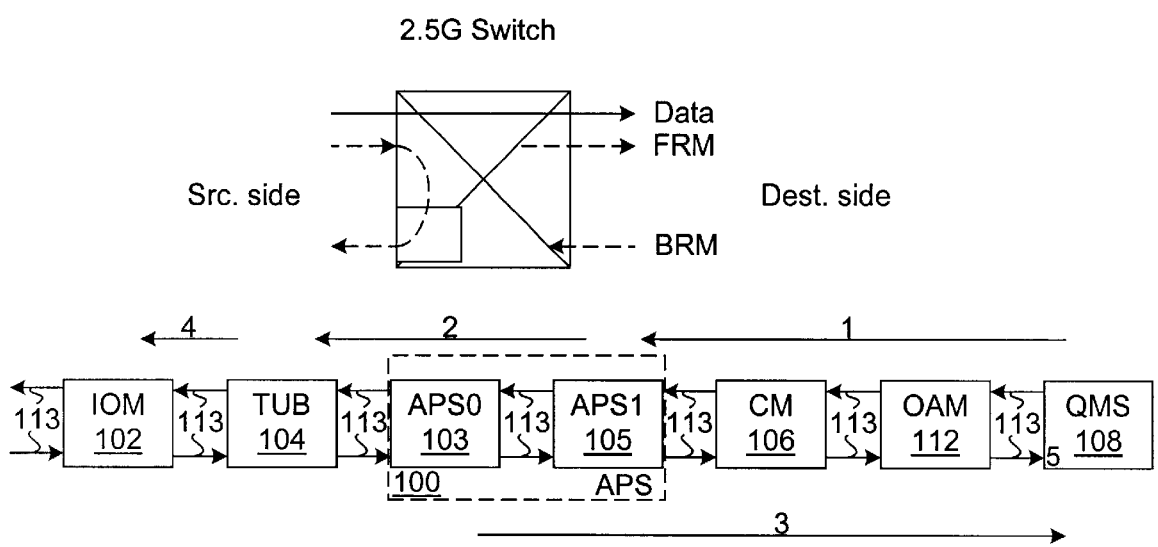
FIG. 16 is a cell flow diagram for egress VD BRM cell flow within a stand-alone switch.

FIG. 16 illustrates the message flows associated with egress VD BRM cell flow. The following steps appear as numbered arrows in the figure.
1 QMS schedules and dequeues the cell placing its RICN, RBADR and RFLAGS on the bus for the APS 1 (and they can be seen by the OAM).
2 APS 1 reads the cell out of its APS memory location associated with RICN and places the cell in RCELL along with RICN, RBADR, and RFLAGS on the bus for APS 0 and TUB.
3 If there are other FRM cells waiting to be turned around (after this one), APS 1 sends another BRM notification message to the QMS notifying it that this connection has another FRM cell waiting to be turned around.
4 The TUB performs egress translation based on the RICN and places RCELL (with new header) on the bus for egress via the IOM.

Figure 17:
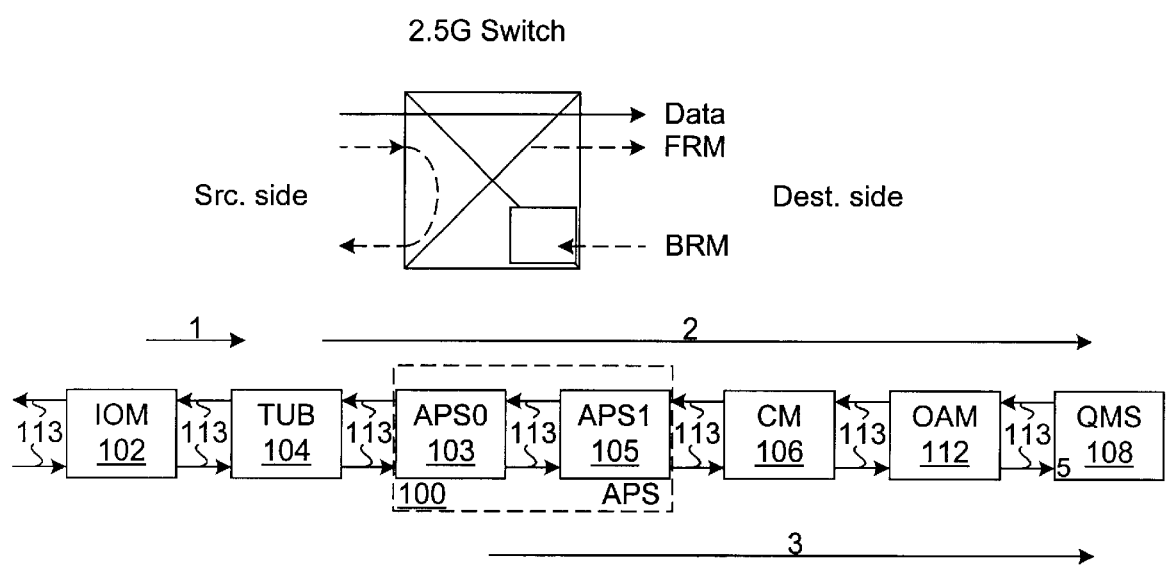
FIG. 17 is a cell flow diagram for ingress VS BRM cell flow within a stand-alone switch.

FIG. 17 illustrates the message flows associated with ingress VS BRM cell flow. The following steps appear as numbered arrows in the FIG.
1 IOM ingress cell placed in WCELL on bus and sent to the TUB.
2 TUB receives the ingress cell and performs policing and ingress translations and places the WCELL, WICN and WFLAGS 1 on the bus for the other blocks to see. (Note that it is not stored in the CM or APSs nor queued in the QMS.
3 APS 0 extracts the necessary ER and CI/NI BRM cell fields, WICN and WFLAGS, then updates the ACR for the connection. The APS puts the new ACR in a shaping update message and forwards it to the QMS. The QMS then begins shaping and hence scheduling cells on connection ICN at the new rate.

Figure 18:
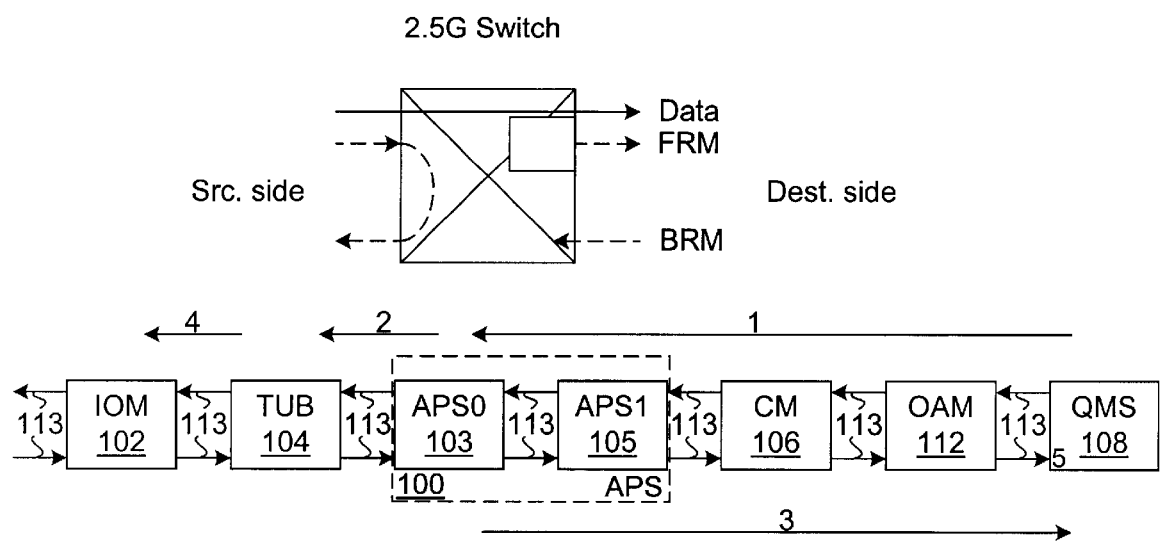
FIG. 18 is a cell flow diagram for egress VS FRM cell flow within a stand-alone switch.

FIG. 18 illustrates the message flows associated with egress VS FRM cell flow. The following steps appear as numbered arrows in the Figure.
1 QMS schedules and dequeues a FRM cell by placing it and its RICN and RFLAGS on the bus which are sent to APS 0.
2 APS 0 calculates a new ACR. APS 0 generates the FRM cell (which includes the new ACR and a CRC10) placing it in RCELL. The FRM cell along with RICN and RBADR are placed on the bus for the TUB block.
3 APS 0 places the new ACR in a shaping update message and forwards it to the QMS. The QMS then begins shaping and hence scheduling cells on the connection at the new rate.
4 The TUB performs egress translation based on the RICN and places the cell (with new header) on the bus for egress via the Fabric Port ABR Flows The sequence of information flow between the blocks in a common-bus based 2.5 Gbps fabric port related to ABR processing will now be described.

FIG. 19 shows the message flow associated with an end-to-end BRM cell which arrives from the network 2.5 G port and progresses to the fabric.
1 BRM cell arrives from the network via the I/O I/F and is placed in WCELL and routed to the TUB on the network side of the port.
2 TUB performs ingress translations and places WCELL, WDEST_ID, WICN, and WFLAGS on the bus for the APS.
3 APS 0 extracts the necessary ER and CI/NI BRM cell fields, modifies them, places these new rate fields back in the cell, calculates CRC-10, and forwards the new WCELL, WDEST_ID, WICN, and WFLAGS on the bus to the CM on the fabric side of the port.
4 CM stores the cell at WBADR and then sends WBADR, WDEST_ID, and WFLAGS on the bus to the QMS on the fabric side of the port. The QMS queues the cell.
5 Time passes until the fabric scheduler issues a dequeue for the BRM cell. (It is assumed that during this time, the fabric received information indicating the cell arrived at the port identified by WDEST_ID.) The dequeue message is received by Vortex F and routed to the QMS (on the fabric side of the port) and contains RDEST_ID which is the same as WDEST_ID above.
6 The QMS dequeues RBADR (for the BRM cell) for RDEST_ID and places RBADR and RFLAGS on the bus for the CM.
7 The CM reads the BRM cell from RBADR and places it in RCELL on the bus for egress to the fabric via Vortex F.

FIG. 20 shows the message flow associated with an end-to-end BRM cell which arrives from the fabric at 2.5 G port and progresses to the network I/O I/F.

1. BRM cell arrives via the fabric interface and is placed in WCELL and routed to the TUB on the fabric side of the port.
2. The TUB performs translations and places WCELL, WICN, and WFLAGS on the bus for the CM on the network side of the port.
3. The CM stores the cell at WBADR and places WICN, WBADR, and WFLAGS on the bus for the QMS on the network side of the port. The QMS queues the cell.
4. Time passes until the QMS schedules the ICN and dequeues the cell placing RICN, RBADR and RFLAGS on the bus for the CM. (APS 0 sees the cell egress message go by and performs measurements appropriately.)
5. The CM reads the cell from RBADR and places RCELL, RICN, and RFLAGS on the bus for the TUB.
6. The TUB uses RICN and RFLAGS to perform egress translations and header muxes and places RCELL (with new egress header) on the bus to be routed to the IOM.

FIG. 21 shows the message flow associated with an end-to-end FRM cell which arrives from the network at 2.5 G port and progresses to the fabric.

1. FRM cell arrives from the network via the I/O I/F and is placed in WCELL and routed to the TUB on the network side of the port.
2. TUB performs policing and ingress translations and places WCELL, WDEST_ID, WICN, and WFLAGS on the bus for the CM on the fabric side of the port
3. If DGCRA is enabled for the connection, APS 0 extracts the CCR field, ensures that CCR is greater than MCR and less than PCR and forwards a policing increment update (with increment based on the CCR) to the policing block in the TUB (on the network side of the port) so that it can begin policing at the new rate.
4. CM stores the cell at WBADR then queues WBADR for WDEST_ID and places WCELL, WICN, WBADR, and WFLAGS on bus is forwarded to the QMS on the fabric side of the port. The QMS queues the cell.
5. Time passes until the fabric scheduler issues a dequeue for the BRM cell. (It is assumed that during this time, the fabric received information indicating the cell arrived at the port the WDEST_ID.) The dequeue message which is received by Vortex F and routed to the QMS (on the fabric side of the port) and contains RDEST_ID which is the same as WDEST_ID above.
6. The QMS dequeues RBADR (for the BRM cell) for RDEST_ID and places RBADR and RFLAGS on the bus for the CM.
7. The CM reads the BRM cell from RBADR and places it in RCELL on the bus for egress to the fabric via Vortex F.

FIG. 22 shows the message flow associated with an end-to-end FRM cell which arrives from fabric at 2.5 G port and progresses to the network I/O I/F.

1. FRM cell arrives via the fabric interface and is placed in WCELL and routed to the TUB on the fabric side of the port.
2. The TUB performs translations and places WCELL, WICN, and WFLAGS on the bus for the CM on the network side of the port.
3. The CM stores the cell at WBADR and places WICN, WBADR, and WFLAGS on the bus for the QMS on the network side of the port. The QMS queues the cell.
4. Time passes until the QMS schedules the ICN and dequeues the cell placing RICN, RBADR and RFLAGS on the bus for the CM. (APS 0 sees the cell egress message go by and performs measurements appropriately.)
5. The CM reads the cell from RBADR and places RCELL, RICN, and RFLAGS on the bus for the TUB. The APS sees the FRM cell passing by and since it egresses from its network I/F, it updates its rate and queue fill measurements.
6. The TUB uses RICN and RFLAGS to perform egress translations and header muxes and places RCELL (with new egress header) on the bus to be routed to the IOM.

The message flow associated with an FRM cell on a VD connection which arrives at 2.5 G port from the source side of the network and proceeds to the fabric is the same as for the above described end-to-end FRM which arrives from the network at 2.5 G port and progresses to the fabric.

FIG. 23 shows the message flow associated with an FRM cell on a VD connection which arrives at 2.5 G port destination side of the fabric and is turned around into a BRM and proceeds back to the fabric.

1. From the fabric, an FRM cell arrives at a port which is acting as a VD for the connection and is placed in WCELL and routed to the TUB on the fabric side of the port.
2. The TUB performs ingress translations and forwards WCELL, WICN, and WFLAGS to APS 0. (Neither CM stores the cell in this case.)
3. APS 0 first calculates new ER, CI, and NI for the connection and uses them to update the original FRM cell then calculates new CRC10. It also increases a turn-around count which is used to ensure that the VD does not send back more turn-around BRM cells than the number of FRM cells that it receives. APS 0 also uses WICN of the FRM cell to look up the REV_ICN (ICN under which the BRM cell is going to be travelling) and it places the modified WCELL, WICN, WFLAGS, and REV_ICN on the bus for APS 1. When APS 1 receives the modified RM cell, it stores it in APS memory in association with REV_ICN.
4. Eventually, a returning BRM arrives from the destination side via the IOM for the VS and is placed in WCELL and routed to the TUB on the network side of the port.
5. The TUB performs ingress translations and places WCELL, WDEST_ID, WICN, and WFLAGS on the bus for the APSs.
6. APS 1 takes the ER, CI, NI, and BN fields from the returning BRM cell and places them in ORIG_ER_OUT_N, ORIG_CI_NI_OUT_N, ORIG_BN_OUT_N on the bus for APS 0.
7. APS 1 sinks the VS BRM cell and uses the opportunity on the bus to insert the turn-around RM cell which it reads from the APS memory in association with WICN. WICN and WFLAGS are also placed on the bus for APS 0 (on the fabric side of the port) with WCELL.
8. APS 0 checks the turn-around count for the connection and if it is greater than 0, it allows WCELL, WICN, and WFLAGS to pass through to the CM (on the fabric side) unaltered and it decrements the turn-around count. If the turn-around count is 0, APS 0 nulls the cell_is_BRM flag in WFLAGS before passing it on to the CM.
9. The CM stores the cell at WBADR if cell_is_BRM in WFLAGS is valid. It then places WCELL, WICN, WBADR, and WFLAGS on the which forwards it to the QMS on the fabric side of the port. The QMS queues the cell.
10. Time passes until the fabric scheduler issues a dequeue for the BRM cell. (It is assumed that during this time, the fabric received information indicating the cell arrived at the port the WDEST_ID.) The dequeue message which is received by Vortex F and routed to the QMS (on the fabric side of the port) contains RDEST_ID which is the same as WDEST_ID above.

11 The QMS dequeues RBADR (for the BRM cell) for RDEST_ID and places RBADR and RFLAGS on the bus for the CM.
12 The CM reads the BRM cell from RBADR and places it in RCELL on the bus for egress to the fabric via Vortex F. If another FRM arrives at the VD before the first one is turned around, the new FRM is stored in APS 1 in APS memory in association with REV_ICN so that the original FRM which was waiting to be turned around is overwritten.

FIG. 24 shows the message flow associated with a VD BRM cell which arrives from fabric at 2.5 G port and progresses to the I/O I/F.
1 BRM cell arrives via the fabric interface and is placed in WCELL and routed to the TUB on the network side of the port.
2 The TUB performs translations and places WCELL, WICN, and WFLAGS on the bus for APS 0 and 1. APS 1 stores WCELL in APS memory in association with WICN .
3 APS 0 increments a turn-around count and, if it originally indicated that there are no other turn-around BRM cells waiting to depart the port, APS 0 sends a BRM notification message to the QMS (on the network side of the port). When this BRM notification reaches the QMS, the QMS sets a flag to indicate that it has a turn-around BRM cell to schedule for WICN.
4 Time passes until the QMS schedules the ICN and dequeues the cell placing RICN and RFLAGS on the bus for the APS 0 and 1.
5 APS 1 receives the RICN and RFLAGS, sees that it must supply the BRM cell and places it in RCELL. RCELL, RICN, and RFLAGS are placed on the bus for the TUB.
6 If the turn-around count is greater than 0, APS 0 sends another BRM notification message to the QMS and decrements the turn-around count. When this BRM notification message reaches the QMS, the QMS sets a flag to indicate that it has a turn-around cell to schedule for the ICN.
7 The TUB uses RICN and RFLAGS to perform egress translations and header muxes and places the cell (with new egress header) on the bus to be routed to the IOM.

FIG. 25 shows the message flow associated with a BRM cell on a VS connection which arrives at 2.5 G port from the destination side of the network.
1 BRM cell arrives from the destination side of the network at the IOM and is placed in WCELL and routed to the TUB on the fabric side of the port.
2 The TUB performs ingress translations and forwards WCELL with WICN to APS 0. (The CM does not store the cell.) The APS examines the ER, CI, and NI and updates the Allowed Cell Rate (ACR) for connection WICN.
3 APS 0 puts the new ACR in a shaping update message and forwards it to the QMS. The QMS then begins shaping and hence scheduling cells on connection WICN at the new rate.

FIG. 26 shows the message flow associated with an FRM cell on a VS connection which is originated at a 2.5 G port on the destination side of the fabric and forwarded to the network.
1 The QMS (autonomously) schedules an FRM on RICN and places RICN and RFLAGS on the bus for the APS.
2 RFLAGS indicate the cell is an FRM for a VS that should be generated by APS 0. APS 0 updates the ACR for RICN and generates the FRM cell (with new ACR in it) with CRC10 calculated and places the cell in RCELL. RCELL, RICN, and RFLAGS are placed on the bus for the TUB.
3 APS 0 sends a shaping rate update message to the QMS so that it can begin shaping connection RICN at the new ACR.
4 The TUB uses RICN and RFLAGS to perform egress translations and header muxes and places the cell (with new egress header) on the bus to be routed to the IOM.

Figure 27:
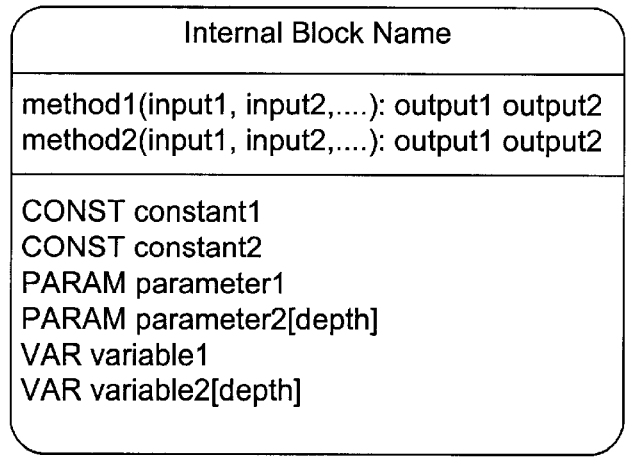
FIG. 27 is a diagram illustrating block summary syntax.
Figure 28:
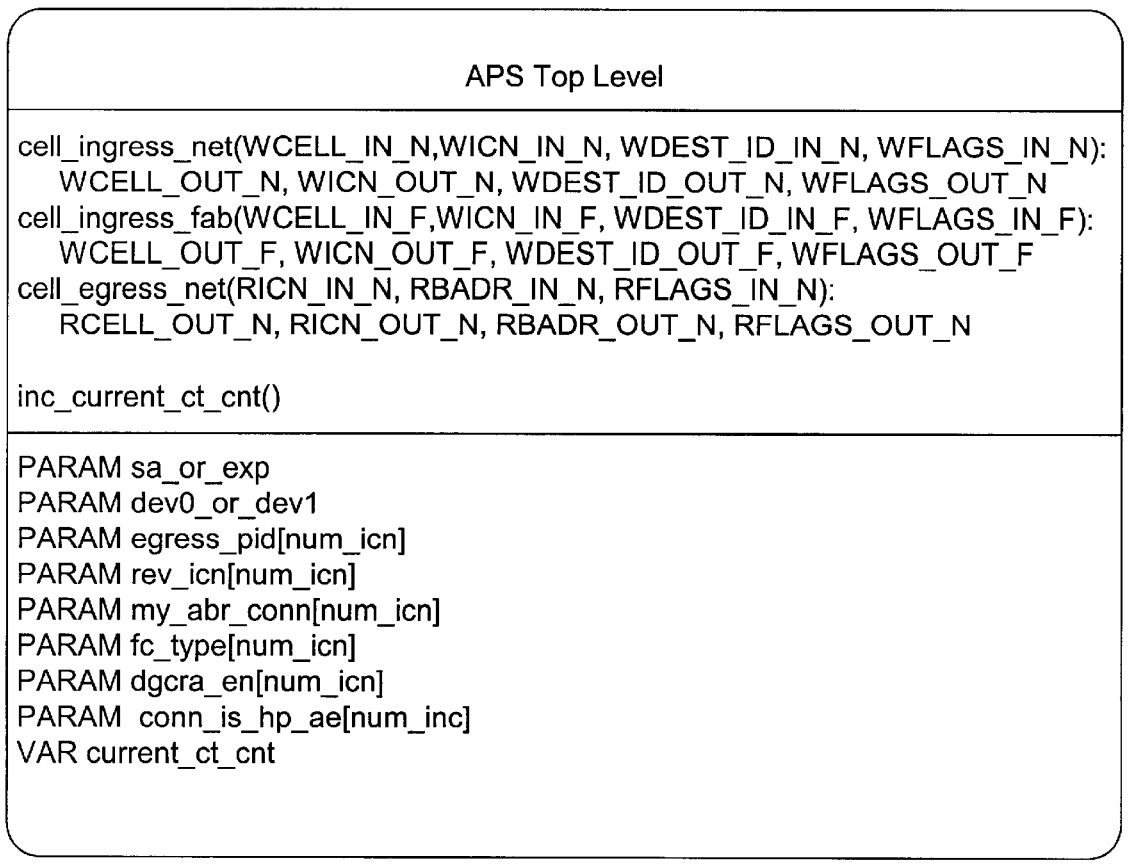
FIG. 28 is a top level block summary of the APS of FIG. 2.
Figure 29:
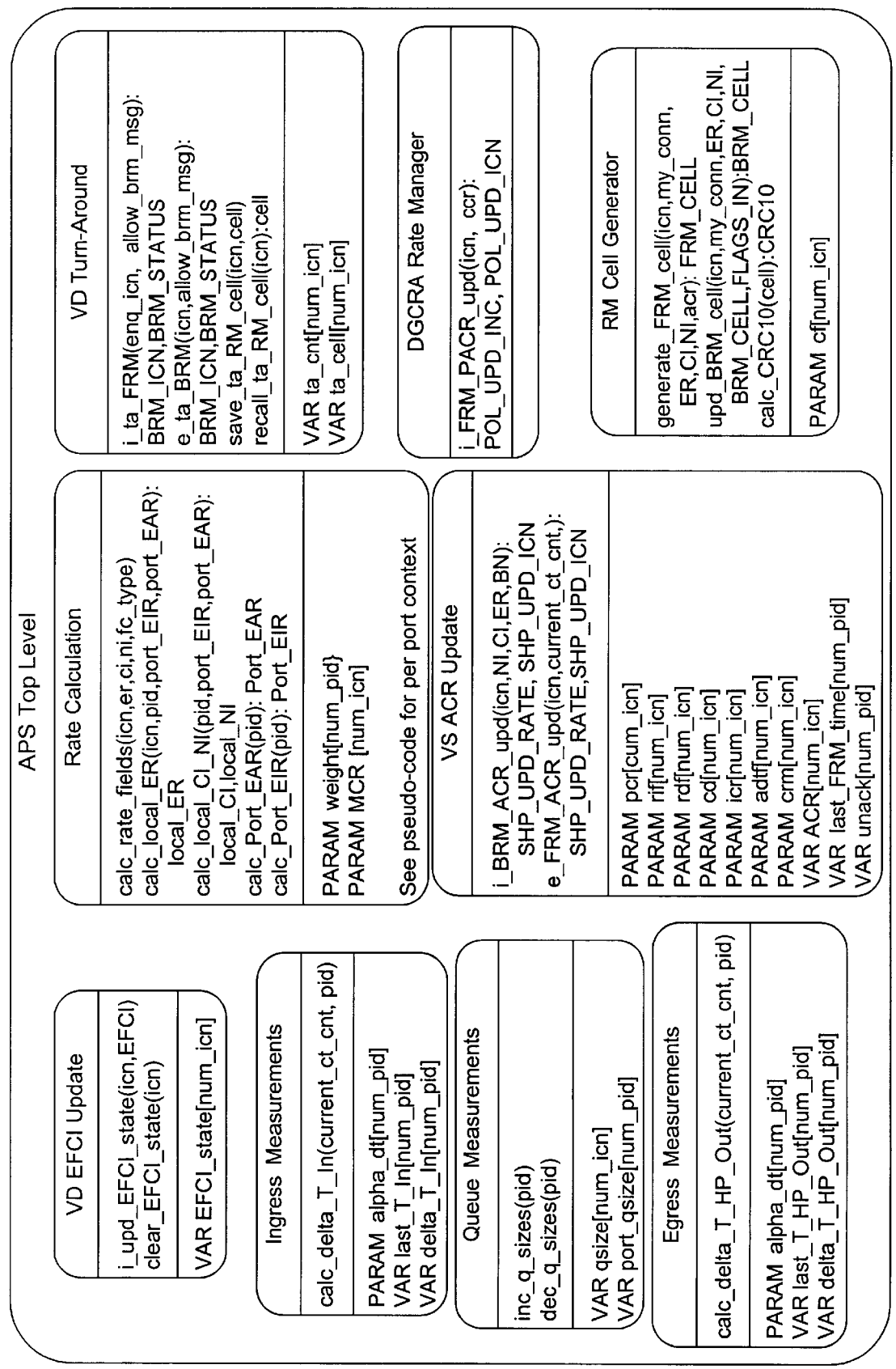
FIG. 29 is an internal block summary of the blocks of the APS shown of FIG. 28.

FIG. 28 and 29 are block diagrams which show the methods and data associated with the blocks previously introduced in FIG. 4a. The syntax used in these diagrams will be explained with reference to FIG. 27 which shows a generic block summary diagram which is divided (by horizontal lines) into three sections which describe the block's name, its methods, and its permanent storage. The name shown in the top section is chosen to give a brief description of what the block does. The middle portion of the diagram presents the names of all of the block's methods as well as their inputs and outputs. The bottom portion of the diagram names all of the block's constants (hard-coded in the blocks hardware), parameters (written by software but read-only by block hardware), and variables (can be read and written by block hardware).

FIG. 28 is a top level block summary showing two main methods in the APS top level block, cell_ingress and cell_egress which are invoked by the cell ingress and egress messages to perform the appropriate ABR related processing for those events. These methods are mainly involved in analyzing the input messages and per connection context to decide which of the methods in the APS' sub-blocks to invoke. The Figure also lists all the parameters required by the cell_ingress and cell_egress methods.

FIG. 29 is an internal block summary which presents the methods and permanent storage of the APS' internal blocks. A description of the APS' variables and parameters has been presented previously in Table 1.

Algorithm Description
APS Top Level
-- This block contains the top level cell_ingress, cell_ egress, -- and inc_current_ct_cnt methods.
-- It also provides containment -- and interconnection of the lower level blocks and interfaces -- to the logical interface of the Common bus I/O macros.
inc_current_ct_cnt( )
-- This method keeps time for the APS. It increments an -- integer counter, current_ct_cnt, which can be further -- converted into a time stamp with units of seconds. This -- method is triggered four time a second corresponding to the -- four cell ingress and four cell egress opportunities to be -- handled in an OC-12 cell time. This implies that the actual -- counter counts in "quarters of an OC-12 cell time" or in -- OC-8 cell times. (For an APS with bandwidth requirements -- other than 2.5 Gbps, the increment frequency will be -- different.)
IF (current_ct_cnt=maximum value)
    current_ct_cnt=0
ELSE
    current_ct_cnt=current_ct_cnt+1
cell_ingress_net(WCELL_IN_N, WICN_IN_N, WDEST_ID_IN_N,
WBADR_IN_N, WFLAGS_IN_N, REV_ICN_IN_N, ORIG_ER_IN_N,
ORIG_CI_IN_N, ORIG_NI_IN_N, ORIG_BN_IN_N): WCELL_OUT_N,
WICN_OUT_N, WDEST_ID_OUT_N, WBADR_OUT_N, WFLAGS_OUT_N,
REV_ICN_IN_N, ORIG_ER_OUT_N, ORIG_CI OUT_$_{N,\ ORIG}$_NI_OUT_N,
ORIG_BN_OUT_N -- This method is the screening and the majority of the control -- logic for ingress cell from the network events. It examines -- the contents of the cell ingress from network message, -- performs lookups based on WICN_IN_N, and makes decisions on -- which other APS methods to invoke.
wvalid=WFLAGS_IN_N.WVALID
conn_is_vd=WFLAGS_IN_N.CONN_IS_VD
conn_is_vs=WFLAGS_IN_N.CONN_IS_VS
cell_is_frm=WFLAGS_IN_N.CELL_IS FRM
cell_is_brm=WFLAGS_IN_N.CELL_IS_BRM
IF (dev0_or_dev1=0)
   ni=WCELL_IN_N.NI;
   ci=WCELL_IN_N.CI;
   er=WCELL_IN_N.ER;
   bn=WCELL_IN_N.BN;
   ccr=WCELL_IN_N.CCR;
   efci=WCELL_IN_N_EFCI
   egress_pid=egress_pid[WICN_IN_N]
   rev_icn=rev_icn[WICN_IN_N]
   my_conn=my_abr_conn[WICN_IN_N]
   fc_type=fc_type[WINC_IN_N]
   dgcra_en=dgcra_en[WICN_IN_N]
   IF (sa_or_exp=0)
     --perform stand-alone behaviour
     IF (((wvalid=1) OR (cell_is_brm=1) OR (cell_is_frm=1)) AND (my_conn=1))
       calc_delta_T_In(current_ct_cnt, egress_pid)
     -- Do not include VD turn-around RM cell in queue --
     fill measurement as they are stored in a dedicated --
     buffer, at most one per connection at a time, and --
     there is not guaranteed to be a 1:1 cell ingress -- to
     cell egress ratio for them.
     IF (((wvalid=1) OR (cell_is_brm=1) OR ((cell is frm=1) AND (conn is vd=0))) AND (my_conn=1))
       inc_qsizes(egress_pid)
     IF (((wvalid=1) OR (cell_is_brm=0) OR (cell_is_frm=0)) AND (my_conn=1))
       i_upd_EFCI_state(WICN_IN_N, efci)
     update even if not VD
     IF ((cell_is_brm=1) AND (conn_is_vd=0) AND (conn_is_vs=0))
       ER:CI:NI=calc_rate_fields(rev_icn, er, ci, ni, fc_type)
       BRM_cell=upd_BRM_cell(rev_icn, my_conn, ER, CI, NI, WCELL_IN_N,WFLAGS_IN_N)
       BRM_cell.CRC 10=calc_CRC 10 (BRM_cell)
       WCELL_OUT_N=BRM_cell
     IF ((cell_is_frm=1) AND (conn_is_vd=1))
       ER:CI:NI=calc_rate_fields(WICN_IN_N, er, ci, ni, fc_type)
       BRM_cell=upd_BRM_cell(WICN_IN_N, my_conn, ER, CI, NI, WCELL_IN_N, WFLAGS_IN_N)
       BRM_cell.CRC10=calc_CRC10(BRM_cell)
       WCELL_OUT_N=BRM_cell
       clear_EFCI_state(WICN_IN_N)
       i_ta_FRM(WICN_IN_N, rev_icn, (allow_brm_msg=1))
     IF(NOT((cell_is_brm=1) AND (conn_is_vd=0) AND (conn_is_vs=0)) AND NOT((cell_is_frm=1) AND (conn_is_vd=1)))
       WCELL_OUT_N=WCELL_IN_N
       WICN_OUT_N=WICN_IN_N
       WDEST_ID_OUT_N=WDEST_ID_IN_N
       WBADR_OUT_N=WBADR_IN_N
       WFLAGS_OUT_N=WFLAGS_IN_N
       REV_ICN_OUT_N=rev_icn
     IF ((cell_is_brm=1) AND (conn_is_vs=1))
       i_BRM_ACR_upd(rev_icn, ni, ci, er, bn)
     IF ((cell_is_frm=1) AND (dgcra_en=1))
       i_FRM_ACR_upd(WICN_IN_N, ccr)
   ELSE
     -- perform expansion behaviour
     IF ((cell_is_brm=1) AND (conn_is_vd=0) AND (conn_is_vs=0)))
       ER:CI:NI=calc_rate_fields(rev_icn, er, ci, ni, fc_type)
       BRM_cell=upd_BRM_cell(rev_icn, my_conn, ER, CI, NI, WCELL_IN_N,RFLAGS_IN_N)
       BRM_cell.CRC10=calc_CRC10(BRM_cell)
       WCELL_OUT_N=BRM_cell
     IF (NOT((cell_is_brm=1) AND (conn_is_vd=0) AND (conn_is_vs=0))))
       WCELL_OUT_N=WCELL_IN_N
       WICN_OUT_N=WICN_IN_N
       WDEST_ID_OUT_N=WDEST_ID_IN_N
       WBADR_OUT_N=WBADR_IN_N
       WFLAGS_OUT_N=WFLAGS_IN_N
       REV_ICN_OUT_N=rev_icn
     IF ((cell_is_brm=1) AND (conn_is_vs=1))
       i_BRM_ACR_upd(rev_icn, ORIG_NI_IN_N, ORIG_CI_IN_N, ORIG_ER_IN_N, ORIG_BN_IN_N)
     -- If we are caught up on turning around FRM cells -- for the VD, don't actually use this opportunity to -- turn-around another cell. Only the cell_is_brm is -- nulled, the turn around cell is still driven out -- by APS 1.
     IF ((cell_is_brm=1) AND (conn_is_vd=1) AND (conn_is_vs=1))
       IF (ta_cnt[rev_icn]=0)
          WCELL_OUT_N.cell_is_brm=0
       ELSE
          e_ta_FRM(rev_icn, WICN_IN_N, (allow_brm_msg =0))
     IF (cell_is frm=1) AND (dgcra_en=1)
       -- The port increment update message resulting -- from the following is to be routed to the -- policer in the TUB on the fabric side of the port i_FRM_PACR_upd(WICN_IN_N, ccr)
ELSE -- (dev0_or_dev1=1)
   IF (sa_or_exp=0)
     -- perform stand-alone behaviour
     IF ((cell_is_frm=1) AND (conn_is_vd=1))
       save_ta_RM_cell (REV_ICN_IN_N, BRM_cell)
     WCELL_OUT_N=WCELL_IN_N
     WICN_OUT_N=WICN_IN_N
     WDEST_ID_OUT_N=WDEST_ID_IN_N
     WBADR_OUT_N=WBADR_IN_N
     WFLAGS_OUT_N=WFALGS_IN_N
   ELSE
     -- perform expansion behaviour
     IF ((cell_is_brm=1) AND (conn_is_vd=1))
       WCELL_OUT_N=recall_ta_RM_cell (WICN_IN_N)
     ELSE

```
    WCELL_OUT_N=WCELL_IN_N
    WICN_OUT_N=WICN_IN_N
    WDEST_ID_OUT_N=WDEST_ID_IN_N
    WBADR_IN_OUT_N=WBADR_IN_IN_N
    WFLAGS_OUT_N=WFALGS_IN_N
    ORIG_ER_OUT_N=er; ORIG_CI_OUT_N=ci;
    ORIG_NI_OUT_N=ni; ORIG_BN_OUT_N=bn
cell_ingress_fab(WCELL_IN_F, WICN_IN_F,
    WDEST_IN_F, WBADR_IN_F,
WFLAGS_IN_F, REV_ICN_IN_F): WCELL_OUT_F,
    WICN_OUT_F,
WDEST_OUT_F, WBADR_OUT_F, WFLAGS_OUT_
    F, REV_ICN_IN_F
-- This method is the screening and the majority of the
   control -- logic for ingress cell from the fabric events. It
   -- examines the contents of the cell ingress from network
   -- message, performs lookups based on WICN_IN_F,
   and makes -- decisions on which other APS methods to
   invoke.
wvalid=WFLAGS_IN_F.WVALID
conn_is_vd=WFLAGS_IN_F.CONN_IS_VD; conn_
    is_vs=WFLAGS_IN_F.CONN_IS_VS=
cell_is_frm=WFLAGS_IN_F.CELL_IS_FRM; cell_
    is_brm=WFLAGS_IN_F.CELL_IS_BRM
IF (dev0_or dev1=0)
    IF (sa_or_exp=1)
        -- perform only if expansion
        ni=WCELL_IN_F.NI; ci=WCELL_IN_F.CI;
            er=WCELL_IN_F.ER; bn=WCELL_IN_F.BN
        ccr=WCELL_IN_F.CCR; efci=WCELL_IN_F.EFCI
    egress_pid=egress_pid[WICN_IN_F]
    rev_icn=rev_icn[WICN_IN_F]
    my_conn=my_abr_conn[WICN_IN_F]
    fc_type=fc_type [WINC_IN_F]
    dgcra_en=dgcra_en[WICN_IN_F]
    IF (((wvalid=1) OR (cell_is_brm=1) OR (cell_is_frm=
        1)) AND (my conn=1))
        calc_delta_T_In(current_ct_cnt, egress_pid)
    -- Do not include VD turn-around RM cell in queue -- fill
       measurement as they are stored in a dedicated -- buffer,
       at most one per connection at a time, and -- there is not
       guaranteed to be a 1:1 cell ingress -- to cell egress ratio
       for them.
    IF (((wvalid=1) OR (cell_is_brm=1) OR ((cell_is_
        frm=1) AND (conn_is_vd=0)))
        and (my_conn=1))
        inc_q_sizes(egress_pid)
    IF (((wvalid=1) OR (cell_is_brm=0) OR (cell_is_frm=
        0)) AND (my_conn=1))
        i_upd_EFCI_state(WICN_IN_N, efci)
        -- update even if not VD
    IF ((cell_is_brm=1) AND (conn_is_vd=1))
        i_ta_RM(rev_icn, WICN_IN_N, (allow_brm_
            msg=1)
    IF ((cell_is_frm=1) AND (conn_is_vd=1))
        ER:CI:NI=calc_rate_fields(WICN_IN_F, er, ci,
            ni, fc_type)
        BRM_cell=upd_BRM_cell(WICN_IN_F,
            my_conn, ER,
            CI, NI, WCELL_IN_F, WFLAGS_IN_F)
        BRM_cell.CRC10=calc_CRC10(BRM_cell)
        WCELL_OUT_F=BRM_cell
        clear_EFCI_state(WICN_IN_F)
        i_ta_FRM(WICN_IN_F, rev_icn, (allow_brm_
            msg=0))
    IF (NOT ((cell_is_frm=1) AND (conn_is_vd=1)))
        WCELL_OUT_F=WCELL_IN_F
        WICN_OUT_F=WICN_IN_F
        WDEST_ID_OUT_F=WDEST_ID_IN_F
        WBADR_IN_OUT_F=WBADR_IN_IN_F
        WFLAGS_OUT_F=WFLAGS_IN_F
        REV_ICN_OUT_F=rev icn
ELSE -- (dev0_or_dev1=1)
    IF (sa_or_exp=1)
        -- perform only if expansion
        IF ((cell_is_frm=1) AND (conn_is_vd=1))
            save_ta_RM_cell(REV_ICN_IN_N, BRM_cell)
        IF ((cell_is_brm=1) AND (conn_is_vd=1))
            save_ta_RM_cell(WICN_IN_N, BRM_cell)
    WCELL_OUT_N=WCELL_IN_N
    WICN_OUT_N=WICN_IN_N
    WDEST_ID_OUT_N=WDEST_ID_IN_N
    WBADR_IN_OUT_N=WBADR_IN_IN_N
    WFLAGS_OUT_N=WFALGS_IN_N
cell_egress_net (RCELL_IN_N, RICN_IN_N,
    RBADR_IN_N,
RFLAGS_IN_N): RCELL_OUT_N, RICN_OUT_N,
    RBADR_OUT_N,
RFLAGS_OUT_N
-- This method is the screening and majority of the control
   -- logic for egress cell to network events. It examines the
   -- contents of the cell egress to network input message, --
   performs lookups based on WICN_IN, and makes deci-
   sions on -- which other APS methods to invoke.
rvalid=RFLAGS_IN_N.RVALID
conn_is vd=RFLAGS_IN_N.CONN_IS_VD; conn_is_
    VS=RFLAGS_IN_N.CONN_IS_VS
cell_is_frm=RFLAGS_IN_N.CELL_IS_FRM; cell_
    is_brm=RFLAGS_IN_N.CELL_IS_BRM
cell_is_hp_ae=RFLAGS_IN_N.CELL_IS_HP_AE
    IF (dev0_or_dev1=0)
        egress_pid=egress_pid[RICN_IN]
        rev_icn=rev_icn[RICN_IN]
        my_conn=my_abr_conn[RICN_IN]
        fc_type=fc_type [RICN_IN]
        conn_is_hp_ae=conn_is_hp_ae[RICN_IN]
        IF (sa_or_exp=0)
            -- perform stand-alone behaviour
            IF (cell_is_brm=1) AND (conn_is_vd=1)
                e_ta_BRM(rev_icn, RICN_IN_N, (allow_brm_
                    msg=1))
            IF ((cell_is_frm=1) AND (conn_is_vs=1))
                acr=e_FRM_ACR_upd(RICN_IN, current_ct_
                    cnt)
                FRM_cell=generate_FRM_cell (RICN_IN, acr)
                FRM_cell.CRC10=calc_CRC10(FRM_cell)
                RCELL_OUT_N=FRM_cell
            IF (NOT((cell_is_frm=1) AND (conn_is vs=1)))
                RCELL_OUT_N=RCELL_IN_N
                RICN_OUT_N=RICN_IN_N
                RBADR_OUT_N=RBADR_IN_N
                RFLAGS_OUT_N=RFLAGS_IN_N
            IF ((rvalid=1) AND ((cell_is_hp_ae=1) OR (conn_
                is_hp_ae=1)))
                calc_delta_T_HP_Out(current_ct_cnt, egress_
                    pid)
            -- Do not include VD turn-around RM cell in queue --
               fill measurement as they are stored in a dedicated --
``` buffer, at most one per connection at a time, and -- there is not guaranteed to be a 1:1 cell ingress -- to cell egress ratio for them.
    IF (((rvalid=1) OR ((cell_is_brm=1) AND (conn_is_vd=0)) OR (cell_is_frm=1)) AND (my_conn=1))
        dec_q_sizes(egress_pid)
ELSE
  -- perform expansion behaviour
    IF (cell_is_brm=1) AND (conn_is_vd=1)
        e_ta_BRM(rev_icn, RICN_IN_N, (allow_brm_msg=1)
    IF ((cell_is_frm=1) AND (conn_is_vs=1))
        acr=e_FRM_ACR_upd(RICN_IN, current_ct_cnt)
        FRM_cell=generate_FRM_cell (RICN_IN, acr)
        FRM_cell.CRC10=calc_CRC10(FRM_cell)
        RCELL_OUT_N=FRM_cell
    IF (NOT((cell_is_frm=1) AND (conn_is_vs=1)))
        RCELL_OUT_N=RCELL_IN_N
    RICN_OUT_N=RICN_IN_N
    RBADR_OUT_N=RBADR_IN_N
    RFLAGS_OUT_N=RFLAGS_IN_N
    IF ((rvalid=1) AND ((cell_is_hp_ae=1) OR (conn_is_hp_ae=1)))
        calc_delta_T_HP_Out(current_ct_cnt, egress_pid)
  -- Do not include VD turn-around RM cell in queue -- fill measurement as they are stored in a dedicated -- buffer, at most one per connection at a time, and -- there is not guaranteed to be a 1:1 cell ingress -- to cell egress ratio for them.
    IF (((rvalid=1) OR ((cell_is_brm=1) AND (conn_is_vd=0))
    OR (cell_is_frm=1)) AND (my_conn=1))
        dec_q_sizes(egress_pid)
ELSE -- (dev0_or_dev1=1)
    IF (sa_or_exp=0)
      -- perform stand-alone behaviour
      IF ((cell_is_brm=1) AND (conn_is_vd=1))
        RCELL_OUT_N=recall_ta_RM_cell(RICN_IN_N)
      ELSE
        RCELL_OUT_N=RCELL_IN_N
    ELSE
      -- perform expansion behaviour
      IF ((cell_is_brm=1) AND (conn_is_vd=1))
        RCELL _OUT_N=recall_ta_RM_cell(RICN_IN_N)
      ELSE
        RCELL_OUT_N=RCELL_IN_N
    RICN_OUT_N=RICN_IN_N
    RBADR_OUT_N=RBADR_IN_N
    RFLAGS_OUT_N=RFLAGS_IN_N
VD EFCI Update
-- This block contains all methods which perform calculations -- and measurements based on cell_ingress events only. It also -- owns all the variables and parameters needed to perform -- those calculations and measurements.
i_upd_EFCI_state(icn, cell_efci)
-- This method updates the stored EFCI state for a connection. -- The EFCI state is used when generating turn-around BRM cells -- for connections for which the APS is a VD.
efci_state[icn]=cell_efci
clear_EFCI_state(icn, cell_efci)
-- This method clears the stored EFCI state for a connection. -- The EFCI state is used when generating turn-around BRM cells -- for connections for which the APS is a VD.
efci_state[icn]=0
Ingress Measurement
-- This block contains all methods which perform calculations -- and measurements based on cell_ingress events only. It also -- owns all the variables and parameters needed to perform -- those calculations and measurements.
calc_delta_T_In(current_ct_cnt, pid)
-- This method calculates the per port variable delta_T_In -- which is an exponentially weighted moving average of the -- time between ingress data cells on all ABR connection -- (including FRM cells) for port pid delta_T_In is used to -- calculate per port input rates.
delta_T_In[pid]=alpha_dt(current_ct_cnt−last_T_In[pid])+(1−alpha_dt) delta_T_In[pid]
last_T_In[pid]=current_ct_cnt
Egress Measurement
-- This block contains all methods which perform calculations -- and measurements based on cell_egress events only. It also -- owns all the variables and parameters needed to perform -- those calculations and measurements.
calc_delta_T_HP_Out(current_ct_cnt, pid)
-- This method calculates the per port variable delta_T_HP_Out -- which is an exponentially weighted moving average of the -- time between egress cells on non-ABR connections which are -- of higher priority than ABR traffic. delta_T_HP_Out -- is used to calculate the output rate of higher priority -- traffic which in turn is used to calculate the rate -- available to ABR.
delta_T_HP_Out[pid]=alpha_dt(current_ct_cnt−last_T_HP_Out[pid])+(1−alpha_dt) *
delta_T_HP_Out[pid]
last_T_HP_Out[pid]=current_ct_cnt
Queue Measurement
-- This block contains all methods which perform queue size -- measurements based on cell_ingress and cell egress events. -- It also owns all the variables needed to perform those -- measurements.
inc_q_sizes(pid)
-- This method increments per port and per connection queue -- sizes
Qsize[pid]=Qsize[pid]+1
dec_q_sizes(pid)
-- This method decrements per port and per connection queue -- sizes
Qsize[pid]=Qsize[pid]−1
Rate Calculation
-- This block contains all methods which calculate those RM -- cell fields which control the rate at which ABR source send -- cells. It also owns all the variables and parameters needed -- to perform those calculations.
calc_rate_fields(icn, cell_ER, cell_CI, cell_NI, fc_type):ER,CI,NI
-- This method calculates the total bandwidth that can be -- allocated as elastic ABR bandwidth to the ABR connections on -- a port.
pid=egress_pid[icn]
Port_EAR=calc_Port_EAR(pid)
Port_EIR=calc_Port_EIR(pid)
IF (fc_type=0)
    local_ER=calc_local_ER(icn, pid, cell_ER, Port_EAR, Port_EIR)
    ER=min(local_ER, cell_ER)
    CI=cell_CI
    NI=cell_NI
ELSE
    ER=cell_ER
    local_CI:local_NI=calc_local_CI_NI(pid, Port_EAR,
Port_EIR)
    CI=local_CI OR cell_CI
    NI=local_NI OR cell_NI
calc_Port_EAR(pid): Port_EAR
-- This method calculates the total bandwidth that can be --
    allocated as elastic ABR bandwidth to the ABR connec-
    tions on -- a port.
HP_Out_Rate=1/conv(delta_T_HP_Out[pid])
PSF=QSF_calc(Qsize[pid], Qthresh[pid])
Port_EAR=max(min_port_EAR, link_speed[pid] *
    TU[pid]-MCR_Total[pid]-HP_Out_Rate) * PSF
calc_Port_EIR(pid): Port_EIR
-- This method calculates the total elastic input bandwidth --
    measured for a given port.
Port_EIR=1/conv(delta_T_In[pid])-MCR_Total[pid]
calc_local_ER(icn, pid, Port_EAR, Port_EIR): local_ER
-- This method calculates the local Explicit Rate that the --
    switch is in a position to allocate to a connection. The --
    algorithm used is based on the ERSA+ER algorithm work
    -- performed in Concorde and Passport.
CSF=1.0
IF (Port_EIR<(1-delta_L2[pid])) * Port_EAR)
    SF=SF * (1+acc_factor * alpha SF[pid])
ELSE IF (Port_EIR<(1-delta_L1[pid])) * Port_EAR)
    SF=SF * (1+alpha_SF[pid])
IF (Port_EIR>(1+delta_H2[pid]) * Port_EAR)
    SF=SF * (1-acc_factor * alpha_SF[pid])
ELSE IF (Port_EIR>(1+delta_H1[pid]) * Port_EAR)
    SF=SF * (1-alpha_SF[pid])
RF=weight[icn]/total_weight[pid]
EAR=Port_EAR * RF * SF
local_ER=EAR +MCR[icn]
calc_local_CI_NI (pid, Port_EAR, Port_EIR):local_CI,
    local_NI
-- This method calculates the local Congestion Indication
    and -- No Increase flags that the switch is in a position to
    -- allocate to a connection. The algorithm for
    determining--- these is based on Port_EAR and Port_
    EIR for the port in -- question. The decisions for setting
    CI/NI are similar to -- those for calculating SF in calc_
    local_ER( ) but different -- delta's are used. Although not
    enforced in hardware, -- it is expected that delta_NI and
    delta_CI are both non-zero -- so as to set up three ranges
    in which Port_EIR can fall with -- respect to Port_EAR.
    The lower range results in CI/NI -- determined so as to
    produce an increase at the source. The -- middle range (in
    which Port_EAR falls) results in CI/NI -- determined so
    as to produce no rate change at the -- source. The upper
    range results in CI/NI determined so as -- to produce a rate
    decrease at the source.
IF (Port_EIR<(1-delta_NI[pid])) * Port_EAR)
    local_NI=0
ELSE
    local_NI=1
IF (Port_EIR>(1+delta_CI[pid]) * Port_EAR)
    local_CI=1
ELSE
    local_CI=0
VS ACR Update
-- This block contains all methods which calculate the
    Allowed -- Cell Rate (ACR) for connections for which the
    switch is a -- Virtual Source (VS). In order to do this, it
    emulates the -- end-system source and destination behav-
    iours associated -- with updating ACR. Upon updating
    ACR, this block notifies -- the shaping block of the new
    rate so that it can begin -- shaping the connection's output
    to that rate. This block -- owns all the variables and
    parameters needed to perform the -- the ACR calculations.
i_BRM_ACR_upd(icn, cell_NI, cell_CI, cell_ER, cell_
    BN):
SHP_UPD_RATE, SHP_UPD_ICN
-- This method is responsible for calculating a new ACR
    value -- when the switch receives a BRM cell on a
    connection for -- which it is a VS.
IF (cell_CI=1)
    ACR[icn]=ACR[icn]-ACR[icn] * RDF[icn]
ELSE IF (cell_NI=0)
    ACR[icn]=ACR[icn]+RIF[icn] * PCR[icn]
    ACR[icn]=min(ACR[icn], PCR[icn])
ACR[icn]=min(ACR[icn], cell_ER)
ACR[icn]=max(ACR[icn], MCR[icn])
IF (cell_BN=0) THEN
    unack[icn]=0
SHP_UPD_RATE=ACR[icn]
SHP_UPD_ICN=icn
e_FRM_ACR_upd(icn, current_ct_cnt): SHP_UPD_
    RATE, SHP_UPD_ICN
-- This method is responsible for calculating a new ACR
    value -- when the switch transmits a FRM cell on a
    connection for -- which it is a VS.
IF (((conv(current_ct_cnt)-last_FRM_time[icn])>ADTF
    [icn])
    AND (ACR[icn]>ICR[icn]))
    ACR[icn]=ICR[icn]
IF (unack[icn]>Crm[icn])
    ACR[icn]=ACR[icn]-ACR[icn] * CDF[icn]
    ACR[icn]=max(ACR[icn], MCR[icn])
SHP_UPD_RATE=ACR[icn]
SHP_UPD_ICN=icn
unack[icn]=unack+1
last_FRM_time[icn]=conv(current_ct_cnt)
VD Turn-Around
-- This block is responsible for generating BRM status
    update -- messages for the queuing and scheduling block
    when -- necessary.
i_ta_FRM(icn, brm_icn, allow_brm_msg): BRM_ICN,
    BRM_STATUS
-- This block, in conjunction with e_ta_FRM, are respon-
    sible -- for turning around FRM cells. It is assumed that
    the -- queueing block can not have more than one turn-
    around -- RM cell waiting at a time so this block, and
    e_ta_FRM, -- utilize a variable ta_cnt, to ensure as
    many BRM cells are -- sent back from a VD as FRM cells
    are received. -- Whenever this method determines that an
    RM cell should be -- turned around and one is not already
    waiting to be turned -- around in the queueing block, it
    indicates this to the -- queuing block via BRM_ICN and
    BRM_STATUS. This method is -- triggered by the
    ingress of a FRM cell on a connection for -- which the
    switch is a VD.
IF (ta_cnt[icn]=0)
    BRM_ICN=brm_icn
    BRM_STATUS=CELL_TO_TURN_AROUND AND
        allow_brm_msg ta_cnt[icn]=ta_cnt[icn]+1
e_ta_BRM(icn, brm_icn, allow_brm_msg): BRM_ICN, BRM_STATUS
-- This block, in conjunction with i_ta_FRM, are responsible -- for turning around FRM cells. It is assumed that the -- queueing block can not have more than one turn-around -- RM cell waiting at a time so this block, and e_ta_FRM, -- utilize a variable named ta_cnt, to ensure as many BRM cells -- are sent back from a VD as FRM cells are received. Whenever -- this method determines that an RM cell should be turned -- around and one is not already waiting to be turned around in -- the queueing block, it indicates this to the queueing block -- via BRM_ICN and BRM_STATUS. This method is triggered by the -- egress of a FRM cell on a connection for which the switch is -- a VD.
ta_cnt[icn]=ta_cnt[icn]-1
IF (ta_cnt[icn]>0)
    BRM_ICN=brm_icn
    BRM_STATUS=CELL_TO_TURN_AROUND AND allow_brm_msg
        save_ta_RM_cell(icn, cell)
-- This method saves a copy of a turn-around RM cell.
ta_cell[icn]=cell
recall_ta_RM_cell(icn): cell
-- This method reads a copy of a turn-around RM cell.
cell=ta_cell[icn]
RM Cell Generator
-- This block contains all the hardware necessary to generated -- and emit RM cells.
generate_FRM_cell(icn, acr): FRM_CELL
-- This method builds FRM cells for the APS. It is triggered -- by the receipt of a RICN and RFLAGS which indicate the APS -- is responsible for sending out an FRM cell for the given -- RICN connection.

| | | |
|---|---|---|
| FRM_CELL[5] = 1 | (HEX) | |
| -- ID | | |
| FRM_CELL[6][7] = 0 | | |
| -- DIR | | |
| FRM_CELL[6][6] = 0 | | |
| -- BN | | |
| FRM_CELL[6][5] = 0 | | |
| -- CI | | |
| FRM_CELL[6][4] = 0 | | |
| -- NI | | |
| FRM_CELL[6][3] = 0 (HEX) | | |
| -- RA | | |
| FRM_CELL[7:8] = PRC[icn] | | |
| -- ER | | |
| FRM_CELL[9:10] = acr | | |
| -- CCR | | |
| FRM_CELL[13:16] = 0 | (HEX) | |
| -- QL | | |
| FRM_CELL[17:20] = 0 (HEX) | | |
| -- SN | | |

Figure 30:
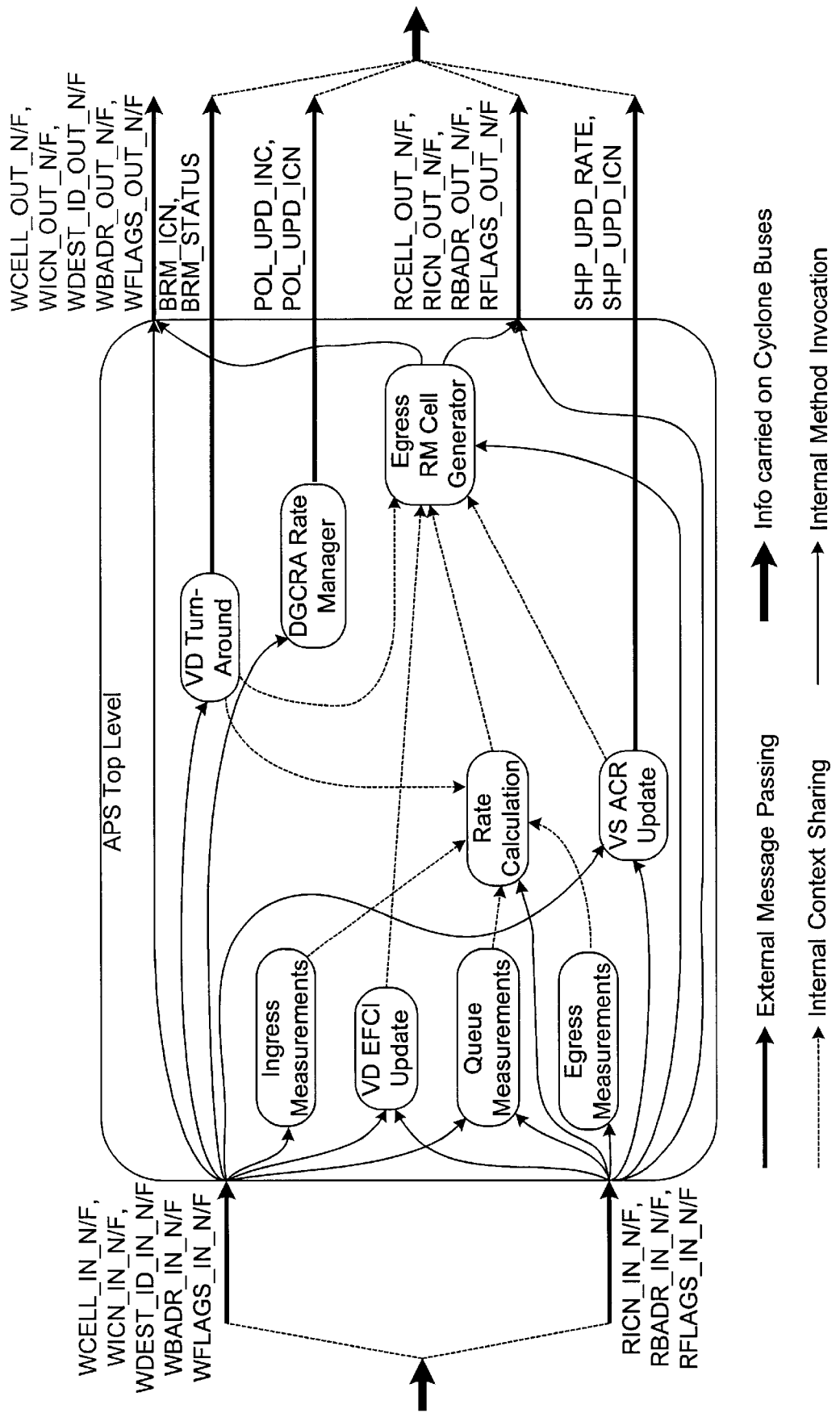
FIG. 30 is a top level data flow diagram for the blocks of the APS of FIG. 28.

Set reserved fields to 0x6A or 0x00 according to TM 4.0 [ ]
upd_BRM_cell(icn, ER, CI, NI, BRM_CELL, FLAGS_IN): BRM_CELL
-- This method builds BRM cells for the APS. It is triggered -- by the receipt of a RICN and RFLAGS which indicate the APS -- is responsible for sending out a BRM cell for the given RICN -- connection.
conn_is_vd=FLAGS_IN.CONN_IS_VD
IF(conn_is_vd)
    BRM_CELL.CI=efci_state[icn]|CI
    -- CI
    BRM_CELL.NI=NI
    -- NI
    BRM_CELL.ER=min(ER,cf*ACR[icn])
    -- ER
ELSE
    BRM_CELL.CI=CI[icn]
    -- CI
    BRM_CELL.NI=NI[icn]
    -- NI
    BRM_CELL.ER=ER[icn]
    -- ER
BRM_CELL.DIR=1
    -- DIR
calc_CRC10(CELL): CRC10
-- This method calculates and outputs CRC10 needed for -- integrity of RM cell payloads.
CRC10=calculated CRC10 value
    -- not further elaborated here
DGCRA Rate Manager
-- This block contains all methods needed to update the rates -- at which the policing block polices ABR connections.
-- For now a simple, low-cost, no frills, less than perfect -- algorithm is outlined.
i_FRM_PACR_upd(icn, ccr): POL_UPD_INC, POL_UPD_ICN
-- This method updates the PACR for the policing block based on -- the CCR received in FRM cells. It clamps the PACR to be -- between the connection's MCR and PCR. The clamped value is -- issued immediately to the policing block. This method is -- intended to work for connections using either relative or -- explicit rate flow control. -- This method does rely on the connection's source following -- the end-system behaviour for updating ACR and correctly -- filling this ACR in the FRM cell. It is understood that -- there could be sources which can not be trusted to behave -- like this. For sources which set there CCR somewhere -- between -- where it should actually be and PCR, this method does still -- police at the rate but at least it is tighter than policing -- at PCR only. For connections which incorrectly set their -- CCR above PCR, this method results in policing at PCR, which -- is just as tight as PCR policing and not much more expensive -- to implement. For connections which set the CCR below the -- value which this switch instructed it to be (the ER that was -- set back or the new value indicated by CI/NI) then this -- method still allows the connection to be policed at that -- lower ACR indicated by the source. For sources which implement CCR modification and -- notification correctly this method allows the connections to -- be policed as tight as possible.
PACR=min(PCR[icn], ccr)
PACR=max(MCR[icn], ccr)
POL_UPD_INC=1/PACR
POL_UPD_ICN=icn FIG. 30 is a top level data flow diagram which illustrates the high-level flow of data within the APS. The left hand side of the diagram shows the arrival of the cell ingress (top) and cell egress (bottom) messages at the APS via the common bus. At left edge of the APS, several arrows fan out from the cell ingress and cell egress messages and this represents the cell_ingress( ) and cell_egress( ) methods invoking various methods in the APS' blocks to process the cell ingress and cell egress input messages. The dashed arrows flowing between the APS blocks represents the sharing of per port or per connection variables and parameters between the blocks that own them and other blocks that might require them. External output messages are shown leaving from the right hand side of the APS and are carried to other blocks in the switch via common bus.

Memory Descriptions

Internal memory is used for storage of per port parameters and variables. Internal memory is located inside the ASIC or in Level one cache for the cases of ASIC microprocessor APS implementations respectively.

External memory is required for storage of per connection parameters and variables and consists of RAM (random access memory) chips. In the above described example, each connection requires partitions which supply 32 bit and 256 bit context blocks for each of 128 k connections which need to be supported. These partitions will be referred to as partition 0 and partition 1 respectively. In order to keep up with the required processing bandwidth, partition 0 needs a 32 bit wide data path while partition 1 needs a 128 bit wide data path. This means that the physical memory arrays must be 32×128K 94 Mbits total) and 128×256K (32 Mbits total) for context partitions 0 and 1 to support 128K connections. An additional memory is required to store turn-around cells and this will be referred to as the turn-around cell memory array. The turn-around cell memory array must be 128× 512K bits (64 Mbits total) to support 128K connections. Depths can be decreased to handle fewer connections in some applications.

Figure 31:
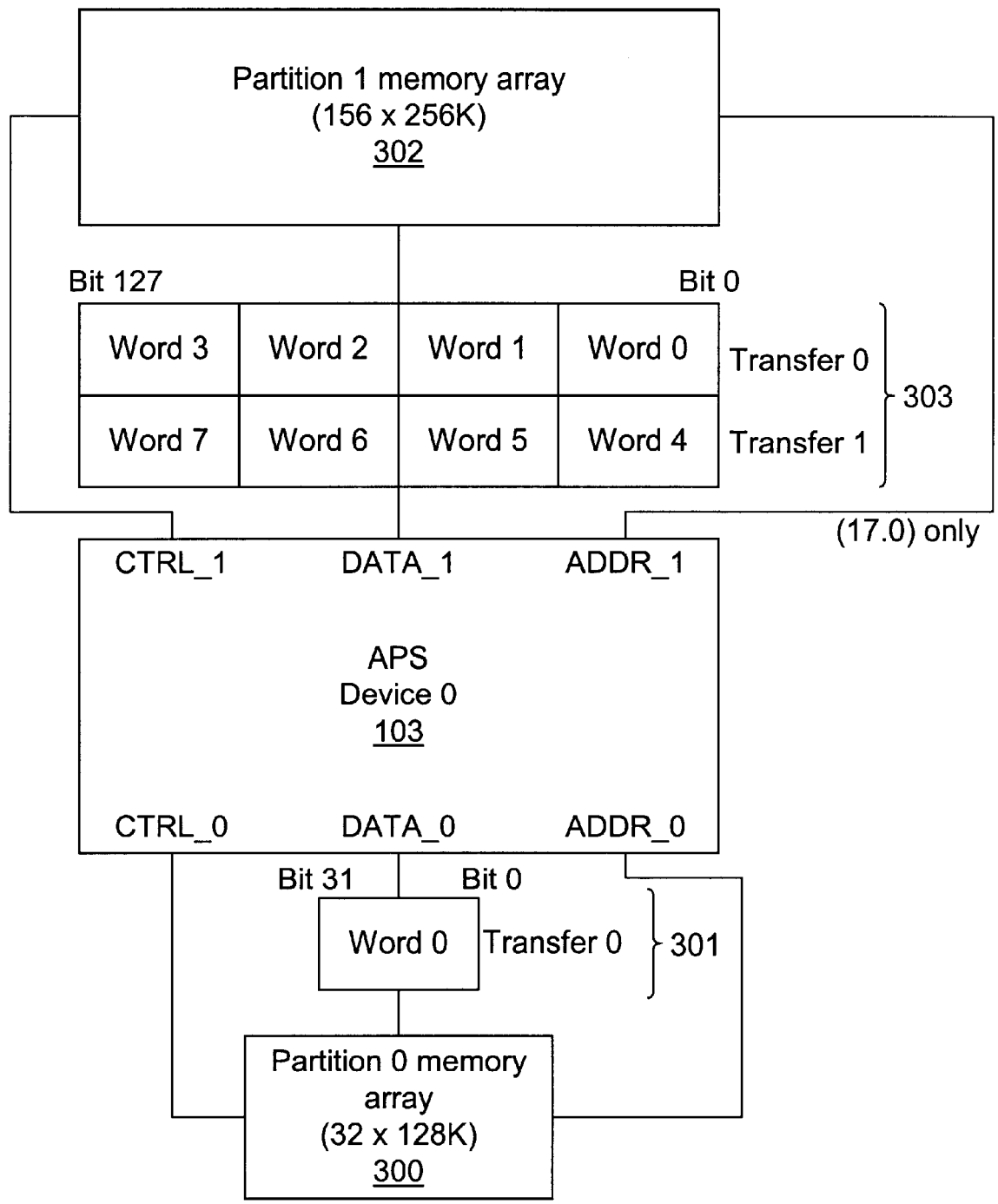
FIG. 31 is a block diagram of memory details for APS0.
Figure 32:
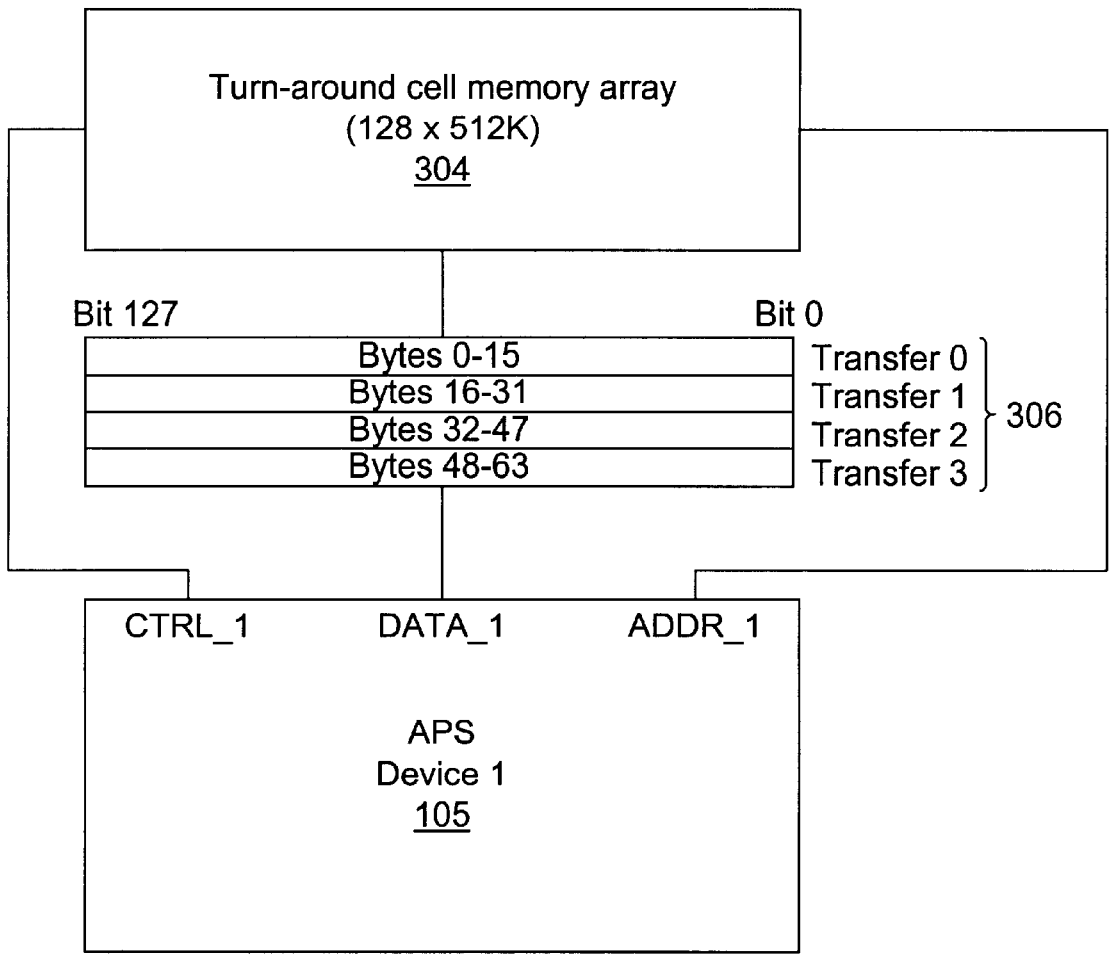
FIG. 32 is a block diagram of memory details for APS1.

FIG. 31 illustrates the physical memory details pertaining to APS0. APS0 103 is shown interfacing with a partition 0 memory array 300 through a single 32 bit transfer 301 and to a partition 1 memory array 302 through two 128 bit transfers 303. FIG. 32 illustrates the physical memory details pertaining to APS1. APS1 105 is shown interfacing with a turn-around cell memory array 304 through four 128 bit transfers 306.

Table 2 shows the global context used by the above described APS.

TABLE 2

| Bit Level | Description |
|---|---|
| | Global context word |
| current_ct_cnt | Global cell time counter for the APS which increments once per OC-48 cell time (-every 170 ns)<br>-26 bit integer (to accommodate 10.23 s maximum value of ADTF in [] for VS behaviour<br>-wraps around to 0 upon reaching max. Value |

Table 3 shows the per port context information used in the above described APS.

TABLE 3

| | Port context |
|---|---|
| alpha_dt | -Factor used to do Exponential Weighted Moving Average on delta_T_In<br>-4 bit denominator exponent producing (1/1 to 1/28) |
| delta_SF_L1,2<br>delta_SF_H1,2 | -Defines the target range about Port_EAR toward which the algorithm steers the SF and the mild and accelerated increase and decrease ranges for SF<br>-4 bit denominators exponent producing 1/1 to 1/28) |
| acc_factor | -Use to boost the effect of alpha_SF on SF changes when Port_EIR is beyond delta_SF_L2 or delta_SF_H2 relative to Port_EAR<br>-3 bit exponent (producing 1 to 128) |

TABLE 3-continued

| | Port context |
|---|---|
| alpha_SF | -Scaling factor used to adjust SF<br>-4 bit denominator exponent (producing 1/1 to 1/32768 |
| Qthr | -Per port queue fill threshold<br>-17 bit integer |
| min_port_EAR | -Can be set to non-zero values to reclaim unused MCR BW when the ports total_MCR has been overbooked. Typically set to 0.<br>-15 bit floating point |
| Link_Speed | -Physical link bandwidth provided on a port<br>-15 bit floating point |
| TU | -Target Utilization on the port (scales link_speed)<br>-9 bit fractional integer (increments of 1/512) |
| total_weight | -Total ABR weight for the whole port.<br>-17 bit integer |
| total_ABR_MCR | -Sum of all the port's ABR connection's MCRs<br>-15 bit floating point |
| total_MCR | -Sum of all guaranteed bandwidth assigned on the port which is not covered in HP_Out_rate. This includes ABR MCR and non-ABR MCR (i.e. UBR+)<br>-15 bit floating point (ne5m9) |
| delta_NI | -Determines the value of Port_EIR relative to Port_EAR, above which local NI is set to 1<br>-8 bit fractional integer (increments of 1/256) |
| delta_CI | -Determines the value of Port_EIR, relative to Port_EAR, above which local_CI is set to 1<br>-8 bit fractional integer (increments of 1/256) |
| last_T_In | -Last time an ABR cell arrived on a given port<br>-26 bit integer (same size as current_ct_cnt |
| delta_T_In | -EWMA'd average time between ABR cell arrivals on a port. Used to calculate Port EIR<br>-36 bit integer with 10 bits to the right of the decimal point |
| last_T_HP_Out | -Last time a cell of higher priority than ABR elastic cell left the port<br>-26 bit integer with three bits to the right of the decimal point |
| delta_T_HP_Out | -EWMA's average time between departure of cells that are a higher priority than ABR elastic cells. Used to calculate HP_Out_Rate.<br>-36 bit integer with 10 bits to the right of the decimal point |
| Qsize | -Number of ABR cells queued on a port<br>-17 bit integer |

Table 4 shows the per connection parameters and variables for use in the above described APS.

TABLE 4

| Bit Label | Description |
|---|---|
| | Connection parameters and variables |
| e_pid | -Port ID of egress port for given connection<br>-8 bit integer (up to 256 ports) |
| my_abr_conn | -indicates whether a connection is an ABR connection owned by the APS<br>-1 bit flag |
| dgcra_en | -1 indicates APS should support DGCRA sending policing parameter update to an external |

TABLE 4-continued

Connection parameters and variables

| Bit Label | Description |
|---|---|
|  | policer for a given connection, 0 indicates no DGCRA support<br>-1 bit flag |
| fc_type | -0 indicates APS should update ER filed for connection, 1 indicates APS should update CI/NI<br>-1 bit flag |
| conn_is_hp_ae | -1 indicates all cells on the connection are higher priority than ABR elastic cells and 0 indicates they are not<br>-1 bit flag |
| rev_icn | -maps the forward going connection on which data and FRM cells travel to the backward going connection on which BRM cells travel<br>-7 bit integer (same size as ICN, supports up to 128K connections) |

Table 5 shows more per connection parameters and variables for use in the above described APS.

TABLE 5

Connection parameter and variable connect

| Bit Label | Description |
|---|---|
| cf | -Coupling Factor. Used to couple the ACR rate being used for forward data cells at a VS to the ER value being sent back in BRM cells from a corresponding VD<br>-2 bit exponential (1,2,4,8) |
| weight | -Determines a connection's share of available ABR elastic bandwidth. Actual ration of ABR elastic bandwidth allotted to the connection is weight/total_weight<br>-17 bit integer |

Table 6 shows more per connection parameters and variables for use in the above described APS.

TABLE 6

Connection parameter and variable context

| Bit Labels | Description |
|---|---|
| Reserved | Reserved |
| MCR | -Minimum Cell Rate of the connection negotiated at setup time<br>-15 bit tloating point (ne5m9) |

Table 7 shows the per connection parameters and variables for use in the above described APS.

TABLE 7

Connection parameter and variable context

| Bit Label | Description |
|---|---|
| Reserved | Reserved |
| ADTF | -ACR Decrease Time Factor. Time permitted between sending FRMs before which the source or VS must reduce the connection rate to ICR<br>-10 bit integer (in range of 0.01 to 10.23 s with increments of 0.01 s) |
| Reserved | Reserved |

TABLE 7-continued

Connection parameter and variable context

| Bit Label | Description |
|---|---|
| ICR | -Initial Cell Rate of a given connection negotiated at setup time<br>-15 bit floating point |

Table 8 shows the per connection parameters and variables for use in the above described APS.

TABLE 8

Connection parameter and variable context

| Bit Label | Description |
|---|---|
| Reserved | Reserved |
| CDF | -Cutoff Decrease Factor of a given connection negotiated at setup time<br>-3 bit denominators exponent (producing 0 or 1/1 to 1/32768) |
| RIF | -Rate Increase Factor of a given connection negotiated at setup time<br>-3 bit denominator exponent (producing 1/1 to 1/32768) |
| RDF | -Rate Decreased Factor of a given connection negotiated at setup time<br>-3 bit denominator exponent (producing 1/1 to 1/32768) |
| Reserved | Reserved |
| Crm | Missing Rm cell count. Limits the number of FRM cells sent in the absence of received BRM cells. Used to determine when the decrease ACR by CDF*ACR<br>-8 bit integer |

Table 9 shows the per connection parameters and variables for use in the above described APS.

TABLE 9

Connection parameter and variable context

| Bit Label | Description |
|---|---|
| e_pid | -Port ID of egress port for given connection<br>-8 bit integer (up to 256 ports) |
| PCR | -Peak Cell Rate of a given connection negotiated at setup time<br>-15 bit floating point |

Table 12 shows the per connection parameters and variables for use in the above described APS.

TABLE 12

Connection parameter and variable context

| Bit Label | Description |
|---|---|
| last_FRM_time | -Stores time stamp of last time an FRM cell was sent out by the VS. Gets loaded with current_ct_cnt when a new FRM cell has been sent out<br>-26 bit integer (must be large enough to equal the largest support value of ADTF which can be as large as 10.23 s or greater than $2^{25}$ OC-48 cell times) |

Table 11 shows the per connection parameters and variables for use in the above described APS.

TABLE 11

Connection parameter and variable context

| Bit Label | Description |
| --- | --- |
| Reserved unack | Reserved<br>-number of FRM cells that have been sent out since the last BRM cell was received. Incremented with each FRM transmitted and -cleared on the reception or a BRM cell with BN equal 0<br>-8 bit integer |
| Reserved ACR | Reserved<br>-Actual Cell Rate of a given connection. Stores the value of the rate at which a VS should be emitting cells for the connection.<br>-15 bit floating point (ne5m9) |

Table 12 shows the per connection parameters and variables for use in the above described APS.

TABLE 12

Connection parameter and variable context

| Bit Label | Description |
| --- | --- |
| Reserved EFCI_state | Reserved<br>-Stores the value of the last data cell's EFCI bit for a given connection for use by a VD when turning around FRM cells<br>-cleared when a FRM cell is turned around<br>- 1 bit flag |
| Reserved ta_cnt | Reserved<br>-For a VD, counts the number of outstanding received FRM cells for which there has not yet been a BRM cell sent back to the source<br>-7 bit integer |

Preferred Switch Architecture

Figure 33A:
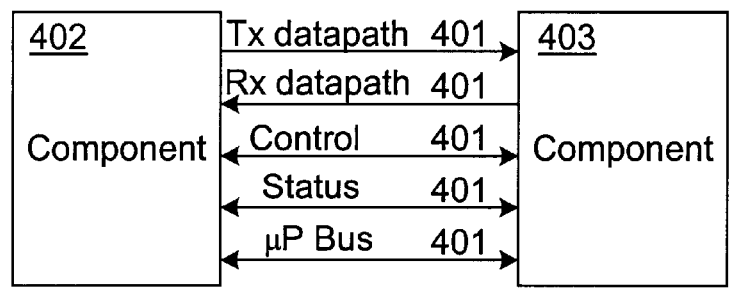
FIGS. 33a, 33b and 33c illustrate the differences between the traditional interconnection method used by prior art packet switches, and a novel interconnection method according to an aspect of this invention.
Figure 33B:
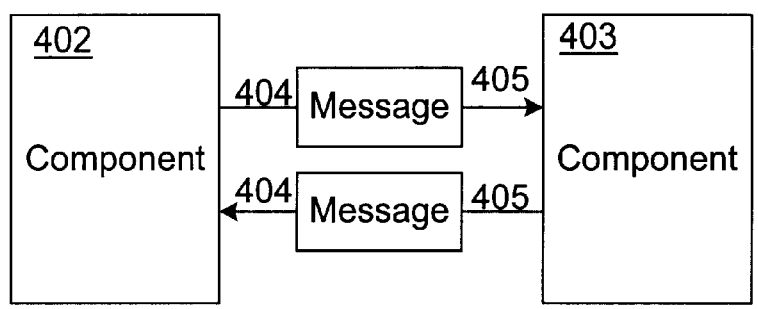
Figure 33C:
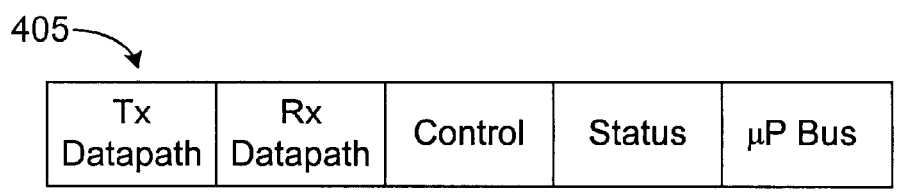

In the above description, an embodiment of the APS has been described in a general context without specifying the manner in which communication with the components forming the remainder of the switch is achieved, and without specifying details of the overall architecture of the switch. According to an aspect of the invention, the above described APS is used in a packet switch with a novel interconnection method and a novel partitioned architecture. FIGS. 33*a*, 33*b* and 33*c* illustrate the differences between the traditional interconnection method used by prior art packet switches, and a novel interconnection method according to an aspect of this invention. The traditional approach, which is illustrated in FIG. 33*a*, requires a plurality of control lines 401 that are particular to the components 402,403 being interconnected. By contrast, the novel approach illustrated in FIG. 33*b* and described herein, is implemented using a pair of generic unidirectional buses 404 that carry program data units (PDUs) 405 in accordance with protocols shared by the interconnected components 402,403. In other embodiments of this approach, a single bidirectional bus could be substituted for the unidirectional buses 404. The same type of bus 404 is used to interconnect all sets of components on the switch. FIG. 33*c* shows that the PDU 405 of FIG. 33*b* contains all the information being communicated across the plurality of control lines 401 in FIG. 33*a* during a given period of time. Differences in the information that has to be communicated between different sets of components, are accommodated by varying the contents of the PDUs, rather than by varying the structures of the connections shared by the components 402,403 and therefore the structures of the components 402,403. Decoupling of the components 402, 403 is thus achieved.

A new partitioning of the traditional packet switch architecture is also provided. A new partitioning is carried out to optimally leverage the advantages gained by decoupling the components using the aforementioned messaging method. Leverage can be achieved by ensuring, where possible, that functions which tend to change at the same times are implemented by the same components. If the architecture is not partitioned to achieve this goal, then the advantages gained by decoupling components will be lost since each decoupled component will have to be upgraded at the same times anyway. Another goal in partitioning the architecture is to map related functions on to the same components in order to optimize usage of resources such as memory.

In introducing the components that comprise the architecture, the novel partitioning is described first. The novel messaging method is described afterwards.

Figure 34:
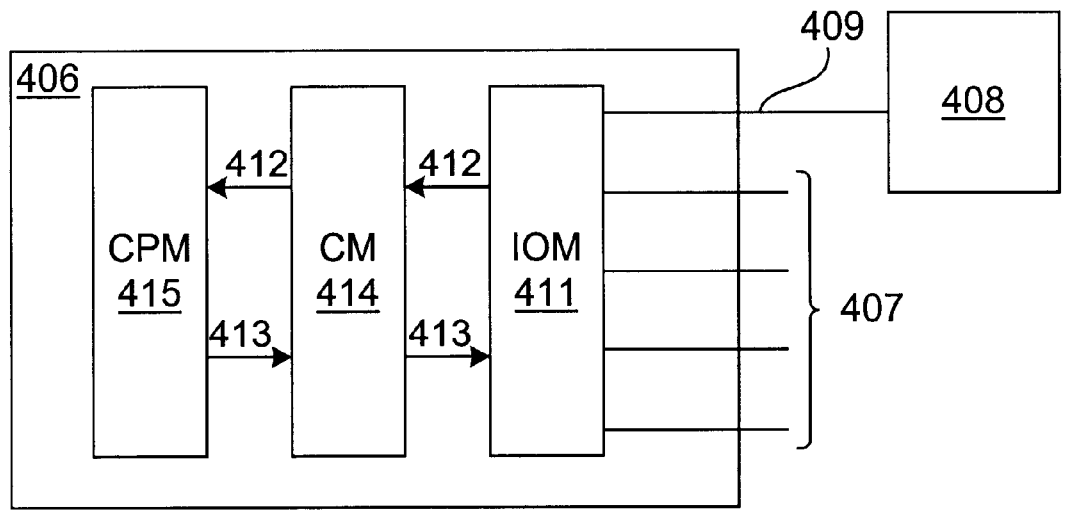
FIG. 34 illustrates an Asynchronous Transfer Mode (ATM) switch architecture that is partitioned according to an embodiment of this invention.

FIG. 34 illustrates an Asynchronous Transfer Mode (ATM) switch architecture that is partitioned according to an embodiment of this invention. In FIG. 34, a switching element 406 (SE) terminates several network links 407 supporting the ATM suite of protocols, such as those defined in the User-Network Interface (UNI) specification. As in some prior art switches, the software control functions are implemented on a computing unit (CU) 408 that is connected to the SE 406 through a high-speed link 409, which is an OC-403 or OC-412 link in a preferred embodiment. All communication between the CU 408 and the SE 406 is carried out according to the ATM suite of protocols in a preferred embodiment. In other preferred embodiments, other protocol suites such as the Ethernet suite of protocols could be implemented over the link 409. It is to be noted that this embodiment involves decoupling the components that implement software control functions from the components that implement other functions, as is the case with some prior art architectures.

The SE 406 contains an input/output module 411 (IOM) that terminates one or more of the network links 407. The IOM 411 is connected through a pair of unidirectional buses 412,413 (one bus for each direction) to a cell memory (CM) 414, which in turn is connected through further pairs of unidirectional buses 412,413 to a cell processing module (CPM) 415. It is to be noted that the embodiment of FIG. 34 involves decoupling the IOM 411 which implements line interface functions, from the CPM 415 which implements cell processing functions, as is the case with some prior art architectures.

The buses 412,413 are each implemented by a generic bus which carries messages, such as the PDU 405 of FIG. 33*b* and FIG. 33*c*, in accordance with a single set of protocols regardless of the modules being interconnected. More specifically all the interconnections between modules of the preferred embodiment of FIG. 34 are achieved using the pairs of unidirectional buses 412,413 that each comprise 24 signal lines, each signal line having a data rate of 622 Mbps. This gives the bus a total throughput of 15 Gbps, which easily accommodates both network traffic flows through the switch of up to 10 Gbps as well as any internal messaging flows taking place between the modules. The modules place PDUs on and remove PDUs from the bus using known frame-based timing structures, which are hereinafter referred to as bus frames. The frames used in a preferred embodiment each comprise 32 data transfers, with each transfer resulting in the transmission of a 24 bit word across the 24 signal-line bus. A complete frame is transferred though the switch every 694 ηs. The 32 data-transfer length of each frame makes it large enough to store several cell-sized PDUs.

The IOM 411 implements the interface between the buses 412,413 and the network links 407. Since the IOM 411 has full access to the buses 412,413, its throughput can extend up to 15 Gbps. It is to be noted that several smaller IOMs can replace the single IOM 411 of FIG. 34.

The cell memory (CM) 414 serves as the storage element of the SE 406. The memory 414 buffers cells received from the IOM 411 until they are scheduled for transmission by the CPM 415. The CM 414 includes components that implement a buffer address management function that controls the use of addresses in the cell memory, and a cell header and cell multiplexing function which is required to effect virtual path (VP) switching, and to insert cells into the egress flow.

The CPM 415, which is described more fully below, implements cell processing functions that control the cell traffic flowing through the switch.

Cells flow into the SE 406 through the network links 407 and the IOM 411. The cells use the ingress bus 412 to flow from the IOM 411 into the CM 414 where they are buffered. While the cells are buffered in the CM 414, cell processing functions relating to the buffered cells occur in the CPM 415. Once components inside the CPM 415 decide certain buffered cells are to be transmitted from the SE 406, the cells are removed from the CM 414 and sent out though the egress connection 413 to the IOM 411, where transmission across one or more network links 407 is effected. The CPM 415 occasionally generates its own cells for transmission through the same egress path.

Figure 35:
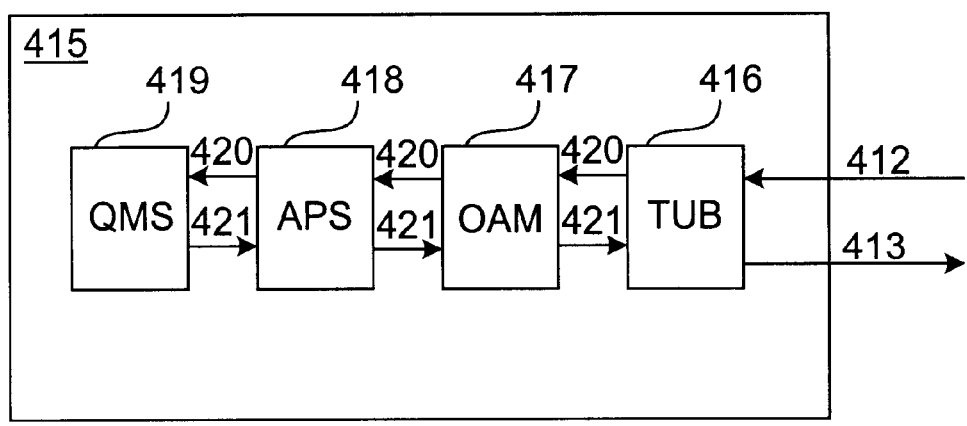
FIG. 35 illustrates an architecture of the cell processing module (CPM) of FIG. 34 according to an embodiment of this invention.

FIG. 35 shows that the CPM 415 is partitioned into four logic components that are each implemented as an application specific integrated circuit (ASICs) in a preferred embodiment. It is to be noted that other implementations of the logic components are also possible. Each component is capable of supporting a cell processing throughput of 2.5 Gbps. The CPM 415 comprises a Translation, Usage Parameter Control, and Buffer Manager (TUB) component 416, an Operations, Administration and Maintenance (OAM) component 417, the previously described Available Bit Rate (ABR) processing subsystem (APS) component 418, and a queue management and scheduling subsystem (QMS) component 419. Interconnecting the components 416 through 419 are further generic unidirectional buses 420, 421 which handle messages that accord with a single set of protocols. It is to be noted that because the architecture described herein is recursive in nature, in other embodiments of the novel architecture, each of these logic components could be replaced by a plurality of logic components that are themselves partitioned and interconnected in accordance with the same concepts used in partitioning and interconnecting the components comprising the SE 406 and the CPM 415.

The buses 420, 421 are smaller versions of the buses 412,413. More specifically twelve signal lines are used to implement the buses 420, 421 for a total bandwidth of 7.5 Gbps, as opposed to the 24 lines used to implement the buses 412, 413. The interface from the buses 412, 413 to the smaller buses 420,421 is implemented by an encapsulating logic ring (ELR) 422 that is described below.

The TUB 416 performs both ingress and egress address translations, implements the Usage Parameter Control (UPC) protocol (more generally known as policing), and performs buffer management functions related to CM 414 usage. It is to be noted that the TUB 416 would implement the policing function using the Network Parameter Control (NPC) protocol for links 407 that are supporting the protocols defined by the Network-Network Interface (NNI) specification. The translation function converts the ATM header and port identity into an internal connection number (ICN) in the ingress direction. The reverse conversion is also performed by the TUB 416 in the egress direction. The buffer management function is primarily focused on the implementation of cell discard algorithms. The TUB 416 receives policing parameter updates from the APS 418, in order to implement a dynamic generic cell rate algorithm (DGCRA) policing function for Available Bit Rate (ABR) connections.

The OAM 417 implements the functionality defined by ITU-T Recommendation I.610. The OAM 417 can terminate and source all OAM flows. The OAM 417 can monitor all arriving cells for OAM cells and insert OAM cells into an egress cell stream in order to support performance management flows.

The APS 418 implements rate based flow control as defined in the ATM Forum (ATMF) TM4.0 specification. The APS 18 monitors cell traffic, receives and processes resource management (RM) cells, and executes rate calculation algorithms. The APS 418 additionally provides rate update and RM cell status information to the scheduler in the QMS 419 in order to allow the latter to ensure that the Quality of Service (QoS) requirements of all supported applications are met. The APS 18 also provides information that allows the TUB 416 to update its policing parameters.

The QMS 419 performs two primary functions—the maintenance of cell queues and the scheduling of cell transmissions. In order to support rate-based scheduling, the QMS 419 includes a per connection shaper. The QMS 419 also implements a two-stage output queueing structure. Cells are queued on a per connection basis in the first stage. At the second stage, connections are queued according to the type of traffic being supported, in order to implement QoS guarantees and virtual ports.

Communication takes place within the above-described architecture by transmitting PDUs such as the PDU 405 of FIG. 33 across the generic buses 412,413,420,421. Generally, modules or components situated on the buses 412,413,420,421 (the modules or components collectively referred to as bus components hereinafter) wishing to send information to another given bus component, write information to a field of a PDU that flows through all the bus components. When the PDU arrives at the other given bus component, the given bus component reads the information from the field.

There are three types of PDUs that are transferred between the bus components namely cell information blocks (CIB), control update blocks (CUB) and software control packets (SCP).

CIBs are inserted into bus frames which are sent from one bus component to another. CIBs are created either when a cell arrives at the switch, or when a cell is preparing to depart from the switch. The information each CIB contains is specific to a cell entering or leaving the switch through an IOM 411. A CIB comprises several fields of bits. CIBs associated with the arrival of a cell from the network are referred to as ingress CIBS, while those associated with the departure of a cell for the network are referred to as egress CIBs.

As a CIB is passed from one bus component to another, information can be concatenated to, added to or dropped from the CIB. Concatenation occurs when a bus component concatenates new fields of information to the received CIB before sending it to the neighbouring down-stream bus component. Adding occurs when a bus component replaces information in fields of the received CIB, with new information. Dropping occurs when a bus component reads information from fields of the received CIB. This method of communication allows the downstream bus components to have visibility of the control functions being implemented by the upstream bus components. Bus components can also create or consume CIBs depending on which functions they support. Finally, a bus component can allow CIBs which contain information intended for other downstream bus components, to simply pass through to those other components.

Since a CIB is moved along one of the buses 412,413, 420, 421 inside a bus frame, its size is an integer multiple of the number of bits per transfer that is possible on the bus. If the CIB is flowing through one of the smaller buses 420, 421 for example, its size is an integer multiple of 12 bits. Likewise, if the CIB is flowing through is one of the larger buses 412, 413, then its size is an integer multiple of 24 bits. The last data transfer comprising a CIB may not always be fully populated by information.

FIG. 36 illustrates the overall chronology of the journey of a CIB through the architecture of FIG. 34 and 35. The letter-labels are used to distinguish between different stages of the journey. These stages are described below. It is to be noted that the names used to refer to the CIB change as it progresses through the SE 406, and as its composition is varied as a result of the operations performed on it by the bus components.

The CIB is created when a cell arrives at the switch through one of the network links 407, through the IOM 11. The IOM 11 creates a CIB called the IOM ingress CIB, which is illustrated in FIG. 36. FIG. 36 shows that the CIB is 24 bits wide, 24 bits being the amount of data sent in each data-transfer across the 24 signal lines of the buses 412,413. FIG. 37 also shows this particular CIB to be 18 data-transfers long. The CIB is long enough to contain the cell that just arrived at the switch, which itself comprises a generic flow control (GFC) field, a Virtual Port/Channel Identifier (VPI/VCI) field, a payload type (PT) field, a call loss priority (CLP) field and payload octets. The IOM 411 concatenates a port identity field, ingress_port ID, to the head of the cell.

At stage A, the IOM ingress CIB is sent to the CM 414 which stores the cell. The CM 414 does not consume the cell inside the IOM ingress CIB however, just in case the incoming cell is a control cell, which would mean that its payload field would be useful to at least one of the bus components in the CPM 415. Instead, the CM 414 concatenates a field of flags the downstream components can use to determine whether or not they need to access the CIB, as well as a Write Buffer Address (WBADR) field containing the address of the cell in the CM 414 and passes the CIB to the CPM 415. The resulting CIB is referred to as a CM ingress CIB, which is 19 data transfers long. The CM ingress CIB is illustrated in FIG. 38.

At stage B, the CM ingress CIB is passed to the CPM 415. More specifically, the CM ingress CIB is passed to the TUB 416, once it is transferred from the twenty-four signal-line bus 412 to the smaller bus 20. Note that since the buses 420, 421 inside the CPM 415 are only 12 bits wide, the number of bits per transfer is reduced from 24 to 12. Each bus frame still comprises 32 data transfers. The TUB 416 receives the CM ingress CIB, reads the cell's header fields, and uses them to. perform a table look-up. The result of the look-up is an Internal Connection Number (ICN) that the switch uses to refer to the VPI/VCI with which the contained cell is associated. The TUB 416 also reads the cell's header fields to apply discard functions to the contained cell. The TUB 416 generates a TUB ingress CIB, which is shown in FIG. 39. Though the TUB ingress CIB is 40 data transfers long since the bus 420 can only handle 12 bits per data transfer, it is shown as if it were flowing on the larger 24 signal line ingress bus 412 in order to facilitate the making of comparisons between it and the CIBs being transferred over the larger buses 412,413. FIG. 39 shows that the TUB ingress CIB is formed by concatenating the CM ingress CIB with a Write ICN (WICN) field containing the result of the ICN look-up functions, and an Ingress flags field containing the result of the discard functions.

At stage C, the TUB ingress CIB is forwarded to all other bus components in the CPM 415, which access the field to perform various cell processing functions that have been briefly described above. The OAM 417 and the APS 418, for example, read certain fields of the TUB ingress CIB for processing purposes, and then pass the CIB on to the next downstream component.

At the end of stage C, the QMS 419 reads the TUB ingress CIB that was passed through the APS 418. The QMS 419 notes the CM 414 address of the given cell associated with the CIB, and uses any control information in the CIB to help it schedule the given cell's transmission from the switch. Once the QMS 19 does not need to read any more of the contents of the TUB ingress CIB, the QMS 419 consumes the TUB ingress CIB.

The copy of the cell that was stored in the CM 414 at stage A, remains buffered in the CM 414 until the QMS 419 determines the time has arrived to transmit the cell from the switch. When this time arrives, which is at stage D of the chronology illustrated in FIG. 36, the QMS 419 generates a QMS egress CIB, which is illustrated in FIG. 40. The QMS egress CIB contains the ICN and memory address within the CM 414 of the egress cell, which are held in the Read ICN (RICN) and Read Buffer Address (RBADR) fields respectively. A miscellaneous collection of flags containing control information that is related to the egress cell are also included in the Egress flags field. The QMS egress CIB is six data transfers long, assuming the egress bus 421 within the CPM 415 is only 412 signal lines side.

The APS 418 receives the QMS egress CIB, and concatenates any additional cells that the APS 418 has generated for transmission, such as resource management (RM) cells. The APS 418 needs to access control information from the QMS 419, which is held in the egress flags field of the QMS egress CIB, to decide whether or not to add its own cells to the egress flow. If the APS 418 is concatenating a cell to the QMS egress CIB, then an APS egress CIB containing that cell is generated by the APS 418, which would be 442 data transfers in length. The APS egress CIB also contains a field that identifies the port through which the APS-generated cell must be transmitted. This is shown in FIG. 40 which illustrates the APS egress CIB. If the APS 418 is not concatenating a cell, then the payload and cell header fields of the APS egress CIB are filled with null data. Flags in the flag fields of the APS egress CIB are set to indicate to downstream bus components whether or not a cell has been concatenated by the APS 418.

The APS egress CIB is transferred to the OAM 417 at stage E. The OAM 417 simply forwards the APS egress CIB if it has no cells of its own to insert. If the OAM 417 has an OAM cell to transmit, a contingency that is determined independently of any flags included in the APS egress CIB, the OAM 417 will insert the cell into the egress flow. More specifically, if the APS 418 does not send a cell, and the OAM 417 has a cell to transmit, then it overwrites the cell fields of the APS egress CIB, which are filled with null data. If the APS 419 has inserted a cell into the APS egress CIB, and the OAM 417 wishes to add another cell to the egress flow, then the OAM 17 intercepts the APS egress CIB, delays its transfer while it creates a new APS egress CID containing the cell it wishes to transmit, and then forwards both resulting APS egress CIBs downstream to the TUB 416. The variable insertion of a CIB by the OAM 417 is transparent to downstream bus components since CIBs that are created by the OAM 417, and CIBs that are merely received and forwarded by the OAM 417, both have the formats of the APS egress cell shown in FIG. 40.

At stage F of the chronology illustrated by FIG. 36, the TUB 416 receives the APS egress CIB, and generates a TUB egress CIB, which is illustrated in FIG. 42. The TUB egress CIB, which is 21 data transfers long, is generated when the TUB 416 overwrites the cell header fields with egress look-up data. The TUB 416 must account for the variation in bandwidth of the useful data contained in the APS egress CIBs which, as mentioned before, may or may not contain a cell to transmit. In most cases, neither the OAM 417 nor the APS 418 would have inserted cells into the egress flows, and so the TUB egress CIB would simply include the egress look-up data inserted by the TUB 416, and the null data included in the APS egress CIB.

At stage G of the chronology illustrated by FIG. 36, the TUB egress CIB arrives at the CM 414. If the upstream bus components in the CPM 415 have inserted a cell into the CIB, that cell is stripped from the CIB and placed in a CM ingress CIB, which is passed through to the IOM 411. If the upstream bus components in the CPM 15 have not inserted a cell into the CIB, the data in the headers of the TUB egress CIB is used to read from the CM 414 a cell that the QMS 419 has recently designated for transmission. More specifically, the CM 414 uses the RBADR and the RICN fields to read the cell to be transmitted out from memory, and writes the cell into the CM egress CIB. The CM egress CIB, which is illustrated in FIG. 43, comprises 19 data transfers, and is passed downstream to the IOM 411.

At stage H, the IOM 411 consumes the CM egress CIB. More specifically, it strips away the cell enclosed within the CM egress CIB, and uses any control attached information inserted by the upstream bus components (i.e. the egress flags field) to forward the cell to the appropriate network link 407. The transmission of the cell through one of the network links 407 ends the cell-processing sequence performed on the switch, the sequence being executed by a series of components that communicate with one another across generic buses 412,413,420,421 using CIBs.

It is to be noted that in order for the switch to support a 2.5 Gbps cell switching rate, each frame (which, as mentioned before, is transferred between bus components every 694 ηs) must carry four CIBs.

Exchanges of PDUs on the switch can serve purposes other than switching a cell between the network links 407, or transferring OAM or RM cells to the links 407 for transmission. Many PDUs are exchanged in order for the switch to be able to provide features that require coordination between several bus components. Unlike the information contained in the CIBs, such control information can be transmitted independently of cell flows. Control update blocks (CUBs) CUBs, the second type of PDU included in bus frames, are used to carry such control information.

CUBs are created and consumed by bus components. In a preferred embodiment, the IOM 11 and the APS 418 are the only bus components that create CUBs, while the TUB 416 and the QMS 19 are the only bus components that consume CUBS. CUBs are passed though bus components lying between creating and consuming bus components. Though according to this embodiment, no information is added, dropped or concatenated to a CUB as it passes through bus components, other embodiments could easily support such functions.

The APS 418 generates CUBs to provide control information to the QMS 419 and the TUB 416. More specifically, scheduling-rate update and RM connection status information is sent to the QMS 419 in an APS_QMS CUB, which is illustrated in FIG. 44. The ICN of the connection whose rate is being communicated is in the rate_update_ICN field while the service-rate of the connection is in the SCH_rate field. The ICN of the resource management connection whose status is being updated is contained in the RM_cell_ICN field, while the status of the RM connection is described in the RM_flags field. Four APS_QMS CUBs are included in each bus frame.

Information required in order to update the policing parameters of the DGCRA on the TUB 416, is sent from the APS 418 in an APS_TUB CUB, which is illustrated in FIG. 45. The ICN of the connection whose DGCRA parameters are being updated is contained in the DGCRA_ICN field, while the DGCRA parameters for that connection are in the DGCRA_rate field. Four APS_TUB CUBs are included in each bus frame.

The IOM 411 generates IOM_QMS CUBs to provide a flow of feedback information to the QMS 419. Such a flow is needed because the timing of cell departures from the IOM 411 is assumed to be asynchronous with respect to the timing of cell departures from the CM 414. This necessitates a flow of feedback information from egress buffers on the IOM 411 to the scheduler on the QMS 419 in order to maximize egress rates from the switch without overflowing the egress buffers. This flow of feedback information is referred to as Physical Layer Flow Control (PLFC). PLFC updates regarding the status of the buffers on the IOM 411 are communicated from the IOM 411 to the QMS 419 using the IOM_QMS CUB, which is illustrated in FIG. 46. The identity of the port whose egress buffer is being described is in the Port ID field, while the status of the buffer is described in the PLFC field. Four IOM_QMS CUBs are inserted into each bus frame, assuming the 2.5 Gbps switch of FIG. 36 terminates four network links 407. If more than four network links 417 are being terminated by a single 2.5 Gbps CPM 415, then either more IOM_QMS CUBs must be included in each bus frame, or some IOM_QMS CUBs will each have to carry feedback information relating to more than one of the network links 417.

Communication between the CU 408 and the SE 406 takes place using the third type of PDUs contained in bus frames, which are called software control packets (SCPs). More specifically, each bus component is given a unique device identification (ID) when the switch is being initialized. The device IDs are used to route a series of SCPs, through the high-speed link 419 and/or the buses 412,413, 420,421, between the CU 408 and the bus components, or between the bus components. The SCPs can carry requests to read from or write to the registers and context memories of bus components, notifications of events that have occurred, or responses to requests.

The transfer of CIBs, CUBs and SCPs across the buses 412,413,420,421 is coordinated by a physical layer device protocol shared by all the bus components. The device protocol is based on known synchronous mapping methods that specify how contents of PDUs are to be passed through bus components from one bus segment to another, based on their location within the bus frame. The protocol is implemented, in a preferred embodiment, by adding to each chip that implements one of the bus components 411,414, 415,416,417,418 and 419, a single Encapsulating Logic Ring (ELR). The ELR forms the outer part of the chip and provides an interface between the buses 412,413,420 and/or 421 and the encapsulated bus component, which forms the inner part of the chip and contains the function specific part of the chip.

Each ELR provides physical layer services to its enclosed function specific bus component. Two types of interfaces are implemented by ELRs deployed within the architecture of FIG. 34 and FIG. 35—one type is used to interface with the twelve signal-line buses 420, 421 that are internal to the CPM 15, while the other type is used to interface with the twenty-four signal-line buses 412, 413 that are external to the CPM 415.

Figure 47:
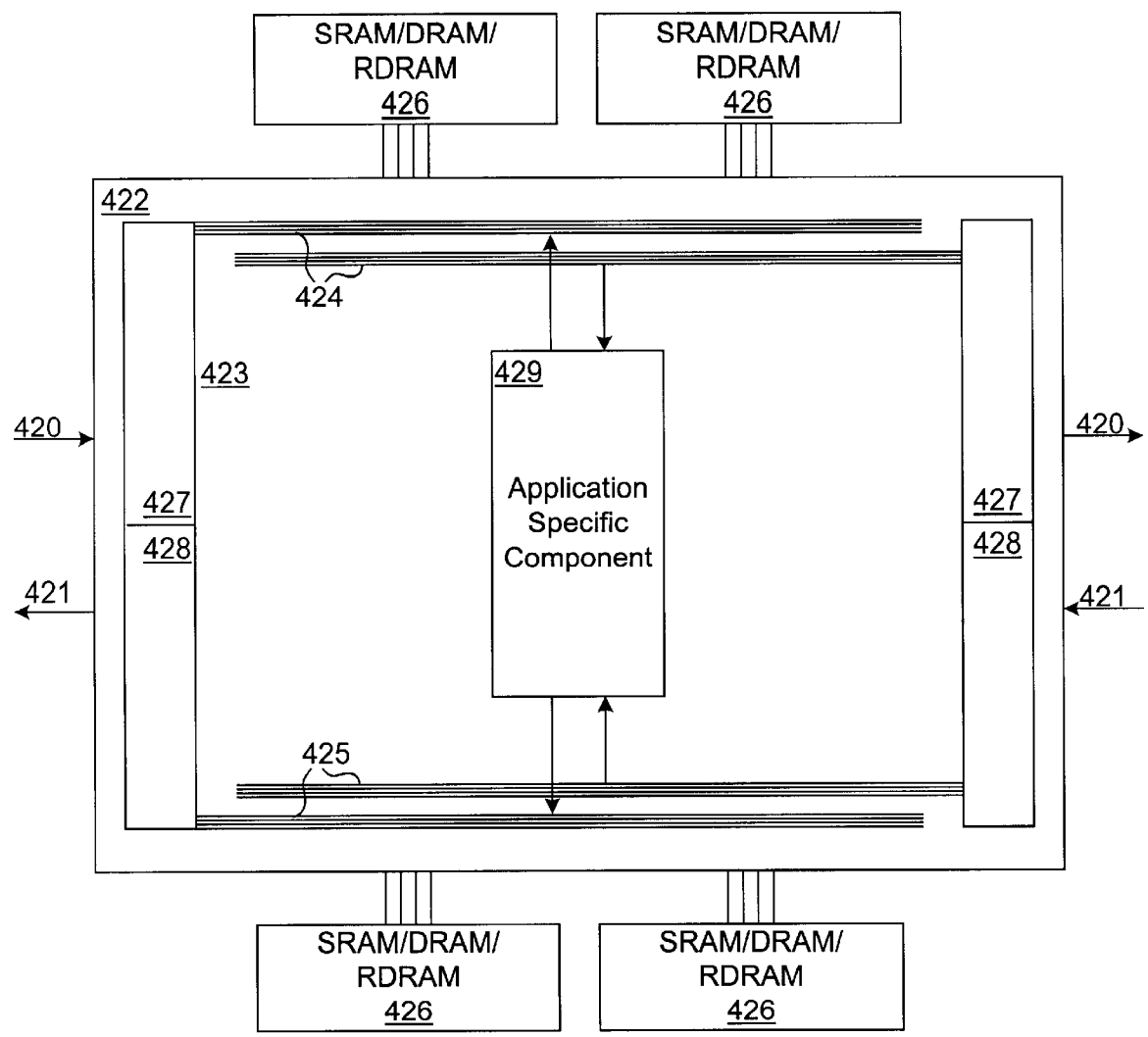
FIG. 47 illustrates an encapsulating logic ring (ELR)

A chip comprising a function specific bus component 429 which could be any of the components 411,414 or 416 through 419, and an ELR 422, is illustrated in FIG. 47. The ELR 422 has an area 423 into which one or more function specific bus components 429 can be inserted. In other embodiments of the novel architecture, wherein a plurality of components replace any one of the bus components 411,414 and 416 through 419, the area 423 is large enough to accommodate the replacing the plurality of components. Therefore, if three components are used to implement the QMS 419 in an alternative embodiment for example, the three components could be inserted into the single ELR provided their collective footprint-size does not exceed the footprint-size of the area 423. Any inserted components 429 are connected to two pairs of internal buses 424,425, both buses of each pair flowing in the ingress and egress directions respectively. If more than one component 429 occupies the area 423, the data flow through the components 429 can be load-shared by connecting different components 429 to different buses in each pair 424,425. Context RAM chips 426, for storing data required by the components 429 such as linked-list pointers and look-up tables, are directly attached to the components 429 (the connections between the RAM chips 426 and any function specific components 429 within the area 423 are not shown).

The internal ELR buses 424,425, connect the ingress and egress external buses 412,413 or 420, 421 to any enclosed function specific component 429, through hardware logic blocks 427,428 that implement the device protocol.

The input logic block 427 that receives traffic from the input ingress bus 420$i$ or input egress bus 421$i$, monitors the traffic that flows through from either bus. Once the input logic block 427 detects traffic from the input ingress bus 420$i$ for example, the traffic is organized into two groups. One group contains SCPs, and the other group contains CUBs and CIBs. Each group is sent, through the internal bus 424, to the appropriate parts of the function specific bus component 429 for processing. The input logic block 427 also supplies control and framing information to the output logic block 428 connected to the output ingress bus 420$o$. In the meantime, the output logic block 428 assembles bus frames for transport across the output ingress bus 420$o$. The output logic block 428 fills the frames with data sent from the enclosed function specific component 429 through the internal bus 424, selecting which part of the outgoing bus frames to populate with data using the control information supplied by the input logic block 427.

Data flowing in the egress direction over the buses 421$o$, 420$o$ is handled by the ELR 422 using methods similar to the above-described methods relating to data flowing in the ingress direction.

When the above-described method of intra-switch communication is used, a change in the interface of any one function specific bus component does not necessitate replacing all bus components that communicate with the changed component. Instead, the following procedure is followed. When a change in the implementation of a bus component requires that new information be communicated by the component to other components, the bus frames passed between the components are reformatted to accommodate the transfer of the new information. This reformatting can involve adding, removing or resizing the fields within existing CIBs, CUBs or SCPs, or even adding or removing entire CIBs, CUBs or SCPs within the bus frames. Once the bus frames have been reformatted, the ELRs used by other bus components are changed, such that the components can continue to access the same information notwithstanding the formatting changes applied to the bus frame. More specifically, the chips send to implement the other bus components are replaced by new chips, whose ELRs have been programmed to read data from and write data to different parts of each rearranged bus frame. The function specific bus components within the new chips are identical to the function specific bus components within the old chips; only the ELR parts of the chips differ. This means that the investments made in designing the complex function-specific bus components are preserved. The replacement chips simply make use of ELRs whose logic blocks 427,428 are programmed to access different parts of the bus frames. The adaptation to a new bus frame format is thus easily accomplished.

It is to be noted that any increases in bandwidth requirements brought about by changing the implementation of any one bus component, can be easily accommodated by the above-described architecture. This is because the buses 412,413,420 and 421, have the capacity to accommodate almost double the amount of bandwidth required by the bus components in the embodiment described above. Even at the point in the above-described embodiment where the highest bus utilization occurs, there is still ample available bandwidth to accommodate new messages. The highest bus utilization rate occurs in the part of the bus 420 that allows traffic to flow from the APS 418 to the QMS 419. At this point, four TUB-egress CIBs, four IOM_QMS CUBs and four APS_QMS CUBs must all be transferred in each bus frame across the smaller 412-bit bus used to interconnect components inside the CPM 415. Even this maximal flow however, amounts only to 102 data-transfers every 694 ηs which is less than 50% of the capacity of the bus 420. Even if SCPs to and from the CU 408, are assumed to occupy 622 Mbps (i.e. a rate even higher than the rate that would be supported if the link 409 with the CU 408 supported the OC-412 protocol, and was fully utilized), the utilization rate of the bus 420 would still remain below 60%. The above-described architecture can thus accommodate substantial increases in the amount of bandwidth required by the switch.

It will be apparent to those skilled in the art that the aforementioned architecture facilitates the decoupling of the CU 408 and the SE 406, of the IOM 11, CM 414 and the CPM 415, and of all unrelated functional components in the CPM 415. Since additionally, the architecture is partitioned so that functions that are prone to change are isolated on single easily replaceable bus components, the architecture described above substantially reduces maintenance and upgrade costs.

The above-described architecture also simplifies the design of ATM switches. More specifically, it allows ATM switches to be built by placing components designed to communicate with each other according to the above-described methods on standard generically applicable buses such as a Versa Module Eurocard (VME) bus or a Small Computer System Interface (SCSI) bus.

The above-described architecture can also be applied to serve a wide variety of purposes. Though it is suited to handle ATM traffic in a preferred embodiment, it can also handle other forms of packet-switched traffic and time division multiplexed traffic. Furthermore, though the architecture can be used to form the core of a stand-alone switch as illustrated in FIG. 34 and FIG. 35, it also can be used as an embedded switching means that augments the capabilities of a higher capacity switch.

It is to be noted that the performance of the switch does not have to be significantly compromised to realize these benefits. This is firstly because the above-described partitioning groups related functions for mapping on to the same components. This improves the utilization of several vital switch resources, such as memory. Secondly, though the use of the messaging system described above does introduce overhead into the switch that is not present in switches that use component-specific connections, which in turn introduces additional latency into the performance of the switch, this latency is not significant. More specifically, the additional latency introduced by the above-described architecture amounts to under 7% of the latency that already exists in the switch due to the time required by components to perform their functions.

Numerous modifications and variations of the present invention are possible in light of the above teachings. It is therefore to be understood that within the scope of the appended claims, the invention may be practised otherwise than as specifically described herein. For example, it is to be noted that bidirectional generic buses could replace the unidirectional generic buses 412,413,420,421 described above.

Figure 48A:
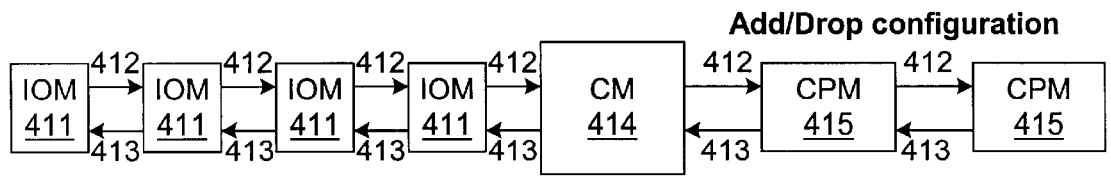
FIG. 48a illustrates an add/drop configuration according to an embodiment of this invention.
Figure 48B:
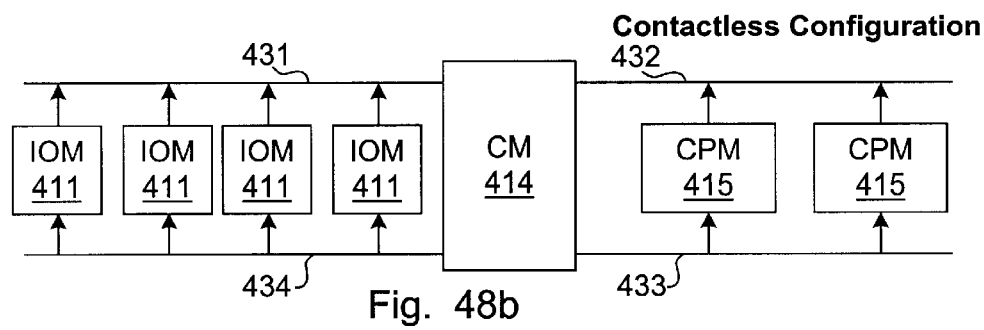
FIG. 48b illustrates a contactless configuration according to an embodiment of this invention.
Figure 48C:
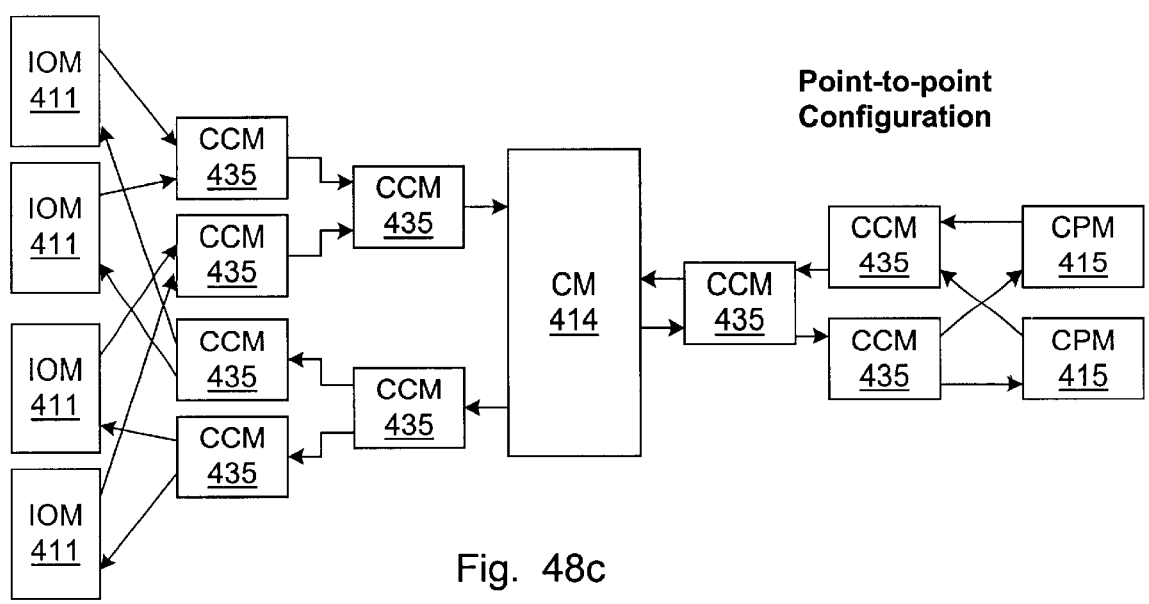
FIG. 48c illustrates a point-to-point configuration according to an embodiment of this invention.

It also is to be noted that the above-mentioned partitioning and messaging systems could be implemented using several different configurations, such as those illustrated in FIGS. 48a, 48b and 48c. All three configurations can be adapted to use the novel messaging system described above by making minor adjustments to the device protocol implemented by the ELRs 422.

FIG. 48a illustrates the add/drop configuration, which is similar to that shown in FIG. 34 and FIG. 35. It differs from the embodiment described above in that a plurality of IOMs 411 and CPMs 415 are used. Only one of the IOMs 411 and one of the CPMs 415 are directly connected to the CM 414 in the configuration of FIG. 48a. All the indirectly connected IOMs 411 and CPMs 415 must send their traffic through the directly connected modules, using the connection methods described above. The same buses 412,413,420,421 used in the above-described embodiment can be used in the configuration of FIG. 48a. Slightly larger buses may be required to handle the additional traffic that could originate at the additional IOMs that are deployed in this particular configuration.

FIGS. 48b illustrates a contactless configuration, which is similar to the configuration of FIG. 48a, except that the plurality of buses 412,413,420,421 are replaced by pairs of shared buses 431 through 434. The shared buses 31 through 434 are generic unidirectional buses as in the embodiments described above. Implementing this configuration as opposed to the ones described above, primarily requires extending the device protocol to determine how the buses 31 through 434 are to be shared by the bus components.

FIG. 48c illustrates a point-to-point configuration which allows for the division of the ingress or egress traffic flowing through a switch into more manageable sub-flows. The sub-flows are routed through generic buses, as in the embodiments described above. Each sub-flow can be switched through one of a plurality of dynamically allocatable paths connecting the IOMs 412 to the CM 414, and the CM 414 to the CPMs 415, using cross-connect modules (CCMs) 435. CCMs are simply space-switches that route traffic from one of a plurality of inputs to one of a plurality of outputs. As is the case with other bus components, the chips on which CCMs 435 are implemented have ELRs 422 that surround the space-switch, and which implement the device protocol known to all the bus components.

In other possible configurations, the positions of the CM 414 and the CPM(s) 415 relative to the IOM 411 can be swapped. Under this embodiment, an ingress cell would not be buffered in the CM 414 until the QMS 419 has had a chance to process information related to the cell. The CIBs would therefore be used to carry a cell through an ingress path that extends from the IOM 411 to the various components of the CPM 15 to the CM 414. The cell will remain in the CM 414 until the QMS 419 initiates the transmission of the cell. The egress CIBs will then be used to carry the cell from the CM 414 through the components of the CPM 415 to the IOM 411. Changes would have to be made to the ingress and egress CIBs that will be obvious to those skilled in the art, if the positions of the CM 414 and the CPM 415 were swapped. The QMS egress CIB, for example, will contain the actual cell to be transmitted from the CM 414, instead of the buffer address of the cell within the CM 414.

We claim:

1. An ABR (available bit rate) processing method for implementation by an APS (ABR processing subsystem) forming part of an ATM (asynchronous transfer mode) switch which assigns an ingress cell an internal connection number and a buffer address in cell memory, the method comprising the steps of:

receiving a plurality of cell ingress input messages each containing a respective internal connection number, a buffer address, and an ingress cell;

for each cell ingress input message received, outputting a cell ingress output message containing the internal connection number, the buffer address and the ingress cell, and then conditionally performing ingress cell measurements;

receiving a plurality of cell egress input messages each containing a respective internal connection number and buffer address;

for each cell ingress message received, outputting a cell egress output message containing the internal connection number and buffer address, and then conditionally performing egress cell measurements;

for each ingress cell received in an ingress cell input message, if the ingress cell contained in one of said ingress input messages is a BRM (backward resource management) cell having ER (explicit rate), CI (congestion indication) and NI (no increase) fields, an internal connection number and a buffer address for the BRM cell, then calculating new ER,CI,NI values, and updating these in the BRM cell and outputting a cell ingress output message containing the updated BRM cell, ICN (internal connection number) and buffer address for storage in cell memory and subsequent queueing.

2. A method according to claim 1 wherein said ingress cell measurements are only performed if the ingress cell is a cell on an ABR connection.

3. A method according to claim 1 wherein said egress cell measurements are only performed if the egress cell is higher priority than ABR elastic.

4. A method according to claim 1 wherein all messages are sent or received through a generic bus medium.

5. A method according to claim 1 further comprising, for connections for which the switch is a virtual destination, the steps of:
- if the cell in one of said cell egress input messages is an FRM (forward resource management) ingress cell for an ICN for which the switch is a virtual destination, looking up a reverse ICN, then calculating new ER,CI, NI values, and updating these in the cell, turning the cell into a BRM cell having an ICN equal to said reverse ICN and storing it in a turn-around cell memory in a cell memory location associated with the reverse ICN;
- outputting a BRM notification message containing the reverse ICN indicating that the BRM cell is waiting to be sent;
- receiving one of said cell egress input messages containing the reverse ICM, buffer address, and a flag indicating that it is time to emit the BRM cell on the reverse ICN; and
- reading the BRM cell from the turn-around cell memory location associated with the reverse ICN, and outputting one of said cell egress output messages containing the BRM cell, reverse ICN and buffer address.

6. A method according to claim 1 further comprising, for connections for which the switch is a virtual source, the steps of:
- if the cell in one of said cell ingress input messages is a VS BRM cell then:
- a) extracting ER, CI and NI, and ICN from the received VS BRM cell and determining a new allowed cell rate for the connection;
- b) outputting a shaping rate update message containing a current cell rate equal to the new allowed cell rate;
- if one of said cell egress input messages contains an ICN and contains an indication that it is time to build an FRM cell for that ICN then:
- c) building an FRM cell containing a current cell rate equal to the allowed cell rate;
- d) outputting a cell egress output message containing the FRM cell; and
- e) outputting another shaping rate update message containing a current cell rate equal to the current cell rate of the FRM cell.

7. A method according to claim 1 further comprising, if one of said cell ingress messages contains an FRM cell containing a current cell rate field, the steps of:
- extracting the current cell rate field;
- determining a new policing rate as a function of a minimum cell rate, a peak cell rate, and the current cell rate for the ICN; and
- outputting a policing rate update message.

8. A method according to claim 7 wherein the policing rate update message contains an increment which is the reciprocal of the new policing rate.

9. A method according to claim 1 further comprising, if one of said cell engress input messages contains a BRM cell containing a current cell rate field, the steps of:
- extracting the current cell rate field;
- determining a new policing rate as a function of a minimum cell rate, a peak cell rate, and the current cell rate for the ICN; and
- outputting a policing rate update message.

10. A method according to claim 9 wherein the policing rate update message contains an increment which is the reciprocal of the new policing rate.

11. A method according to claim 1 further comprising, if the connection is a VS/VD (virtual source/virtual destination) connection, the steps of:
- outputting a VD EFCI (explicit forward congestion indication) update message.

12. A partitioned ATM switch comprising:
- a TUB (translation, policing and buffering) block;
- a CM (memory interface) block;
- an IOM (input/output management) block;
- a QMS (queueing, shaping and scheduling) block;
- an APS (Available bit rate processing system) block, the APS comprising one or more ASICs (application specific integrated circuits) for performing the steps of:
- receiving from the TUB a plurality of cell ingress input messages each containing a respective internal connection number, a buffer address, and the ingress cell;
- for each cell ingress input message received, outputting a cell ingress output message containing the internal connection number, the buffer address and the ingress cell, and then conditionally performing ingress cell measurements;
- receiving from the QMS a plurality of cell egress input messages each containing a respective internal connection number and buffer address;
- for each cell egress message received, outputting to the TUB a cell egress output message containing the internal connection number and buffer address, and then conditionally performing egress cell measurements;
- for each ingress cell received in an ingress cell input message, if the ingress cell contained in one of said ingress input messages is a BRM cell having ER, CI and NI fields, an internal connection number and a buffer address for the BRM cell, then calculating new ER,CI,NI values, and updating these in the BRM cell and outputting to the CM a cell ingress output message containing the updated BRM cell, ICN and buffer address for storage in cell memory and subsequent queueing by the QMS;
- wherein the components of the switch are in communication with each other through common buses, and wherein all of said above messages are communicated through said common buses.

13. An APS (ABR (available bit rate) processing system) for implementing ABR flow control functionality within an ATM (asynchronous transfer mode) switch which receives cells of a first type, these being cells received from a network and destined for a switching fabric and which receives cells of a second type, these being received from the switching fabric and destined for the network, the APS comprising:
- one or more hardware devices for performing a first subset of the ABR flow control functionality in relation to cells of said first type;
- one or more hardware devices for performing a second subset of the ABR flow control functionality in relation to cells of said second type;
- wherein said first subset and said second subset collectively comprise all of the ABR flow control functionality, wherein said first subset of ABR flow control functionality comprises:
- receiving a plurality of cell ingress input messages each containing a respective internal connection number, a buffer address, destination port ID, and an ingress cell of said first type;

for each cell ingress input message received, outputting a cell ingress output message containing the internal connection number, the buffer address, destination port ID, and the ingress cell;

for each ingress cell received in an ingress cell input message, if the ingress cell contained in one of said ingress input messages is a BRM cell having ER, CI and NI fields, then calculating now ER, CI, NI values, and updating these in the BRM cell and outputting a cell ingress output message containing the updated BRM cell, ICN and buffer address for storage in cell memory and subsequent queueing on the fabric side of the port.

14. A method according to claim 13 wherein said first subset of ABR functionality further comprises:

for each ingress cell received in an ingress cell input message, if the ingress cell is an FRM cell, and if DGCRA (dynamic generic cell rate allocation) is enabled for the connection, extracting a CCR field from the FRM cell, determining a new policing increment as a function of the CCR, MCR and PCR, and outputting this in a policing increment update (with increment based on the CCR) for use by the switch in policing the network side of the port at the new rate.

15. An APS (ABR (available bit rate) processing system) for implementing ABR flow control functionality within an ATM (asynchronous transfer mode) switch which receives cells of a first type, these being cells received from a network and destined for a switching fabric and which receives cells of a second type, these being received from the switching fabric and destined for the network, the APS comprising:

one or more hardware devices for performing a first subset of the ABR flow control functionality in relation to cells of said first type;

one or more hardware devices for performing a second subset of the ABR flow control functionality in relation to cells of said second type; wherein said first subset and said second subset collectively comprise all of the ABR flow control functionality, wherein said second subset of ABR flow control functionality comprises:

receiving a plurality of cell egress input messages each containing a respective internal connection number, and a buffer address of an egress cell of said second type;

for each cell ingress input message received, outputting a cell egress output message containing the internal connection number and the buffer address of the egress cell and then conditionally performing egress cell measurements; and for each cell egress input message received, if the cell is an FRM cell, updatings rate and queue fill measurements.

16. A system according to claim 13 wherein said ABR functionality further comprises VS/VD functionality.

17. A system according to claim 15 wherein said ABR functionality further comprises VS/VD functionality.

* * * * *